FIG-3

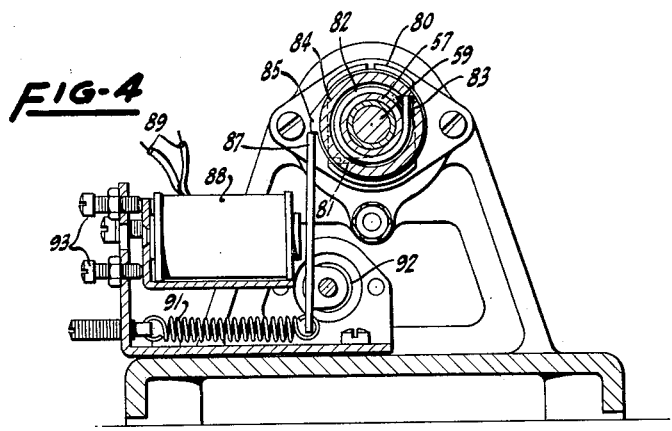
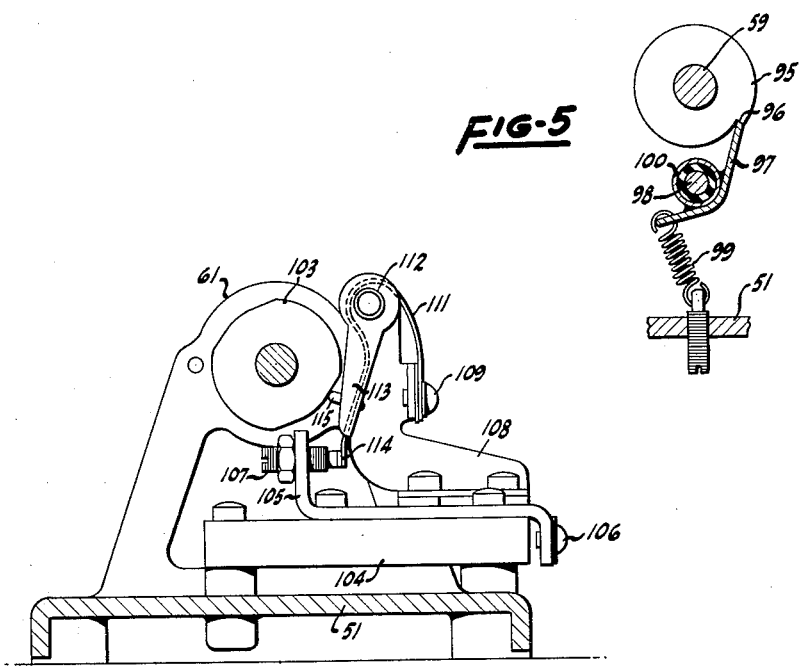

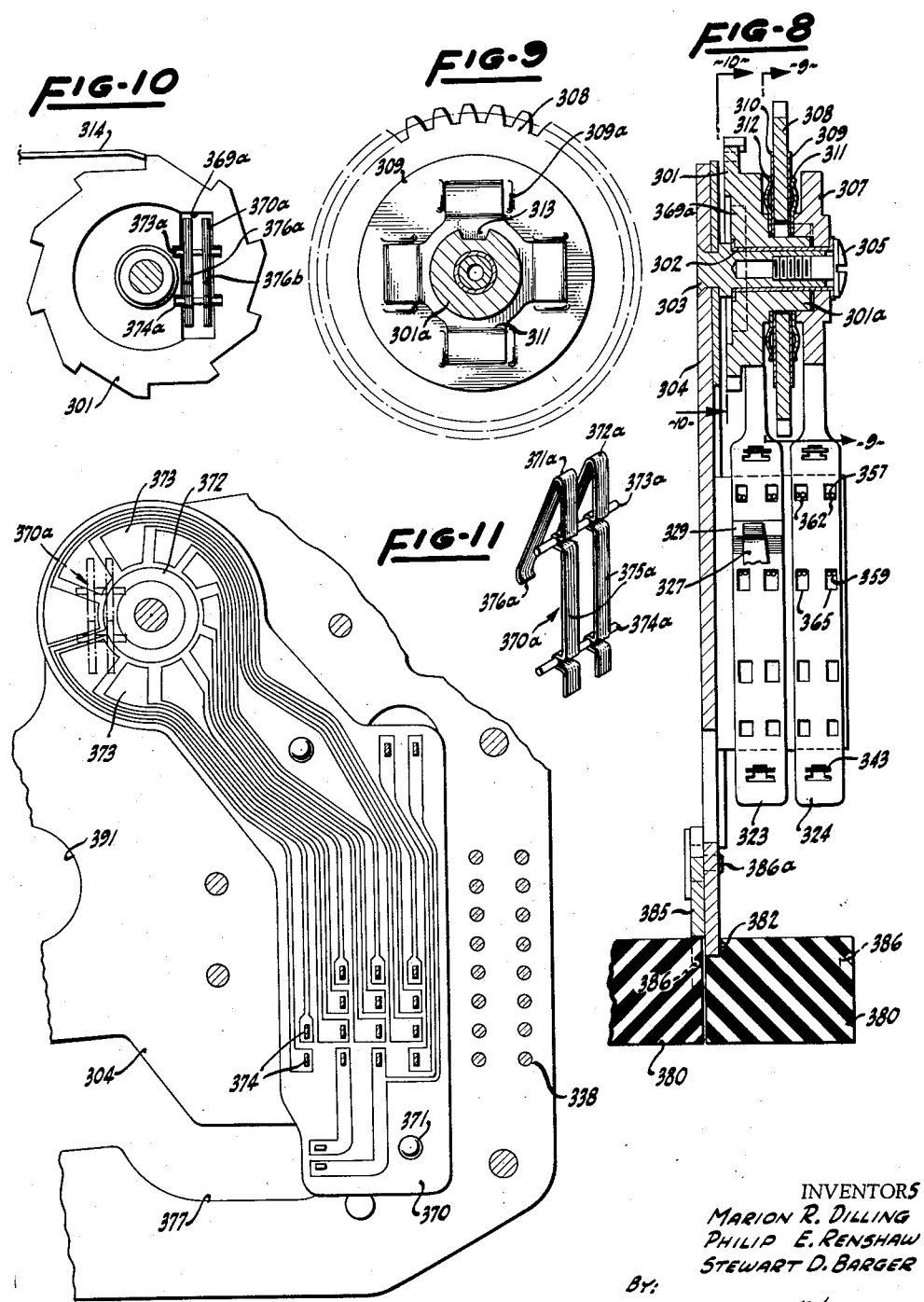

Nov. 7, 1961 M. R. DILLING ET AL 3,007,632
TYPEWRITER CONTROL OF AN INTERNALLY CYCLING COMPUTER UNIT
Filed June 25, 1957 34 Sheets-Sheet 7

INVENTORS
MARION R. DILLING
PHILIP E. RENSHAW
STEWART D. BARGER
BY:
ATTORNEYS

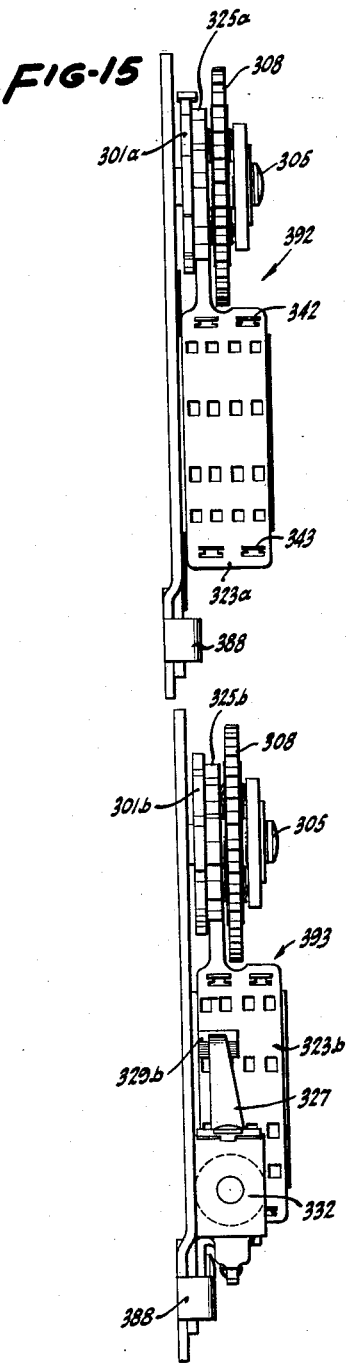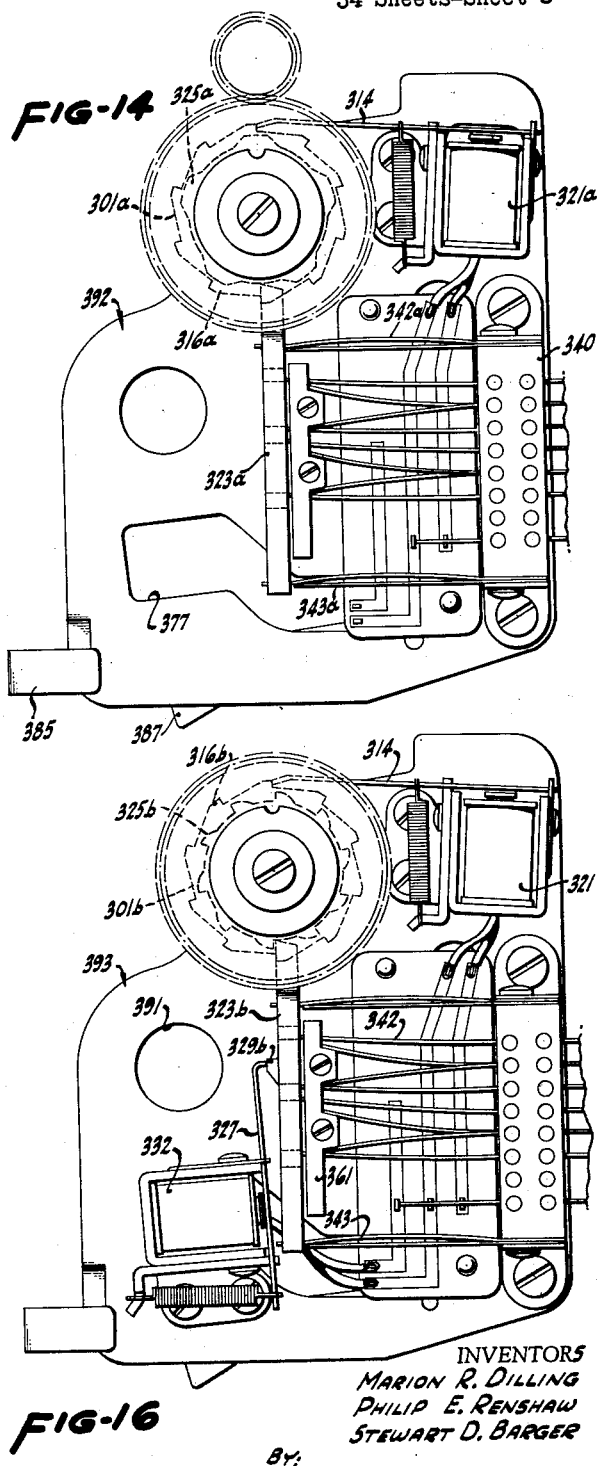

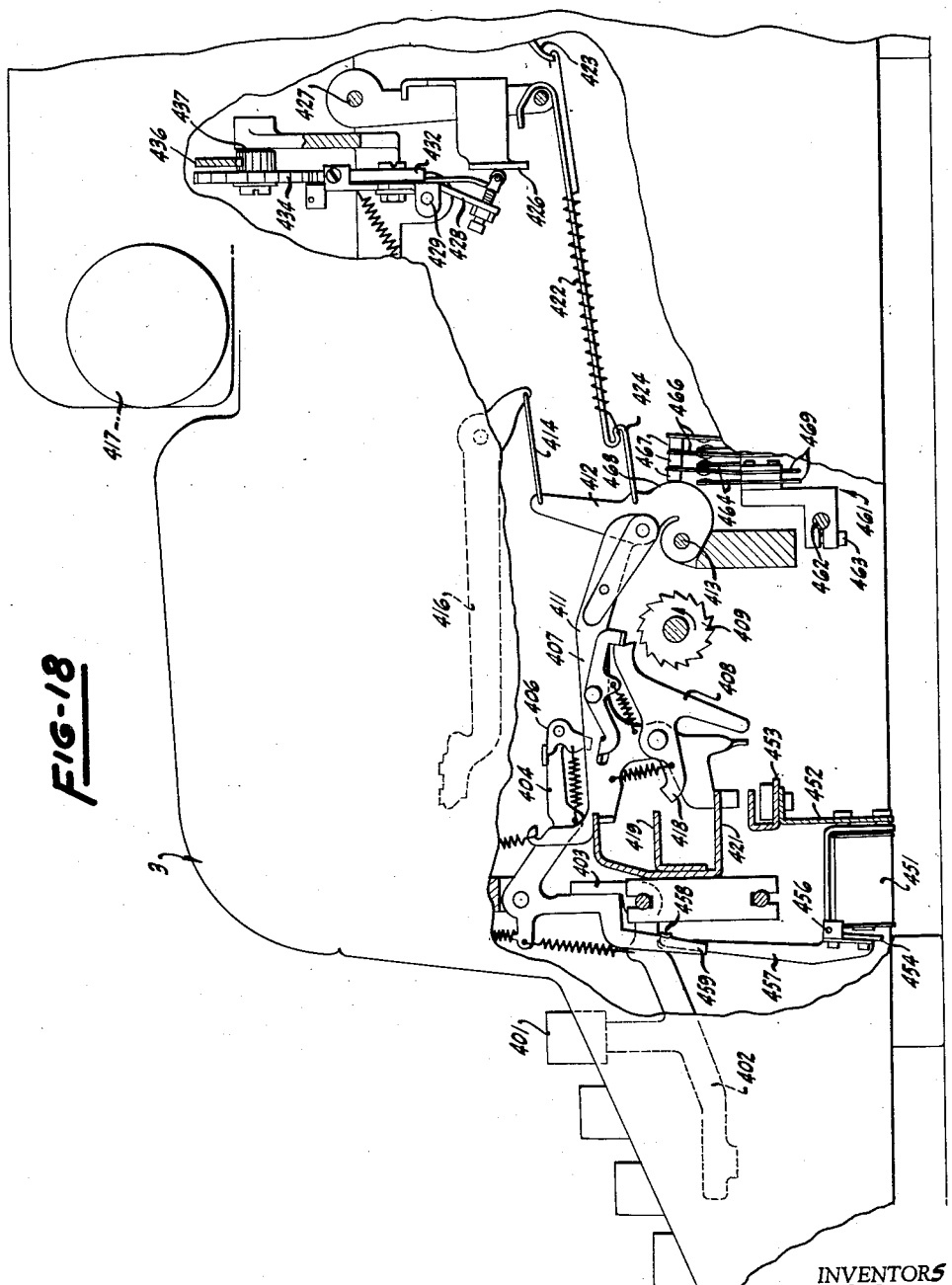

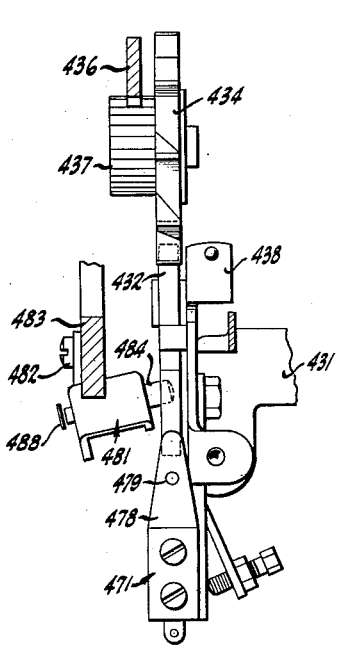
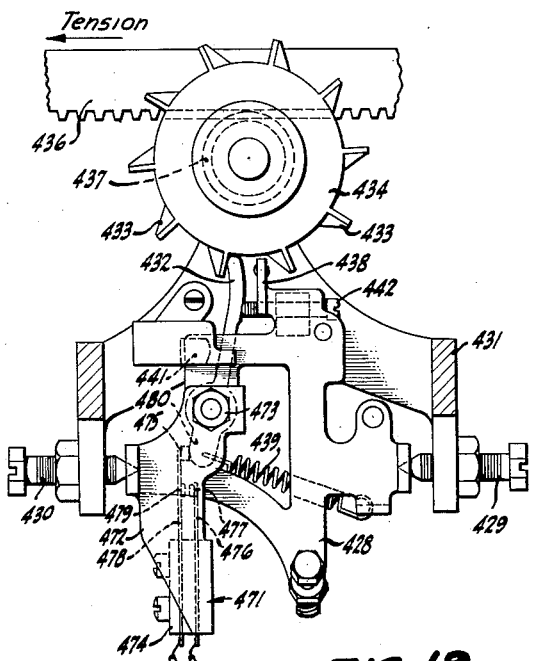
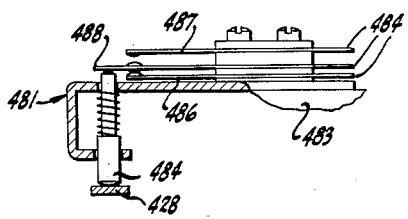

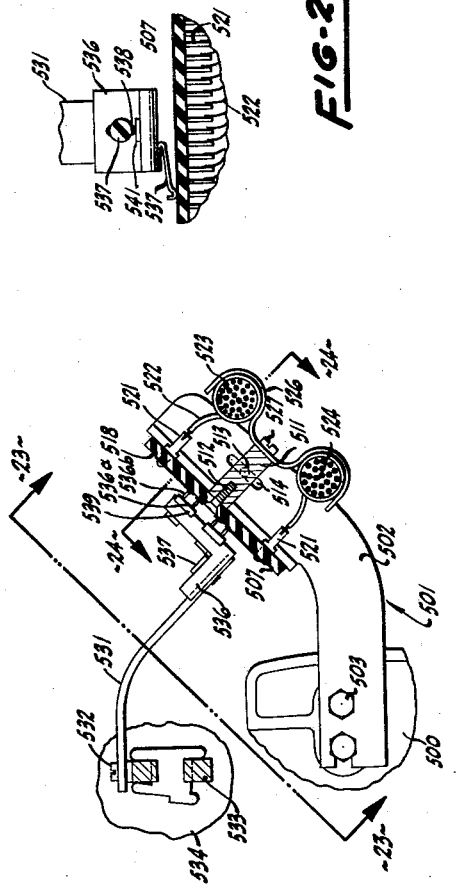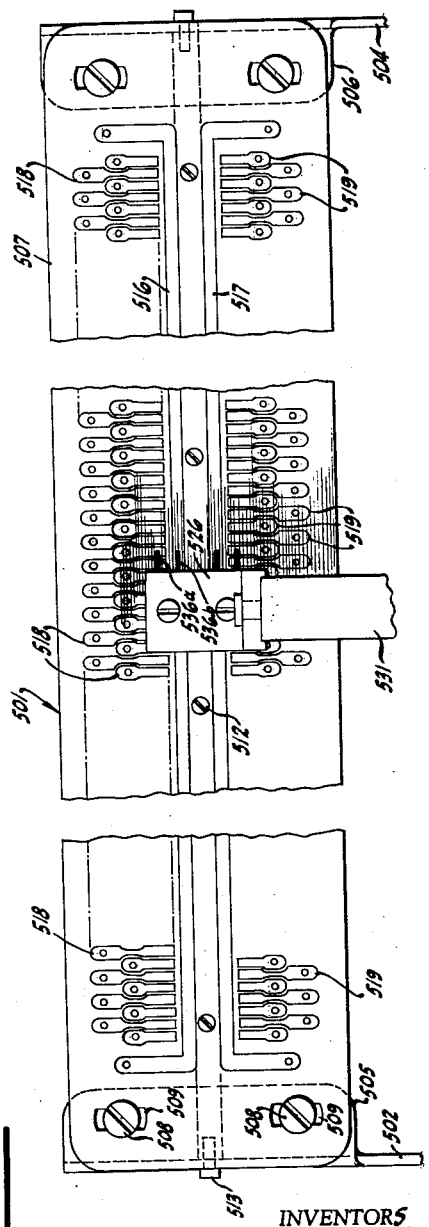

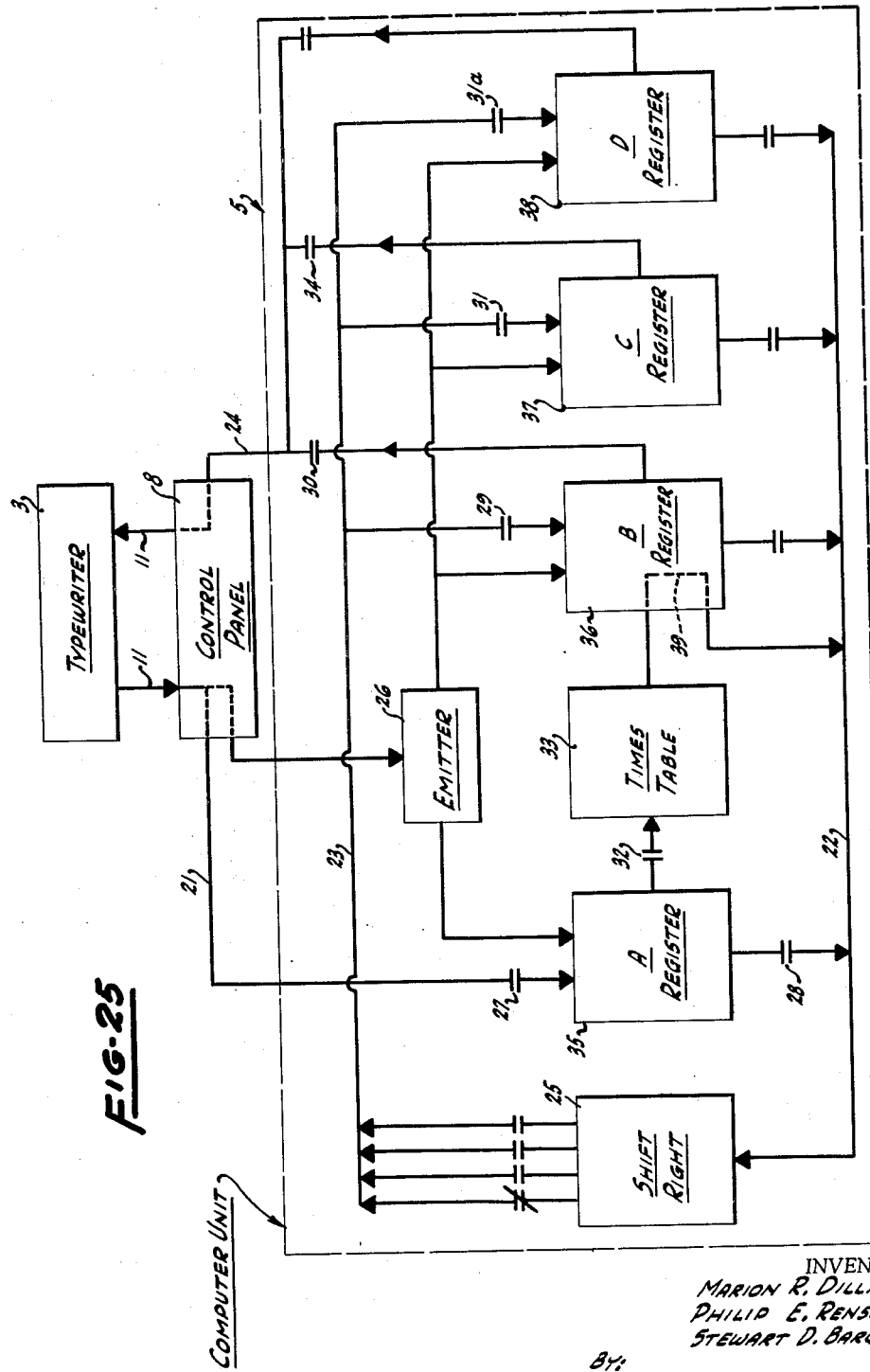

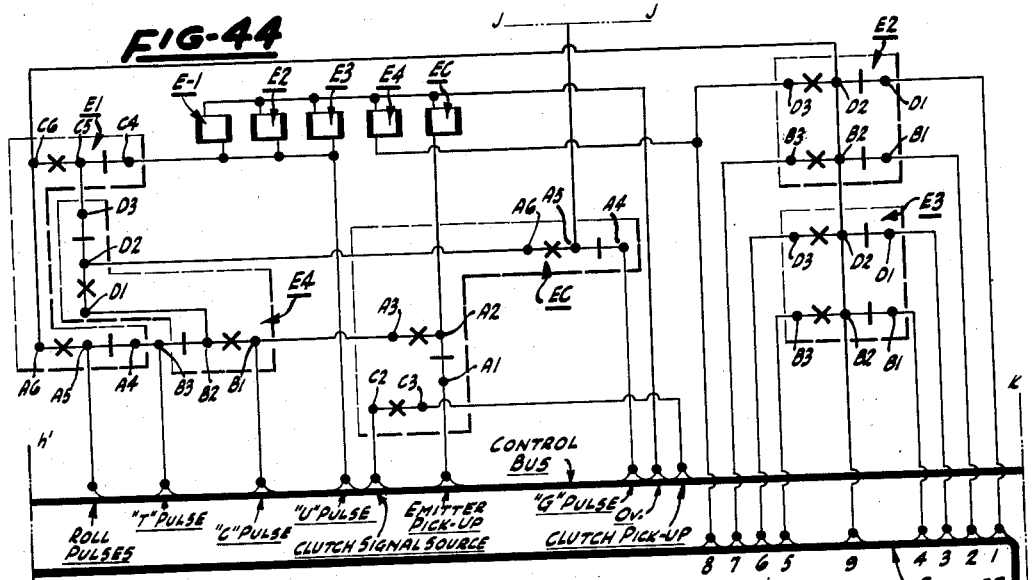
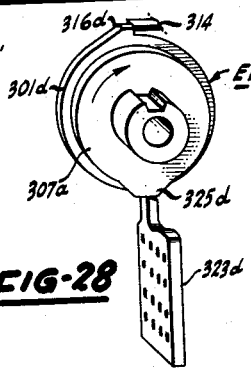
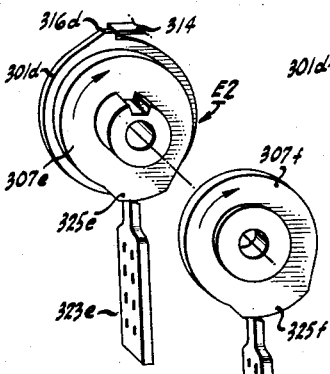
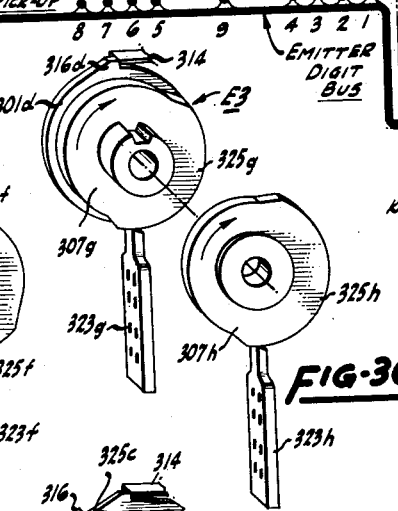
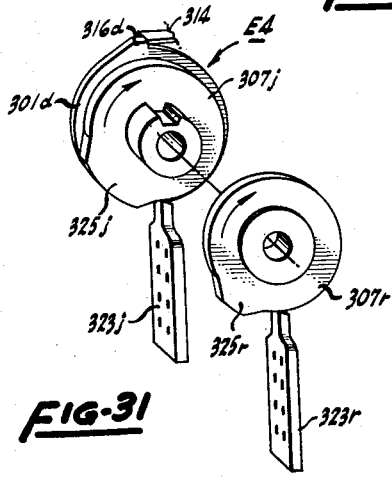
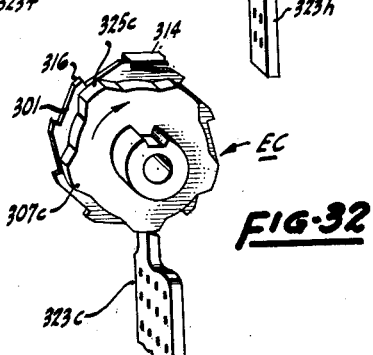

Nov. 7, 1961  M. R. DILLING ET AL  3,007,632
TYPEWRITER CONTROL OF AN INTERNALLY CYCLING COMPUTER UNIT
Filed June 25, 1957  34 Sheets-Sheet 16

INVENTORS
MARION R. DILLING
PHILIP E. RENSHAW
STEWART D. BARGER
BY:
Mellin and Hanscom
ATTORNEYS

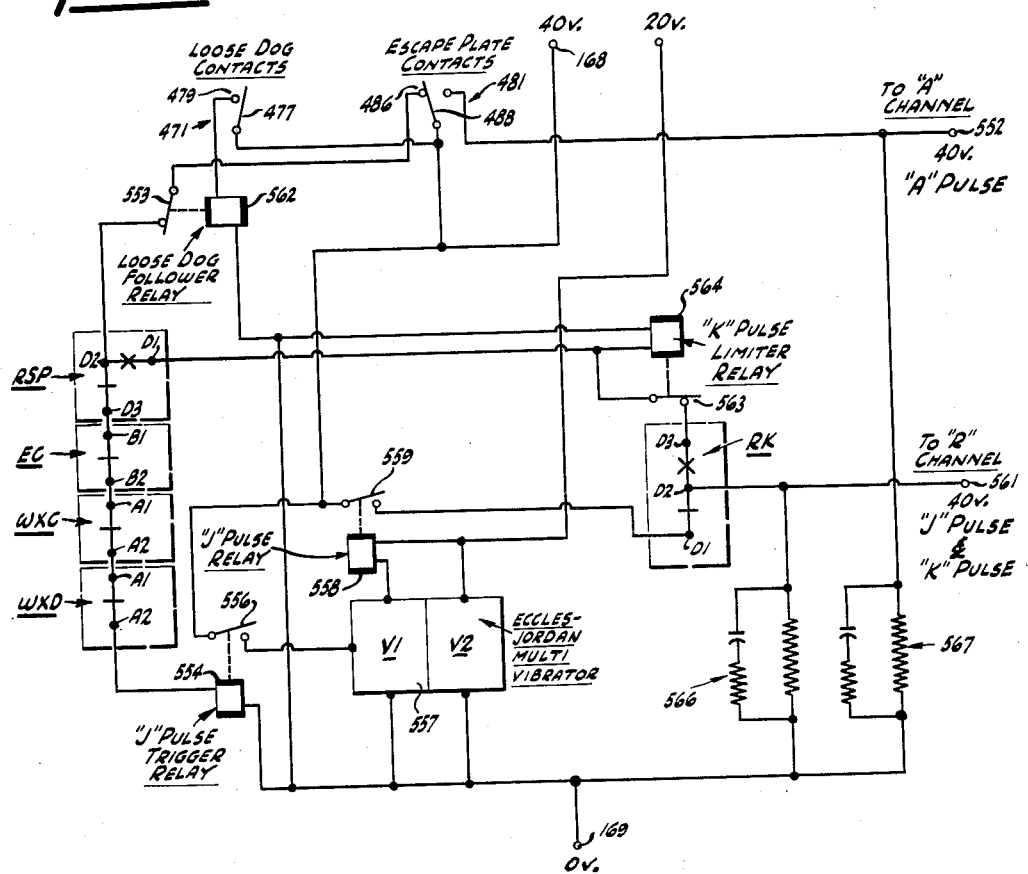

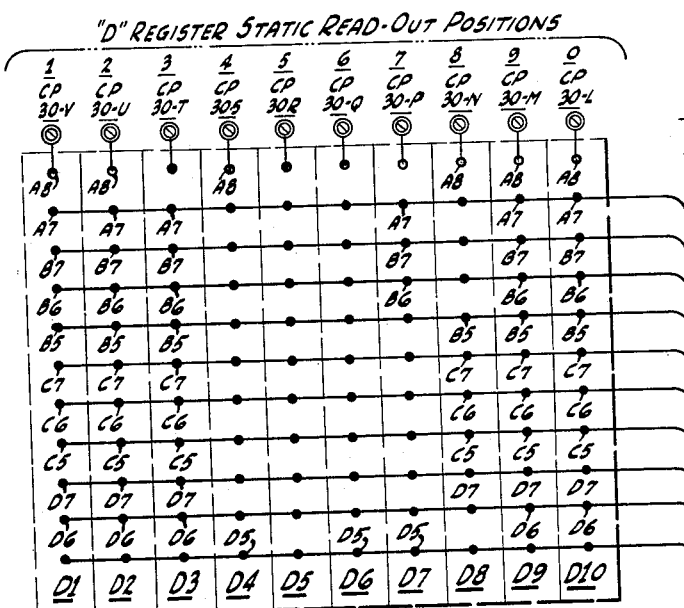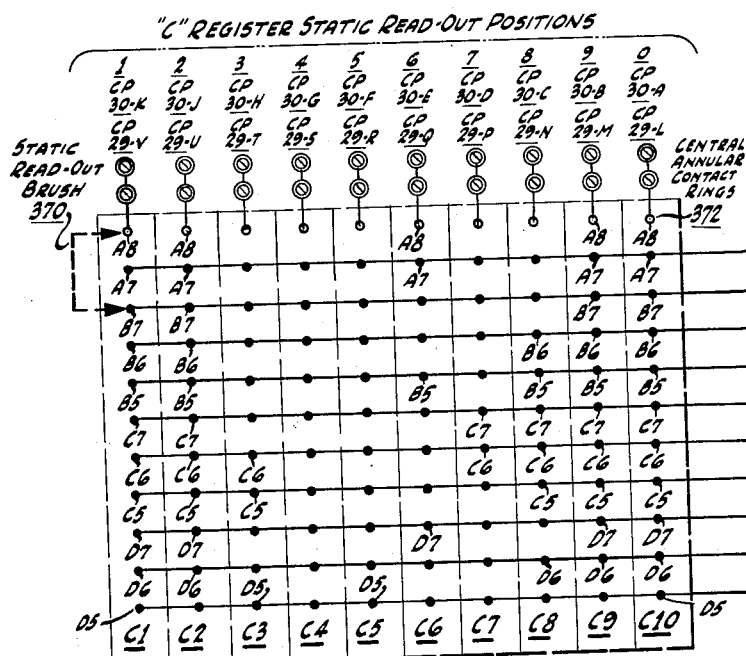

Nov. 7, 1961  M. R. DILLING ET AL  3,007,632
TYPEWRITER CONTROL OF AN INTERNALLY CYCLING COMPUTER UNIT
Filed June 25, 1957  34 Sheets-Sheet 19

FIG-37

INVENTORS
MARION R. DILLING
PHILIP E. RENSHAW
STEWART D. BARGER

BY:
Mellin and Hanscom
ATTORNEYS

Nov. 7, 1961  M. R. DILLING ET AL  3,007,632
TYPEWRITER CONTROL OF AN INTERNALLY CYCLING COMPUTER UNIT
Filed June 25, 1957  34 Sheets-Sheet 24

INVENTORS
MARION R. DILLING
PHILIP E. RENSHAW
STEWART D. BARGER

BY:
Meelin and Hanscom
ATTORNEYS

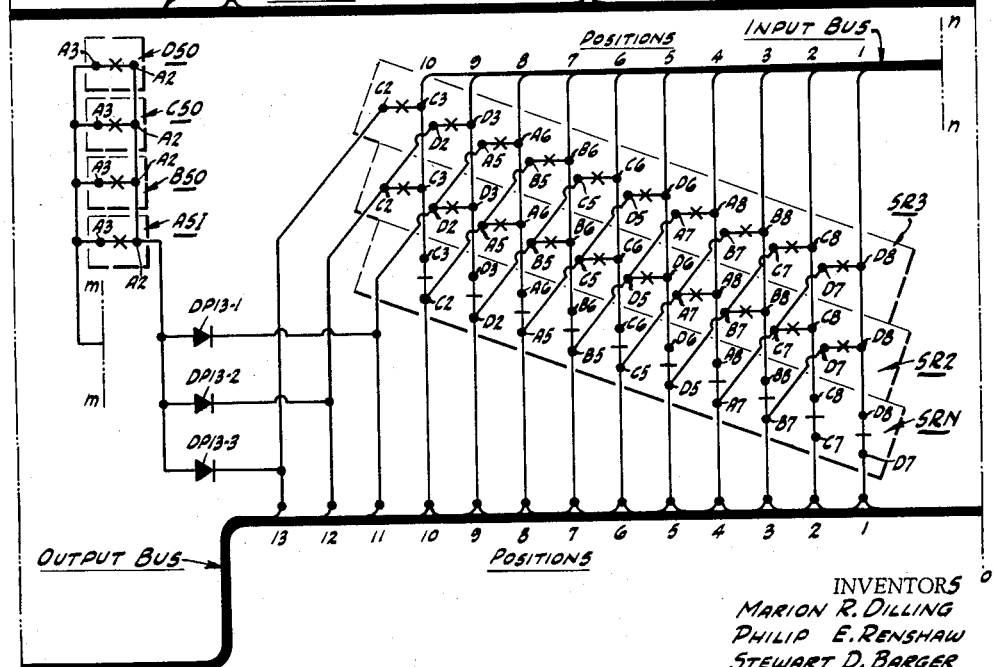

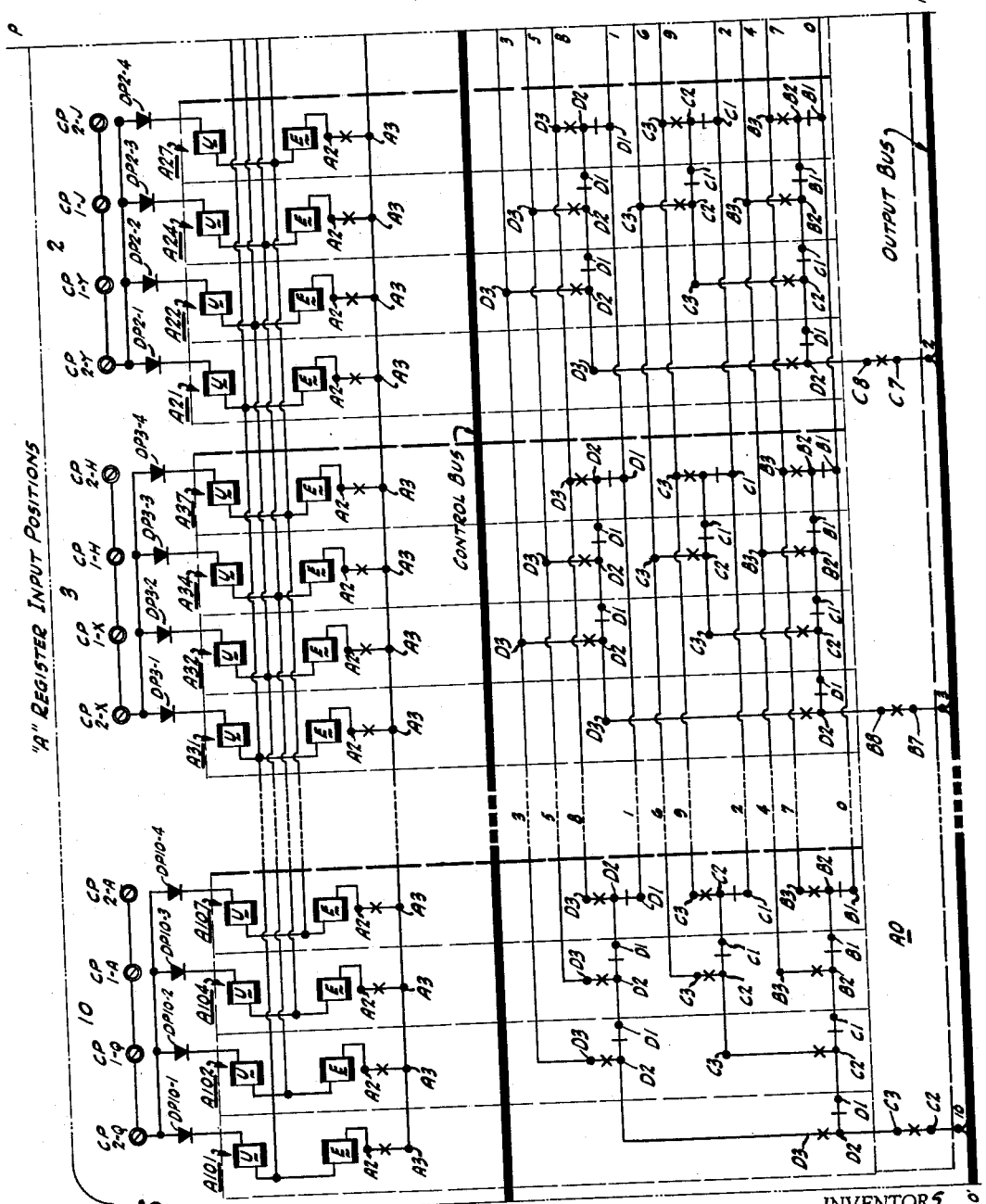

Nov. 7, 1961 M. R. DILLING ET AL 3,007,632
TYPEWRITER CONTROL OF AN INTERNALLY CYCLING COMPUTER UNIT
Filed June 25, 1957 34 Sheets-Sheet 32

INVENTORS
MARION R. DILLING
PHILIP E. RENSHAW
STEWART D. BARGER
BY:
Mellin and Hanscom
ATTORNEYS

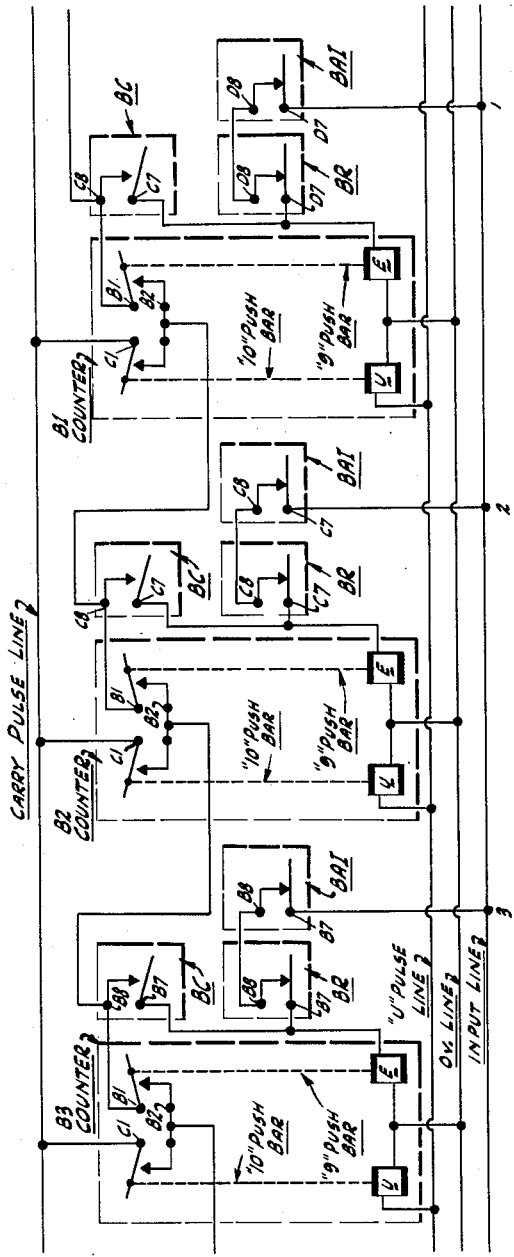
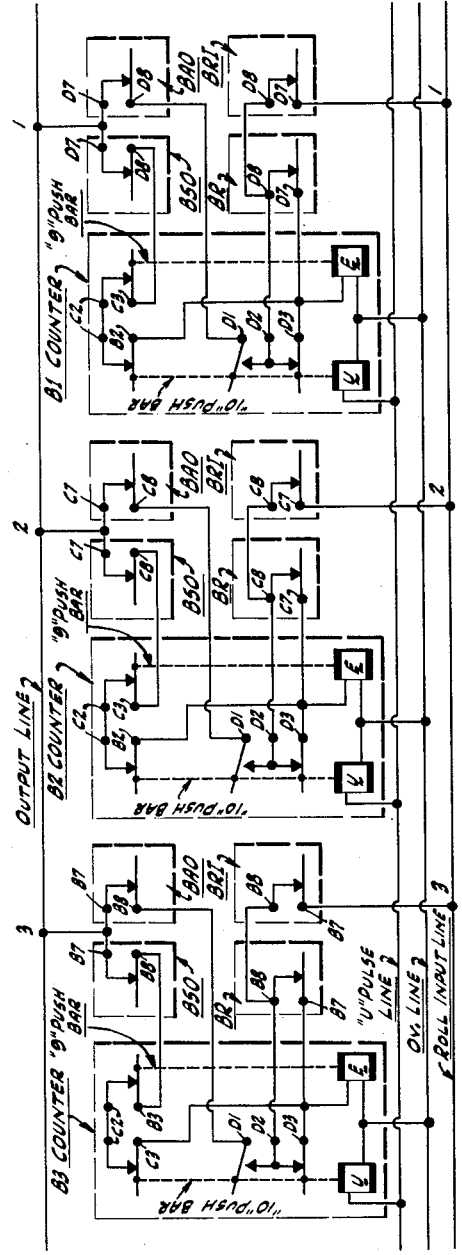
FIG-53
FIG-54
INVENTORS
MARION R. DILLING
PHILIP E. RENSHAW
STEWART D. BARGER
BY:
Mellin and Hanscom
ATTORNEYS

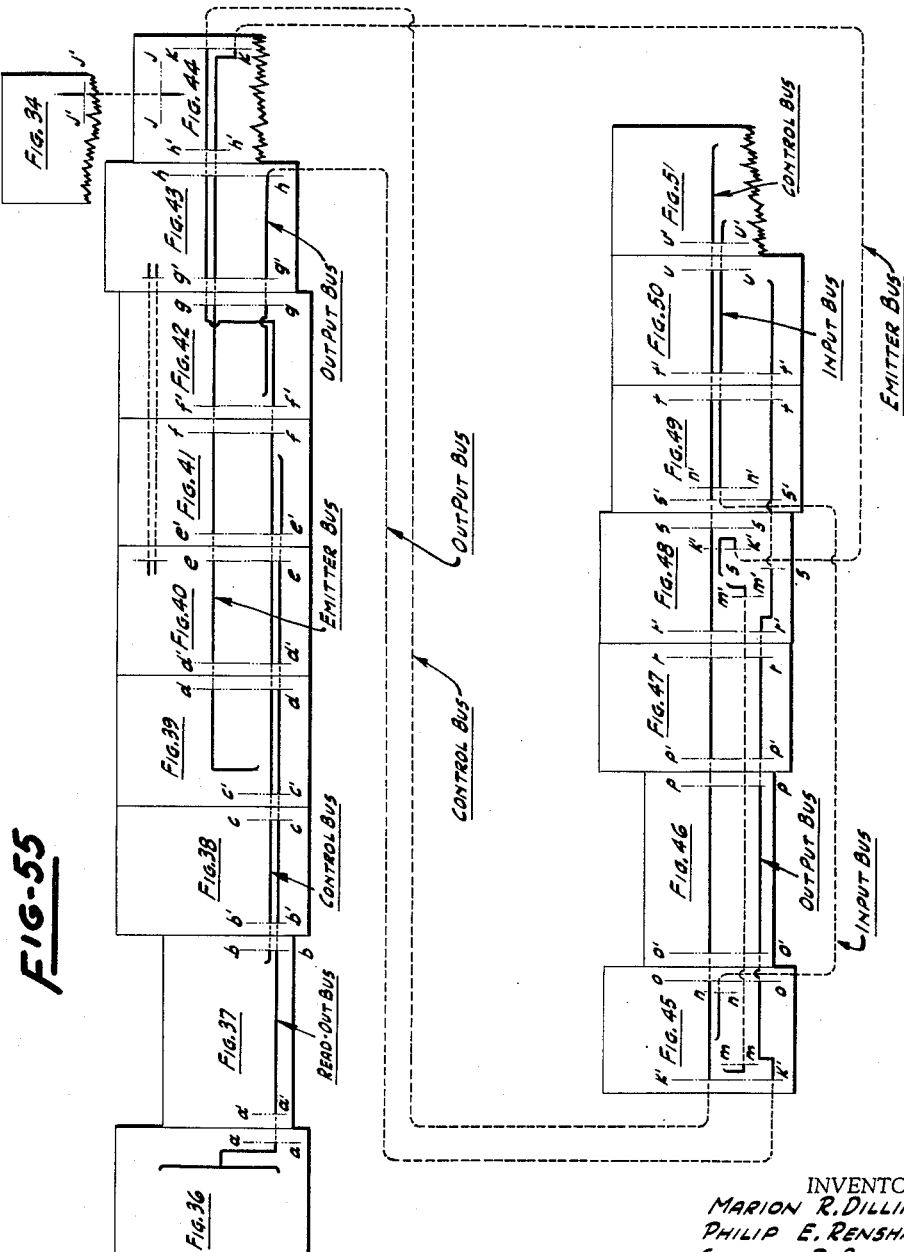

United States Patent Office 3,007,632
Patented Nov. 7, 1961

3,007,632
TYPEWRITER CONTROL OF AN INTERNALLY CYCLING COMPUTER UNIT
Marion Ray Dilling, Philip E. Renshaw, and Stewart D. Barger, Seattle, Wash., assignors to Royal McBee Corporation, New York, N.Y., a corporation of New York
Filed June 25, 1957, Ser. No. 667,870
13 Claims. (Cl. 235—60.12)

This invention relates to automatic accounting devices and more particularly to an electro-mechanical computing device.

It is an object of this invention to provide a combined typewriter and computer unit for accounting purposes, in which the typewriter is used to transfer numerical information into the computer unit wherein such information is handled in addition, subtraction and multiplication processes and in which the numerical results of such processes are fed back to the typewriter to be automatically printed by the typewriter.

It is a further object to provide a combined typewriter and computer unit as stated above in which the typewriter, in its course of ordinary manipulation, initiates command signals to instruct the computer unit to perform its operations.

It is a further object to provide a combined typewriter and computer unit as set forth in the first object, in which the operation of the computer unit is synchronized to the mechanical operation of the particular typewriter used with the computer unit.

Another object of the invention is to provide a combined typewriter and computer unit capable of performing a readout function and in which the computer unit reads out the information contained therein at a rate solely dependent upon the rate at which the carriage of the typewriter is capable of operating.

Another object of the invention is to provide a combined typewriter and computer unit in which numerical information may be transferred from the typewriter in serial order, and in which the information may be transferred within the computer unit in addition or subtraction processes in parallel order from one storage register to another storage register, and in which the information stored in said computer unit may be transferred back to the typewriter in serial order.

A further object of this invention is to provide means responsive to the carriage movement of a typewriter to generate command pulses as said typewriter moves out of one column position and as said typewriter comes to rest in a new column position, said command pulses being used to initiate operation in a computer unit.

A yet further object of this invention is to provide means for closing a particular electrical circuit in accordance with the particular column position of a typewriter, and whereby a different circuit will be closed for each column position of said typewriter carriage.

Another object of the invention is to provide a typewriter and computer unit in which the computer unit is adapted to operate under the influence of primary and secondary command signals and in which the primary command signals are generated by the operation of the typewriter and the secondary command signals are generated by the operation of the computer unit.

Another object of the invention is to provide a computer unit having power-driven relays and counter units, said relays and counters being driven by a common drive shaft, a power-drive means, clutch means to connect said drive shaft to said power-drive means, and means responsive to a command signal from a typewriter to energize said clutch.

A yet further object is to provide a computer unit having power-driven relays and pulse counters driven by a common drive shaft and a secondary command signal generator operated by said drive shaft, said signal generator being synchronized to said relays and counters.

Another object of the invention is to provide a computer unit having counter units adapted to count and store a chain of pulses, and in which said chain of pulses need not be equally spaced in time intervals.

A still further object of the invention is to provide a computer having an emitter capable of receiving a chain of pulses and switching said pulses into different output lines to control the operational transfer of numerical information within the computer.

Another object of the invention is to provide a computer unit having a plurality of relay switches in the operational circuits of said computer unit, said relay switches being adapted to open and close selected circuits, and means to operate said switches only when said circuits are de-energized, to prevent arcing at the contact points of said switches.

Another object of the invention is to provide a computer unit utilizing power-driven relays and pulse counters with circuit means whereby the individual relays and counters are self-orienting in switch position if said relays and counters are replaced by replacement components having an incorrect switch orientation.

A further object of the invention is to provide a computer unit having power-driven relays and counter units driven by a common shaft, a power-drive means, a clutch to connect said drive shaft to said drive means, and means to energize said clutch during the use of the computer unit only when a transfer of information within or out of the computer unit is required.

A yet further object of the invention is to provide a computer unit having switching relays in which the relay switches are operated by the energization of electromagnets and in which said electromagnets are energized from a pulse source, the pulse being passed to the electromagnet through a normally closed switch actuated by said electromagnet, and means to delay the opening of the switch by the electromagnet until after the pulse has ended, whereby the switch may be opened without the interruption of current.

Another object of the invention is to provide a computer unit with a numerical information storing register having a plurality of counter units arranged in decade fashion, and with means to add to, or subtract from said registers and to restore said registers to zero condition.

Another object of the invention is to provide a computer unit having two numerical information storing registers, each register having a plurality of counter units arranged in decade fashion, and in which the counter units of one of said registers have a single set of readout contacts, and means to multiply the contents of one register times the contents of the other register, and in which the product is transferred directly to a third register rather than being stored in a partial product means.

Another object of the invention is to provide a computer unit having operational circuits to perform various transfers of numerical information within said computer unit, means to provide a primary command signal to initiate a particular transfer of information, and means to generate a secondary command signal upon the completion of said transfer, whereby the secondary command signal may be utilized to initiate another information transfer within the computer unit.

Other objects and advantages will become apparent in the course of the following detailed description.

In the accompanying drawings, forming a part of this application, and in which like numerals are employed to designate like parts through the same:

FIG. 3 is a partial side elevational view, partly in section, of the computer unit, taken along line 3—3 of FIG. 2.

FIG. 4 is a cross-sectional view of the computer unit clutch assembly, taken long line 4—4 of FIG. 3.

FIG. 5 is a cross-sectional view of the rebound latch assembly of the computer unit, taken along line 5—5 of FIG. 3.

FIG. 6 is a cross-sectional view of the G-pulse generator of the computer unit, taken along line 6—6 of FIG. 3.

FIG. 8 is a cross-sectional, side elevational view of the pulse counter as viewed along line 8—8 of FIG. 7.

FIG. 9 is a cross-sectional view of the pulse counter as taken along the line 9—9 of FIG. 8.

FIG. 10 is a cross-sectional view of the pulse counter as taken along the line 10—10 of FIG. 8.

FIG. 11 is an isometric detail of the pulse counter static read-out brush.

FIG. 12 is a front elevational view of the pulse counter support, with the pulse counting and switch mechanism removed, to show the details of the static read-out circuits.

FIG. 14 is a front elevational view of a relay used in the computer unit.

FIG. 15 is a side elevational view of the relay depicted in FIG. 14.

FIG. 16 is a front elevational view of a modification of the relay illustrated in FIGS. 14 and 15.

FIG. 17 is a side elevational view of the relay depicted in FIG. 16.

FIG. 18 illustrates a side view, with portions cut away, in phantom and in section of a typewriter, as used with the computer unit.

FIG. 19 is an elevational detail view of the escape plate and loose dog arrangement of the typewriter illustrated in FIG. 18.

FIG. 20 is a side elevational view of the escape plate and loose dog mechanism illustrated in FIG. 19.

FIG. 21 is a detail of the switch operated by the escape plate of the typewriter.

FIG. 22 is a cross-sectional view of the carriage position commutator carried by the carriage of the typewriter.

FIG. 23 is a plan view of the carriage position commutator as viewed along the line 23—23 of FIG. 22.

FIG. 24 is a back elevational view of the brush assembly as viewed along the line 24—24 of FIG. 22.

FIG. 25 is a block diagram of the combined typewriter and computer unit, to illustrate the operation thereof.

FIGS. 28–32 are partial isometric and exploded views of the escapement wheels and associated cams of the emitter relays.

FIGS. 33–52 are the circuit diagrams for the combined typewriter-computer unit, and in which:

FIG. 33 is a circuit diagram of the power supply.

FIG. 34 is a circuit diagram of the G-pulse generator.

FIG. 35 is a circuit diagram of the A-, J- and K-pulse generator.

FIGS. 36, 37 and 38 are the circuit diagrams of the read-out circuits.

FIGS. 39, 40, 41, 42 and 43 are the circuit diagrams for the multiplication function.

FIG. 44 is the circuit diagram for the emitter.

FIG. 45 is the circuit diagram for the shift right circuit, and the C and M keys of the typewriter.

FIGS. 46, 47 and 48 are the circuit diagrams for the A register.

FIG. 49 is the circuit diagram for the B register.

FIG. 50 is the circuit diagram for the C and D registers.

FIG. 51 is the circuit diagram for the web relays.

FIG. 52 is the circuit diagram for the Space and Credit keys of the typewriter.

FIG. 53 is a simplified circuit of the B register illustrating the operation of adding information to the B register.

FIG. 54 is a simplified circuit diagram of the B register illustrating the operation of transferring information from the B register.

FIG. 55 is a diagram showing how the various figures of the drawing should be arranged to completely disclose the invention, with the major buses being shown on the diagram.

GENERAL DESCRIPTION OF OPERATION

Figure 1:
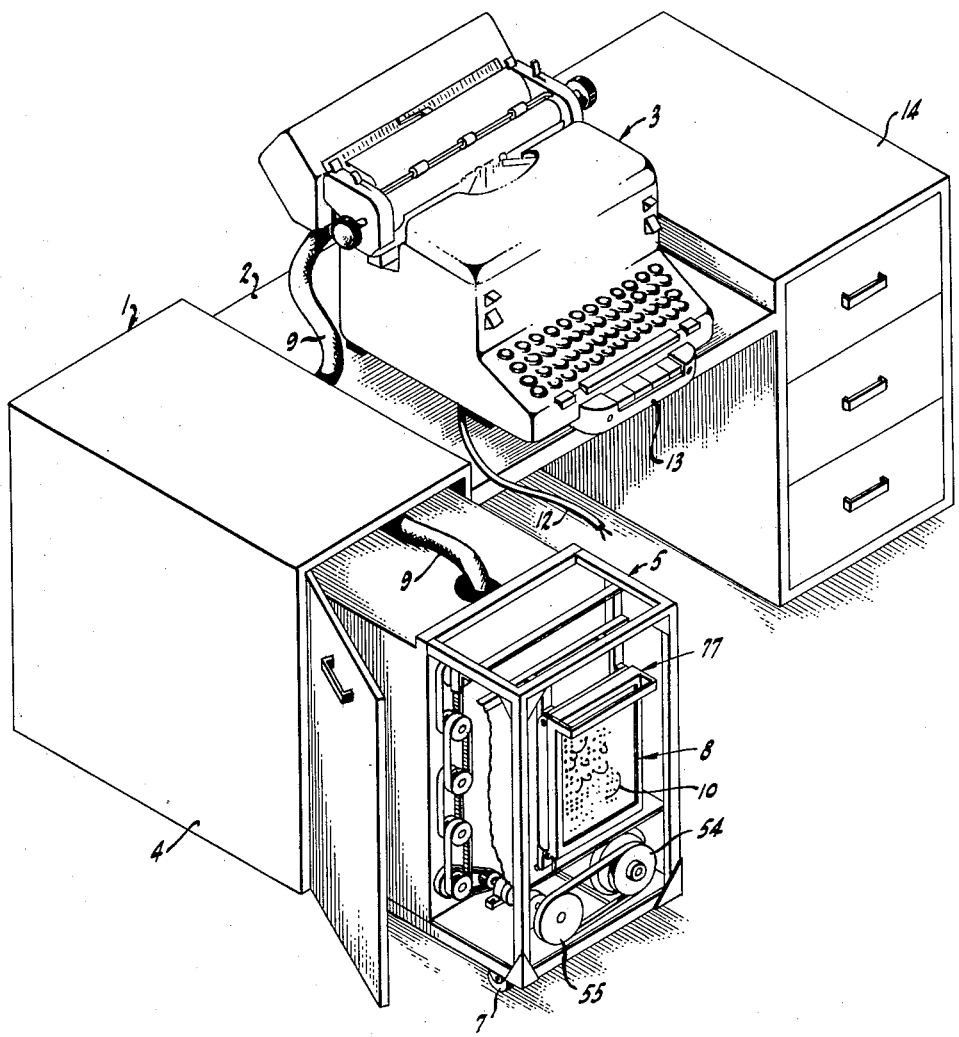
FIG. 1 is an isometric view of the combined typewriter and computer unit.

Referring to FIG. 1, wherein is shown the complete computer, a desk 1 is provided having a central shelf 2 supporting an electric typewriter 3, and a left pedestal 4 housing the computer unit 5. Casters 7 on the bottom of the computer unit enable the computer unit to be easily pulled out for inspection or servicing. Mounted on the front of the computer unit 5 is the control panel 8 providing the operative connection between the typewriter 3 and the computer unit 5. These three elements, the typewriter, control panel and computer unit, comprise the basic operating units of the computer.

A cable 9 provides the electrical connection from the electric typewriter 3 to the control panel 8, the cable terminating at certain hubs of the control panel. Other of the hubs of the control panel lead to different sections of the computer unit, as will be explained, and jumper wires 10 are used to connect the different hubs of the control panel to route the signals generated by the typewriter 3 to different sections of the computer unit 5.

The typewriter 3 has a usual line cord 12 adapted to be plugged into a house line to provide power for the computer. Mounted on the front of the typewriter is a set of switches 13, ganged in such a manner that if one switch is depressed, it will release any of the other switches from its depressed condition. These switches control the power to either or both of the typewriter 3 or computer 5, as will be discussed hereinafter.

The right pedestal 14 of desk 1 is provided for the usual storage purposes.

In general, the typewriter 3 is used to type information on a sheet carried in the typewriter, with the information being sent in the form of electrical pulses to certain hubs on the control panel 8. Jumper wires 10 are then used on the control panel to route the information to the desired section of the computer unit 5. In addition, the control panel 8 is also wired so that the computer unit is ordered what to do with the information being sent to it. That is, the computer unit may be told to add, subtract or multiply the number being sent to it, and to read out the answer back to the typewriter so that the answers may be automatically printed on the sheet.

In addition, the computer unit may be commanded by the tyepwriter to give a "net balance" read out, make a "shift right" manipulation, or make a "half-cent" correction.

When a "net balance" is called for, the computer unit 5 in a read-out operation will test the number stored within itself to determine whether the number is in a positive or negative condition. If the number is negative, an automatic conversion to a positive condition will be made, which, when read out, will be marked with a CR symbol to indicate the negative condition of the information.

The "shift right" manipulation is a means of giving a proper decimal point alignment, in transfers of numbers within the computer unit, or in multiplication. One important use of the shift right is in stating price per hundreds or price per thousands. For example, in a given problem, a price might be quoted as "per each," "per hundred" or "per thousand." If the price is "per each," no shift is required. If, however, the price is "per hundred," the answer must be shifted two places to the right to maintain a proper decimal point alignment, and if the price is "per thousand," the answer must be shifted three places to the right. These operations may be performed automatically in the present computer.

The "half-cent" correction is provided in a multiplication function to round off an answer to the nearest cent.

Referring to FIG. 25 wherein is shown a block diagram of the basic units of the computer, the typewriter 3 generates electrical pulses, corresponding to the numbers typed by the typewriter, which are sent to the control panel 8 in serial form and are passed into the computer unit 5 by the input channel 21 to the A register. Once within the computer unit, the numbers are transmitted in blocks or groups of digits, in parallel, along the internal routes, designated as the output bus 22 and the input bus 23. These two buses form a loop connecting the four registers 35, 36, 37 and 38 of the computer unit 5. To be transferred from one register to another, a number must pass from the first register out to the output bus 22 and around the loop through the shift right 25 to the input bus 23 and into the second register.

The breaks in the channels and buses shown in FIG. 25 represent the various connections which can be made by a proper wiring of the control panel 8. Only if the panel is wired to close these breaks will information pass along the connecting wires.

The A register 35 is a binary ten-place counter and is the only register which may receive numbers directly from the typewriter 3, or conversely stated, all numbers fed into the computer unit 5 must enter into the A register 35. This register will not accumulate a total of all the numbers received by it and the register must be cleared or reset to zero condition to enable it to receive new information.

The B, C and D registers 36, 37 and 38 may be compared with a standard ten-place adding machine, in that they may accumulate totals, adding or substracting successive numbers fed into them. Numerical information may be transferred from the A register to any of these other registers, and from any of these registers to any other, but not back to the A register. Information can be taken only from these B, C or D registers to be recorded by the typewriter 3. These information signals coming from the computer unit 5 to the typewriter are called read-out signals, and, like the input, pass serially over the read-out channel 24, so that only a single typewriter key will be set in action at any one time.

The shift right 25 is used to place the decimal point properly, as will be discussed in more detail hereinafter.

The emitter 26 is controlled from the control panel and is used to generate secondary command signals to transfer numerical information from one register to another.

As an illustration of the flow of information in an addition or subtraction process, the channels and buses are closed as by wiring the control panel 8 to close the contacts 27, 28, 29 and 30. The information signals from the typewriter 3 flow through the control panel 8 into the A register 35; then, via the output bus 22 through the shift right 25 set at normal to shift, along the input bus 23 to the B register 36. At the proper time, the information may then pass out through the read-out channel, to the control panel 8 and the typewriter 3. Whether the transfer from the A register to the B register is to be plus or minus is determined by selection of the proper plug on the control panel 8. Although the example above illustrates a transfer from the A register 35 to the B register 36, the transfer could have been made to either the C or D register 37 or 38 simply by leaving the entry to the B register open (contacts 29) and closing the entry (contacts 31 or 31a) into either the C or D register.

In a multiplication process the flow of information is as follows: For example, suppose a billing operation is to be effected in which the number of items is to be multiplied by the price per item, and the total cost is to appear on the right-hand side of the billing form. The quantity is fed into the A register 35 through the contacts 27 as it is being typed on the bill, and is transferred through contacts 28 to the output bus 22, shift right 25, input bus 23, contacts 29 into the B register 36. This operation will restore or clear the A register. The price per item is then fed into the A register in the same manner, and is sent through the contacts 32 through the time table 33 to the B register 36. The product of A times B passes by the multiplication loop 39 to the output bus 22, passes through the shift right 25, to the input bus 23 and enters the C register 37 through contacts 30. From there the product of the multiplication passes to the typewriter 3 for printing, through contacts 34 and the read-out channel 24.

The A register always contains the multiplier, and the B register always contains the multiplicand. The length of time required for the completion of a multiplication process is a function of the number of digits in the multiplier contained in the A register.

Having thus briefly discussed the general organization of the computer, we may now turn to a description of the specific details of the component parts and of the operative circuitry of the computer.

*Power supply*

Figure 33:
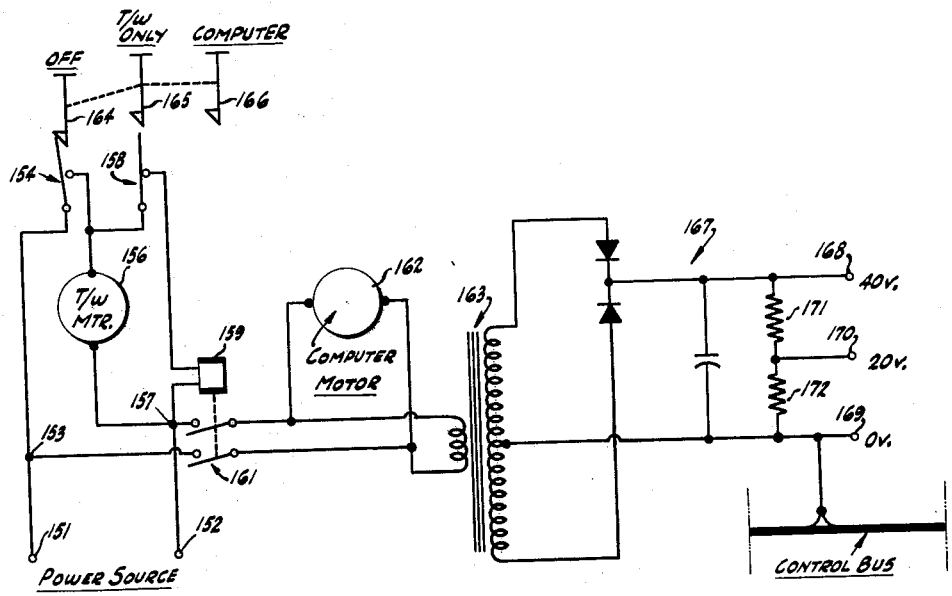

Referring to FIG. 33, the power to be supplied to the typewriter-computer unit is applied by line cord 12 to terminals 151 and 152. The typewriter motor circuit is completed from terminal 151 to junction point 153, through the "OFF" switch 154 to typewriter motor 156 back to junction point 157 and to the other power terminal 152. A lead extends from the "OFF" switch 154 through the normally closed "T/W ONLY" switch 158 to the power relay coil 159 to the junction point 157. The computer power is supplied from junction point 157 through the normally open power relay switch 161 to the parallel connected computer motor 162 and power transformer 163 back through the normally open power relay switch 161 to the other junction point 153.

The "OFF," "T/W ONLY" and "COMPUTER" switch actuators 164, 165 and 166 are all ganged together in a conventional manner such that when one switch actuator is depressed, the other two switch actuators are released to an upper position. In FIG. 33 the "OFF" switch actuator 164 is shown in the depressed position, with the "OFF" switch 154 opening the circuit to the typewriter motor 156 and the power relay 159.

If it is desired to use the typewriter 3 in a normal manner without the computer unit 5, the "T/W ONLY" switch actuator 165 is depressed. The "OFF" switch actuator 164 returns to its upper position and the "OFF" switch 154 closes, applying power to the typewriter motor 156. The "T/W ONLY" switch 158 opens to interrupt the circuit to the power relay coil 159, and thus no power is applied to the computer motor 162 or power transformer 163.

If it is desired to operate the computer, the "COMPUTER" switch actuator 166 is depressed, in turn allowing the "OFF" switch 154 or "T/W ONLY" switch 158 to close, if either had been opened by their respective actuators 164 or 165. With the "COMPUTER" switch actuator 166 depressed, switch 154 is closed to energize the typewriter motor 156, and switch 158 is closed to complete the circuit to the power relay coil 159. The power relay coil closes switches 161 to thus apply power to the computer motor 162 and the power transformer 163.

The secondary of the power transformer 163 is connected to a conventional rectifier circuit 167 and 40 v. D.C. is obtained at the output terminal 168, while terminal 169 is at ground or zero potential. A 20 v. D.C. output is obtained from a terminal 170 connected to the voltage dividing resistors 171 and 172.

In the following drawings and description, it is assumed that the 40 v., 20 v. and 0 v. terminals of the various circuits are all connected to the respective terminals 168, 170 and 169 of the power supply.

MECHANICAL CONSTRUCTION OF THE COMPUTER UNIT

As has been mentioned above, the computer unit 5 is housed in the left pedestal 4 of the desk 1. Referring now to FIGS. 2-6, a frame 51 mounted on the casters 7 supports the computer unit motor 162. A belt 53 driven by the motor pulley 54 is connected to rotate the clutch assembly pulley 55, in turn fastened by set screws 56 to the clutch shaft 57 of the clutch assembly 58. The clutch assembly 58 is adapted to couple the rotative movement of the clutch shaft 57 to the drive shaft 59, journaled for rotation in bearings 61 and 62 mounted on the frame 51.

Fastened on the other end of the drive shaft 59 is a drive gear 63 having mounted thereon a ribbed drive belt 64 in driving engagement with gear 65 mounted on shaft 67 journaled for rotation in frame 51. A second gear 68 is also mounted on shaft 67, and a second ribbed drive belt 69 is provided to transmit the rotative movement of shaft 67 to gear 70 mounted on shaft 71. In a similar manner, additional gears and ribbed belts are provided to drive the shafts 72, 73 and 74, each shaft being journaled for rotation in frame 51 as is shaft 67.

Pinion gears 75 are provided for each shaft 67, 71, 72, 73 and 74, extending from one end of frame 51 to the other, to provide a meshing engagement for the relays and counter components 300 of the computer unit 5, in a manner to be hereinafter described.

Also mounted on the front end of the frame 51 is the control panel housing indicated generally at 77. The details of the housing form no part of the invention, and it is sufficient to state that the housing is a conventional type plug board housing allowing plug boards 8 to be inserted and removed by the operator, with terminals provided on the housing to engage in mating relation the plug holes of the plug board, upon insertion of the plug board in the housing.

The clutch assembly 58 used in the present embodiment is a coil spring clutch. A split collar 80 is mounted on and clamped to the drive shaft 59, so that the collar will rotate with the drive shaft. The collar 80 is provided with a recess 81 to provide an abutment for one end of coil spring 82, this spring being mounted in coaxial relation with the drive shaft, and the clutch shaft 57. The other end of the coil spring 82 engages a recess 83 in sleeve 84 mounted in free rotative coaxial relation to the clutch shaft 57.

As may be appreciated, if the coil spring is wound up, it will not engage the drive shaft, whereas, if the coil spring is allowed to unwind, it will clamp onto both the drive shaft 59 and the clutch shaft 57 and the two will be driven as one unit.

The sleeve 84 carries an ear 85 to enable latch 87 to engage the ear to prevent counterclockwise rotation of the sleeve, as illustrated in FIG. 4. In this position, the coil spring 82 will be wound and the clutch shaft will rotate freely within the sleeve 84 and spring 82.

An electromagnetic clutch coil 88 is carried on the frame 51 in operative relationship to the latch 87, so that when power is applied to the magnet through the leads 89, the latch will be attracted to the magnet, releasing the sleeve 84 for counterclockwise motion under the unwinding urge of spring 82. As the spring unwinds, it will clamp onto the clutch shaft 57, and the constant rotation of the latter will be transmitted to the drive shaft 59.

When the clutch coil 88 is de-energized, the latch 87 will be forced by tension spring 91 into engagement with the sleeve 84 and the ear 58 will again butt against the latch, winding up the coil spring 86 and releasing the clutch shaft 57 from driving engagement with the drive shaft 59.

O-rings 92 provide a resilient bearing for latch 87 to cushion the shock as the latch re-engages the sleeve ear 85. Adjusting screws 93 are provided to adjust the relative position of the clutch coil 88 to the latch 87.

The drive shaft 59 is prevented from rotation in a clockwise direction by means of the rebound latch assembly. Mounted on and clamped to the drive shaft is the split-collar rebound cam 95 having an ear 96 adapted to butt against the rebound latch 97, the latter being pivotally mounted as its center on shaft 98 secured to the frame 51. Tension spring 99 urges the rebound latch into engagement with the rebound cam 95, and a resilient bearing 100 cushions the shock of the ear 96 butting against the latch 97. In operation, when the drive shaft 59 is clutched to the clutch shaft, the cam 95 will rotate in a counterclockwise direction, with the latch 97 riding against the cam surface under the urging of spring 99. When the clutch latch 87 disengages the coil spring 82 from the clutch shaft 57, the drive shaft will have a tendency to rotate in a clockwise direction, but such reverse rotation will be prevented by the engagement of the rebound cam ear 96 with the rebound latch 97.

Figure 3:
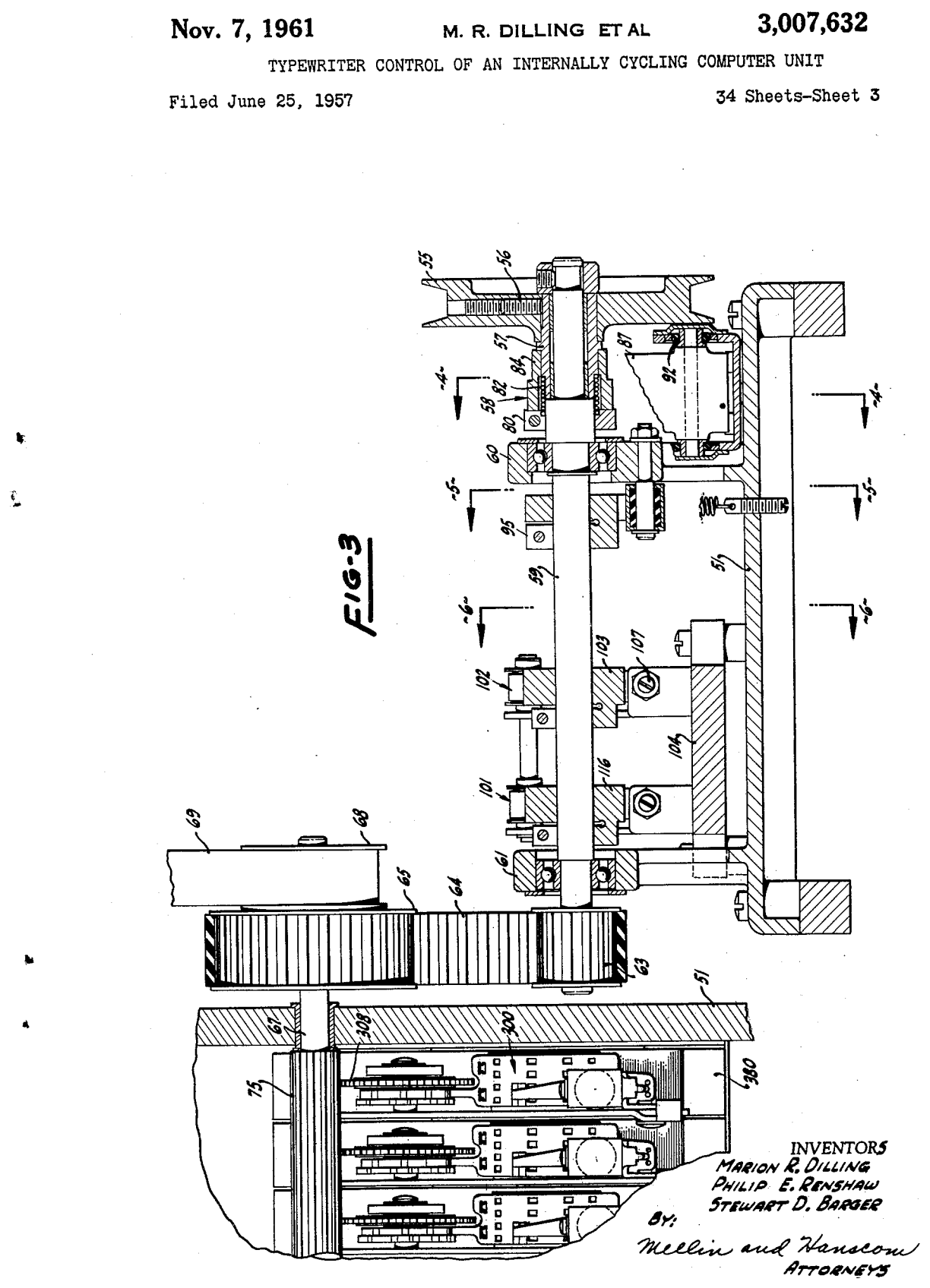

The G-pulse generation circuit breakers 101 and 102 are also mounted in operative relationship to the drive shaft 59, as best shown in FIGS. 3 and 6. These two circuit breakers are identical in structure and only the breaker 102 will be described.

A split collar cam 103 is mounted on and fastened for rotation with the drive shaft 59. An insulating block 104, bolted to the frame 51, carries a conductor bar 105. This bar is provided at one end with a terminal screw 106, and carries at the other end an adjustable breaker point 107. Also bolted to the insulating block 104 is an upright support member 108 having a terminal screw 109. A leaf spring 111 formed from a conductive material extends from the terminal screw 109 around the pivot pin 112 of the breaker arm 113 and connects to the breaker point 114. A non-conductive projection 115 on the breaker arm is urged by the action of the leaf spring 111 into engagement with the cam 103. As may be seen in FIG. 6, the cam is so shaped that the breaker points 107 and 114 will open and close two times for each complete revolution of the cam.

G-PULSE GENERATION

Figure 34:
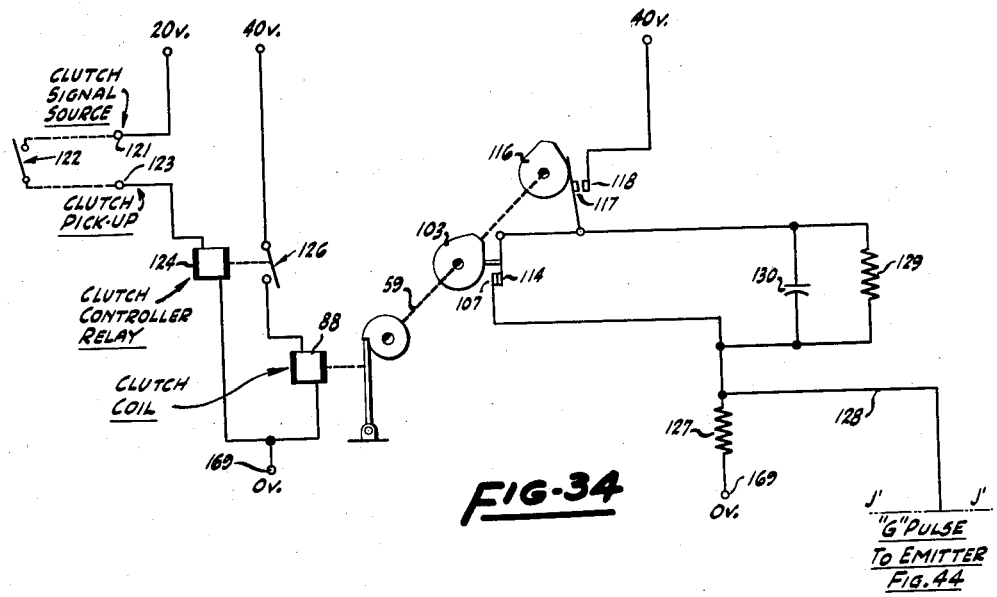

Referring to FIG. 34 the circuits for the operation of the drive shaft and the generation of the "G-pulses" are shown. The G-pulses are those generated by the computer unit and are used as secondary command signals, as opposed to the primary command signals generated by the typewriter.

The 20 volt terminal applies voltage through the "clutch signal source" terminal 121, switch 122, the "clutch pick up" terminal 123 to the clutch controller relay 124. The switch represented by the reference numeral 122 is merely illustrative of one of the various switching contacts located in different components of the computer unit 5, as will be discussed hereinafter. When the switch 122 is closed, the clutch controller relay 124 will be energized to close the switch 126, thereby applying 40 volts to the clutch coil 88. As has been explained previously, this allows the drive shaft 59 and circuit breaker cams 103 and 116 to rotate. The cams 103 and 116 are arranged on the drive shaft so that cam 103 will first close the breaker points 107 and 114, and at a later interval the cam 116 will close the breaker points 117 and 118, completing the circuit from the 40 volt terminal through the breaker points 117 and 118, through the breaker points 107 and 114, and through the load resistor 127 to the zero volt common. Continued rotation of the cams will next cause the breaker points 107 and 114 to open, opening the circuit. For each complete revolution of the drive shaft, two pulses will appear across the load resistor 127, and these G-pulses are then connected by wire 128 to the A5 terminal of the emitter system (FIG. 44), as will be hereinafter discused in connection with the emitter circuits. Resistor 129 and capacitor 130 are connected in parallel across the breaker points 107 and 114 to provide for spark suppression as the breaker points break the completed circuit. Ten G-pulses are generated for each full revolution of one of the counter escapement wheels 301, since five revolutions of the drive shaft 59 are required for a full revolution of one of the counter escapement wheels, as will be explained.

By adjusting the angular relationship of the cams 103 and 116, the duration of the G-pulse can be varied, as the G-pulse occurs in the interval between the closing of the breaker points 117 and 118 and the opening of the breaker points 107 and 114. In the present embodiment, these cams have been adjusted to give a G-pulse duration of seven milliseconds.

RELAYS AND PULSE COUNTERS

The pulse counters and pulse relays 300 designed for use in the computer unit 5 will now be described herein, with particular reference to FIGS. 8 through 17.

Escapement wheel 301 having an axially extending hub 301a is mounted on sleeve 302 for rotation about a fixed axle 303 secured to the unit supporting plate 304. Bolt 305 is threaded into the end of axle 303, so as to allow the sleeve 302 to rotate freely on the axle while yet preventing the sleeve from riding off the end of the axle.

A keyway 306 is provided in the escapement wheel hub 301a, and a cam wheel 307 is mounted on the end of the escapement wheel hub 301a, the cam wheel 307 having a radially and inwardly extending projection 308 adapted to fit within the escapement wheel keyway 306 to lock the cam wheel 307 and ratchet wheel 301 against relative rotation.

A main drive gear 308, adapted to be driven by the pinion gear 75, is mounted on the escapement wheel hub 301a for free rotative movement thereon. The rotative movement of the drive gear 308 is transmitted to the escapement wheel by a friction disc drive, in which friction discs 309 and 310 are mounted on the escapement wheel hub 301a, in a manner similar to the cam wheel 307, the friction discs having formed therewith radially and inwardly extending projections adapted to fit within the keyway 306 formed in the escapement wheel hub 301a. Spring washers 311 and 312, keyed to the escapement wheel hub 301a by radially and inwardly extending projections 313, force the friction discs 309 and 310 into engagement with the drive gear 308.

The friction discs 309 and 310 are held against rotation relative to the spring washers 311 by means of embossed ridges 309a formed on the surface of the friction discs. These ridges 309a are formed in pairs so as to receive the arms of the spring washers therebetween and thus the ridges 309a hold the spring washers against relative rotational movement.

From the foregoing, it will be apparent that if the escapement wheel 301 is free to rotate, a rotational motion of the drive gear 308 will be transmitted by the friction discs 309 and 310 to the escapement wheel hub 301a, and the escapement wheel 301, cam wheel 307, spring washers 311 and 312 and the friction discs 309 and 310 will all rotate as a unit. If the escapement wheel 301 is held aginst rotation, the drive gear 308 will rotate about the escapement wheel hub 301a and will merely rub against the friction discs 309 and 310 without transmitting any rotationay motion thereto.

A pallet lever 314 is provided to latch the escapement wheel 301 against rotation. One end 315 of the pallet lever is adapted to butt against the escapement teeth 316 of the escapement wheel 301. The pallet lever 314 is pivotally mounted intermediate its ends on the lever support 317, mounted on the unit supporting plate 304, and the end 318 of the pallet lever is held by an adjustable stop plate 319, adjustment being had by means of screw 320. An electromagnet 321, which may be designated as the escapement coil of the assembly, is disposed below the pallet lever, with its pole piece 322 in attracting relation to the pallet lever. As the escapement coil 321 is energized, the pole piece 322 will pivot the pallet lever 314 in a clockwise direction about the pivot support 317 and the end 315 will rise out of engagement with the escapement teeth, thus allowing the escapement wheel to rotate under the drive of the main drive gear 308. When the escapement coil 321 is de-energized, the spring 322a will force the pallet lever 314 back into engagement with the escapement teeth 316. The stop plate 319 will limit the counterclockwise rotation of the pallet lever so that the end 315 of the pallet lever will not travel to the root of the escapement teeth.

As has previously been explained, the G-pulse generator is synchronized to the rotation of the escapement wheel 301 so that 10 G-pulses will be produced for each full rervolution of the escapement wheel 301 as the latter is driven by the drive gear 308, which, in turn, is driven by the pinion gear 75, in turn driven by the drive shaft 59 on which the G-pulse generator cams are mounted. By means to be later described, these G-pulses are impressed upon the escapement coil 321 and thus the rotation of the escapement wheel 301 is synchronized to the frequency of the pulses acting to energize the escapement coil, so that the escapement wheel will be turned through one tooth pitch for each pulse impressed upon the escapement coil 321. As is obvious, the time duration of the G-pulse, applied to the escapement coil, must be less than the time required for the escapement wheel to rotate through a single tooth advance. Moreover, the phase relationship of the G-pulses and the escapement wheel rotation is such that if the escapement wheel is being rotated by its drive mechanism, and a G-pulse is received by the escapement coil, the pallet lever 314 will be swung out of the path of the escapement wheel before the lever end 315 can engage the next escapement tooth 316. Thus, if G-pulses are supplied steadily without interruption at a predetermined frequency to the escapement coil while the escapement wheel is being rotated by its drive mechanism at a speed in synchronization with this frequency, the spring 322a will pull the lever 314 down into the path of the escapement teeth 316 as each tooth passes the lever end 315, but the pulse energization of the coil 321 will swing the lever to lift its end 315 out of the path of the escapement wheel teeth before the next tooth reaches the lever. Therefore, the escapement wheel will continue to rotate without interruption, although the lever 314 is oscillated into stopping position each time a tooth passes it.

By thus synchronizing the speed of rotation of the escapement wheel with the frequency of pulses applied to the escapement coil, it is seen that the rotation of the escapement wheel is directly related to the pulse occurrence. If the pulses should be interrupted, the stop end 315 of the pallet lever will not be withdrawn from the path of the escapement teeth as the rotation of the escapement wheel continues, and consequently the vertical face of an escapement tooth will strike the end 315 of the pallet lever to interrupt rotation of the escapement wheel, causing the main drive gear to merely rub against the friction discs 309 and 310 without imparting motion thereto. When the next pulse is applied to the escapement coil, the pallet lever 314 will be withdrawn from stopping engagement with the escapement teeth and the escapement wheel will immediately resume its rotation. To reduce the lag in such resumption of rotation as far as possible, it is preferred that the gears and wheels be made of some very light, though wear-resistant material, such as molded nylon.

Figure 7:
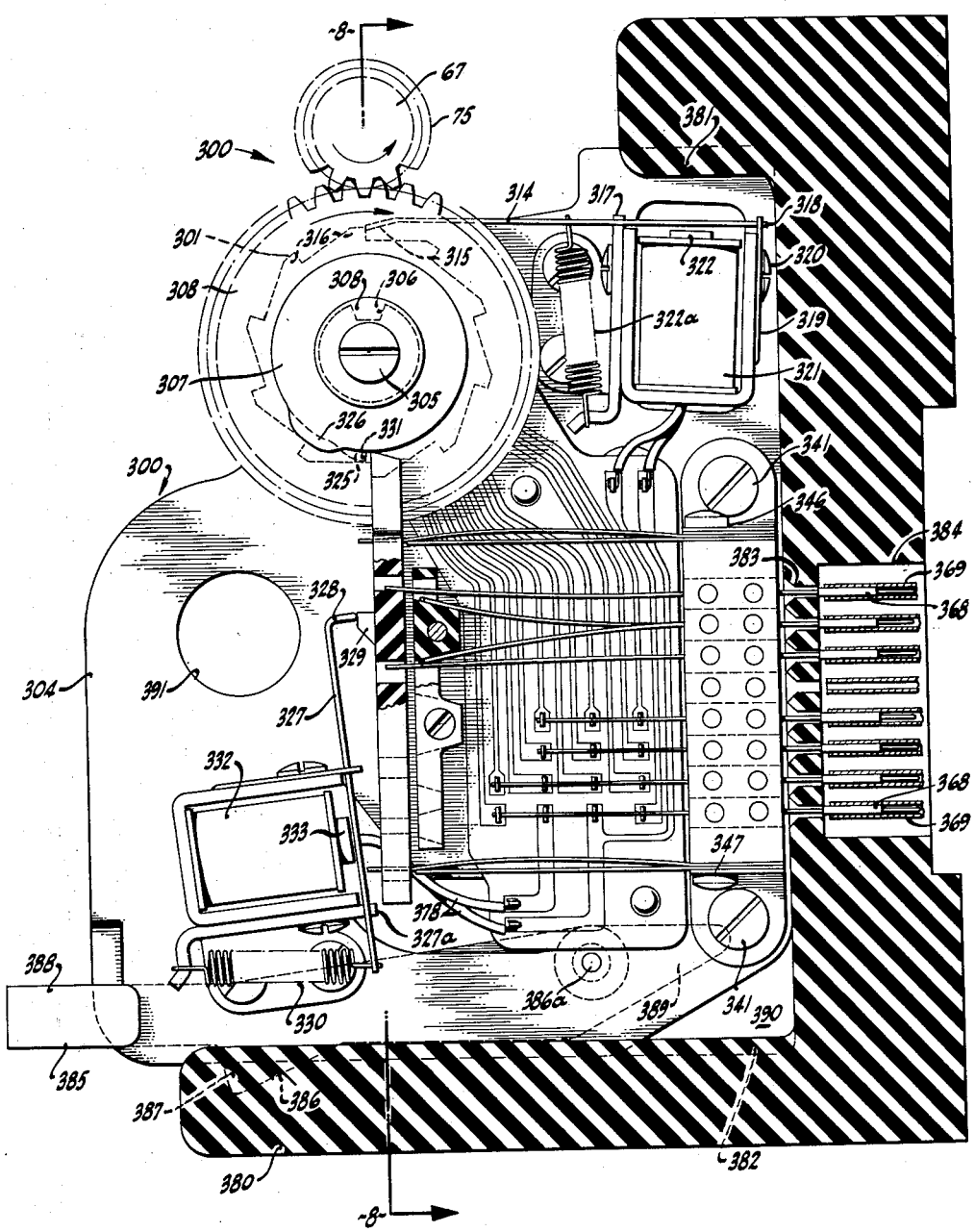
FIG. 7 is a front elevational view of a pulse counter, as used in the computer unit, and shown partially in section.

To utilize the rotation of the escapement wheel 301 thus synchronized with the pulses received by the escapement coil 321 in a pulse counting operation, a cam-actuated switching mechanism is provided. Two switch push bars 323 and 324 are disposed below the escapement wheel 301 and cam wheel 307, respectively, the push bars being urged upwardly into contact with the wheels 301 and 307. The escapement wheel 301 is provided with a cam projection 325 adapted to force the push bar 323 downwardly as the cam projection rides over the upper end of the push bar 323. The cam wheel 307 is also provided with a cam surface 326 adapted to force the push bar 324 downwardly as this cam surface rides over the upper end of the push bar 324. As will be noted from an inspection of FIG. 7, for each full rotation of the escapement wheel 301, each push bar 323 and 324 will be forced downwardly one time. The escapement wheel 301 is shown in FIG. 7 as being in the zero position, and on the ninth pulse the push bar 324 will be actuated, and on the tenth pulse the push bar 323 will be actuated. Since the push bar 324 is actuated on the ninth pulse, it may be referred to as the 9-push bar, and, similarly, the push bar 323 may be referred to as the 10-push bar. The purpose of such timed actuation of the push bars 323 and 324 will become apparent in a later description of the operation of the computer.

It is also desirable, as will be brought out later, that once the 10-push bar 323 has been moved downwardly, it should be latched against movement in an upward direction. Such latching is brought about by means of the latch bar 327 pivoted at 327a, having a relatively horizontal end piece 328 adapted to hook over the projection 329 extending transversely of the 10-push bar 323 by the urging of spring 330. As the 10-push bar 323 moves downwardly, the projection 329 will also move downwardly, allowing the end piece 328 of the latch bar 327 to move in a clockwise direction, the spring 330 retaining the latch bar in engagement with the horizontal projection 329 until such time as the latch bar is returned to its position as shown in FIG. 7. It will be noted that the cam projection 325 on the escapement wheel 301 has an abrupt face 331, allowing the 10-push bar to return to its normal upward position after unlatching, even though the escapement wheel 301 is at rest.

An electromagnet 332, which may be called the unlatch coil, is mounted on the unit supporting plate 304, with its pole piece 333 in attracting relation to the latch bar 327. As the unlatch coil 332 is energized, the latch 327 will pivot in a counterclockwise direction around 327a and the latch end 328 will move out of engagement with the 10-push bar projection 329, thus allowing the 10-push bar 323 to return to its normal upper position.

To illustrate the functioning of the push bars 323 and 324, let it be assumed that the pulse counter is in the position shown in FIG. 7, and that pulses are being applied to the escapement coil 321. The first 8 pulses will cause the escapement wheel 301 to rotate an amount equivalent to 8 escapement teeth. The push bars 323 and 324 will not be operated during these pulses. If one more pulse is applied to the escapement coil, the escapement wheel will rotate an amount equal to one tooth and the cam projection 326 on the cam wheel 307 will force the 9-push bar 324 downwardly, and will hold the 9-push bar in a downward position until another pulse is applied to the escapement coil. As the next pulse is applied, the escapement wheel will again rotate, and the cam projection will move from its position holding the 9-push bar downwardly, and the 9-push bar will thus be allowed to return to its upward position. At the same time, the cam surface 325 will engage the 10-push bar 323, causing it to move downwardly, where it is latched by the latch bar 327. The escapement wheel comes to a rest at the end of the tenth pulse with the cam surface 325 out of engagement with the 10-push bar. With the escapement wheel at rest in its present position, a pulse may be applied to the unlatch coil, allowing the 10-push bar to move upwardly to its normal upward position.

Figure 13:
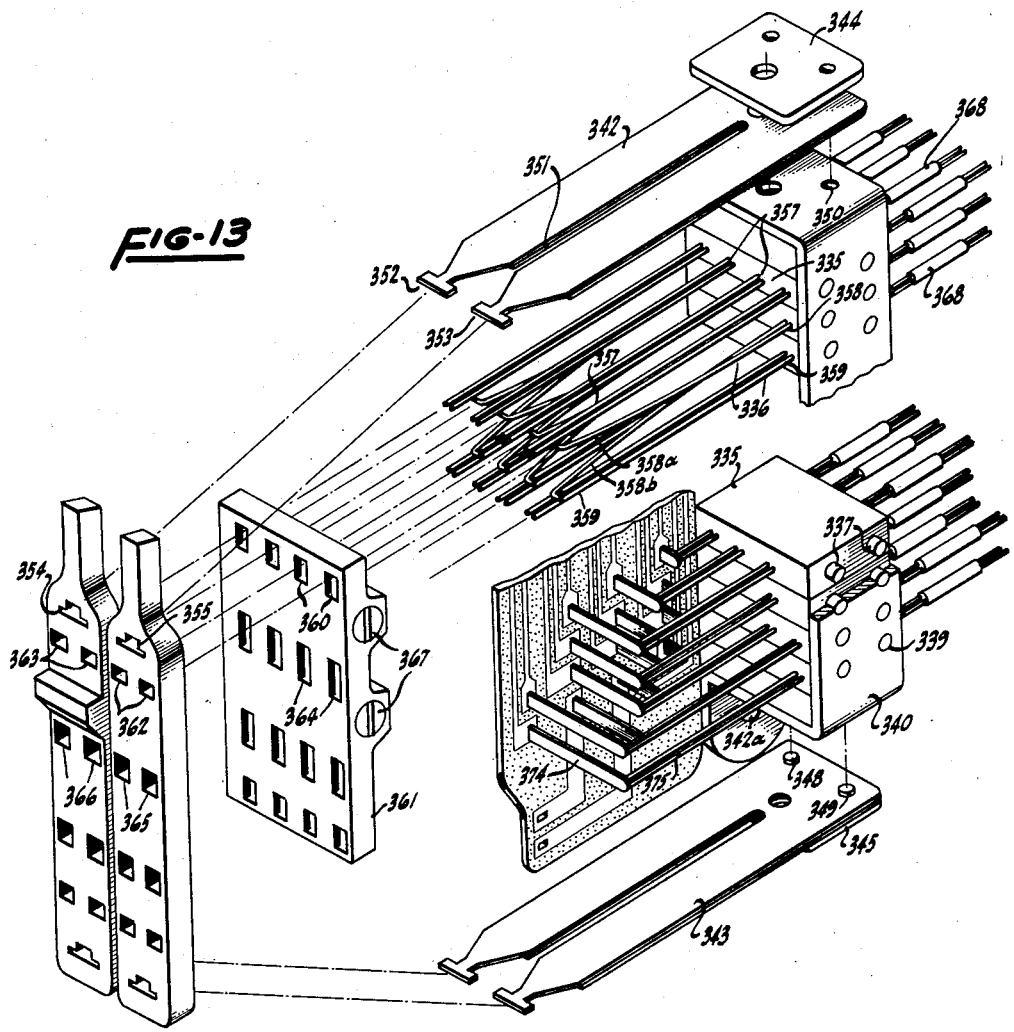
FIG. 13 is an exploded, isometric view of the switch mechanism of the pulse counter.

The longitudinal movement of the push bars 323 and 324 is used to effect switching operations by means to be now described. FIG. 13 shows an exploded view of the switching assemblage, and comprises a plurality of insulating terminal blocks 335 having groups of paired wires 336 extending therethrough. The blocks 335 have raised lugs 337 on either end adapted to fit within holes 338 formed in the unit supporting plate 304 and within holes 339 found in the terminal block bracket 340. As is evident, the terminal blocks are built up with the desired number and are clamped to the unit supporting plate 304 by means of bolts 341 extending through holes 342a found in the ends of bracket 340. Leaf springs 342 and 343 are fixed to the upper and lower ends of the bracket 340 by means of top and bottom face plates 344 and 345 and cap screws 346 and 347. Each face plate 344 and 345 is provided with a pair of bosses 348 adapted to align the holes 349 formed in the leaf springs and holes 350 found in the bracket 340. The upper leaf spring 342 is bifurcated by slot 351, and the free ends 352 and 353 of the leaf spring are adapted to fit within the keyhole-shaped openings 354 and 355 found in the upper ends of push bars 323 and 324, respectively. The lower leaf spring 343 is similarly attached to the lower ends of push bars 323 and 324. The upper and lower leaf springs 342 and 343 bias the push bars towards their upper position in contact with the escapement wheel 301 and cam wheel 307, respectively.

As shown in FIGS. 7 and 13, the upper three terminal blocks 335 each has four sets of double wires extending therethrough. The top sets of wires 357 extend from the top terminal block 335 through the openings 360 in the insulated support block 361 and into the openings 362 of the 9-push bar 324 and openings 363 of the 10-push bar 323. The middle sets of wires 358 are split so that the one wire 358a is received in the openings 360 of support block 361, and the other wire 358b is received in the openings 364 of support block 361. The lower sets of wires 359 extend from the terminal block 335 through the openings 364 of the support block 361 and are received in the openings 365 of the 9-push bar and openings 366 of the 10-push bar. The wires 358a and 358b are bent at right angles at their free ends so that when in position in support block 361, they will provide optimum contact with either the wires 357 or 359. Bolts 367 secure the support block 361 to the unit supporting plate 304.

As is best seen in FIG. 7, when the push bars 323 and 324 are in their normal upper position, the wires 359 will be in contact with the wires 358b to complete an electrical circuit therethrough. When either push bar is depressed, the circuit between wires 359 and 358b will be broken and a circuit will be completed by the contact of wires 357 with wires 358a.

All of the wires thus far mentioned extend through the terminal blocks 335 to the right, as viewed in FIGS. 7 and 13, and are encompassed by electrically conducting sleeves 368, adapted to be received within jacks 369 to connect the wires to the different circuits in the computer unit.

The pulse counter 300 is also adapted to provide a static read out of the relative rotational positions of the escapement wheel. As has been explained, for each pulse applied to the escapement coil 321, the escapement wheel 301 will advance one tooth, or, that is, through 36 degrees. A printed circuit, as shown in FIG. 12, is used to convert the relative angular position of the escapement wheel 301 into decimal information. A non-conductive plate 370 is fastened to the unit supporting plate 304 by means of rivets 371 and has a printed circuit formed thereon in the usual manner, comprising a central annular contact ring 372 and ten segmented contact areas 373 spaced circumferentially of the contact ring. All of the contact areas 373 and the ring 372 are connected electrically by printed circuits to the lower end of the plate 370 and then by means of lugs 374 to wires 375 extending through terminal blocks 335 to connecting sleeves 368. Thus, for each contact area and the ring there is a corresponding contact on the right side of the terminal blocks 335.

Mounted in a recess 369a formed in the escapement wheel 301 is the static read-out brush 370a, illustrated in detail in FIG. 11. The brush comprises two sets of parallel wires 371a and 372a, each mounted on and soldered to shafts 373a and 374a. The straight portion 375a of the brush 370a is adapted to lie within the recess 369a and the reversely curved portions 376a are adapted to ride over the ring 372 and the segmented areas 373, so that for any angular position of the escapement wheel, a circuit will be complete from the ring 372, through the portion 376a of the brush in contact with the ring, through the brush to the other portion 376b and to the particular segmented area 373 with which that brush portion is then in contact.

The escapement coil 321 and unlatch coil 332 are also wired by means of printed circuits to the contacts on the rear of the terminal block 335 in a manner similar to the static read-out circuits. The plate 370 is provided with a cut-out portion 377 to allow room for the unlatch coil leads 378 to be disposed between the unlatch coil and the unit supporting plate 304.

The pulse counters 300 are adapted to be mounted in plastic mounting frames 380 which are disposed in banks along one side of the computer unit, as shown partially in FIG. 3. The mounting frames are provided with a top recess 381 adapted to receive the top rear corner of the unit supporting plate 304, and a bottom recess adapted to receive the bottom edge of the unit supporting plate 304. The rear of the mounting frame has a series of holes 383 formed therethrough adapted to register with the terminals 368 of the pulse counter, so that when the pulse counter is mounted in the mounting frame 380, the terminals 368 will extend through the holes 383 and will occupy a recess 384 formed in the rear of the mounting frame 380. After the pulse counter is in place, the jacks 369 are connected to the terminals 368.

A locking lever 385, pivoted at bolt 386a, is utilized to hold the pulse counter in assembled relation with the mounting frame 380. The frame has a triangular notch 386 formed therein to cooperate with a depending triangular portion 387 of the locking lever 385. As the handle portion 388 of the locking lever is moved downwardly, the triangular lever portion 387 will enter the notch 386 to lock the pulse counter against outward movement relative to the mounting frame 380. To remove the pulse counter from the mounting frame, the handle portion 388 of the locking lever is moved upwardly. The rear end 389 of the locking lever will engage the cam surface 390 of the mounting frame 380, and the pulse counter will be urged outwardly from the mounting frame. A finger hole 391 is provided in the unit supporting plate 304 to provide additional means to pull the pulse counter from the mounting frame.

FIGS. 14 and 15 illustrate a modification of the pulse counter mechanism as modified to provide a relay means, indicated generally at 392. The arrangement of parts is identical to that of the pulse counter 300 except for the following differences. The escapement wheel 301a is again provided with ten escapement teeth 316a, but the escapement wheel 301a is now provided with five cam lobes, spaced equidistantly around the escapement wheel. A single push bar 323a is provided, with the upper end thereof being held in engagement with the escapement wheel. As successive pulses are applied to the escapement coil 321a, the escapement wheel 301a will rotate, as explained above. On every odd pulse, the cam projection 325a will force the push bar 323a downwardly, and on every even pulse, the push bar will be moved upwardly by the leaf springs 342a and 343a, so that as the escapement wheel 301a rotates, the push bar 323a will move alternatively downwardly and upwardly. The movement of the push bar 323a effects a switching action as has been explained in connection with the pulse counter 300.

Another form of the relays used in the present computer unit is shown in FIGS. 16 and 17. The relay, indicated generally by the reference numeral 393, is similar in design to relay 392 shown in FIGS. 14 and 15. The escapement wheel 301b again has ten escapement teeth 316b, but there are ten cam lobes 325b formed on the escapement wheel 301b, so that the push bar 323b will be moved downwardly each time the escapement wheel rotates through a one-tooth advance. As will be noted in FIG. 16, the cam lobes 325b are so related to the escapement teeth that when a tooth 316b is in engagement with the pallet lever 314, the push bar 323b is in its upper position. As the wheel 301b moves through a single tooth advance, a cam lobe 325b will force the push bar 323b downwardly. When the next tooth comes into engagement with the pallet lever 314 to stop the rotation of the wheel, the cam lobe 325b will have cleared the push bar to enable the push bar to return to its normal upper position.

An unlatch coil 332 and latch lever 327 have been added to this relay 393 to latch the push bar 323b in its downward position. Thus, each time the push bar is moved downwardly during a single tooth rotation of the escapement wheel 301b, the latch lever 327 will engage the horizontal projection 329b on the push bar to prevent its upward movement as the cam lobe 323b moves out of engagement with the push bar. A pulse applied to the unlatch coil will then unlatch the push bar for its upward movement, as has been explained previously.

As may be appreciated, alternate energizations of the escapement coil 321 and the unlatch coil 332 are required to move the push bar, and the switch elements carried thereby, in an alternate downward and upward movement. Thus, starting from the position illustrated in FIG. 16, with the push bar in its upper position, a pulse at the escapement coil 321 is required to start the rotation of the escapement wheel 301b and the downward movement of the push bar 323b to its latched position. After having been latched in its lower position, the push bar can only move upwardly if a pulse is then applied to the unlatch coil 332.

This arrangement of switch operating electromagnets has a particular advantage. As has been explained, the energizing pulse applied to the escapement coil 321 must be of a limited time duration, so that the pallet lever 314 may be moved out of engagement with the escapement wheel 301b to allow the latter to rotate, and so that the pallet lever may return to its original position before the escapement wheel has rotated through a one-tooth advance so that the pallet lever may prevent further rotation of the escapement wheel. However, the return of the push bar to its upper position from its latched position does not require any rotation of the escapement wheel, and therefore the time duration of the pulse applied to the unlatch coil 332 can be of any length greater than that required to operate the latch lever 327 by the unlatch coil 332.

A further important feature of the pulse counters and relays described above is the ability of these units to effect switching operations in which the switches, operated by the push bars, are opened only when the circuits, which include those switches, are de-energized. Such a feature is of great importance as it eliminates the possibility of arcing at the switch contacts if the switches were to break a live circuit.

In their use in the computer unit, the switches of the above described pulse counters and relays are utilized in circuits which are energized by the same G-pulses as are used to operate the escapement coils 321. Turning now to FIG. 14, the cam lobes 325a, mounted to rotate in unison with the escapement wheel 301a, are so related to the escapement teeth 316a that if the escapement coil 321 is pulsed to allow the pallet lever 314 to release the escapement wheel 301a for rotation, the cam lobe 325a will actuate the push bar 323a in a downward direction just before the escapement wheel has rotated through a single tooth advance, at which time the rotation of the escapement wheel will be stopped by the pallet lever. Similarly, on the next pulse applied to the escapement coil 321, the escapement wheel will rotate through a finite distance less than a single tooth advance before the cam lobe moves out of the way to permit the push bar to return to its upper position. In either case, the sequence of operation is that the escapement coil is pulsed to allow the escapement wheel to rotate, the cam lobes actuate the push bars to effect a switching operation of the switch elements carried thereby, and the escapement wheel continues to rotate until it completes a single tooth advance.

Since the same pulse is applied to the escapement coil as is applied to the circuits containing the switches operated by the push bar, it is apparent that if the operation of the switch elements by the push bar is delayed until after the pulse has ended, the switches may operate on dead circuits, and there will be no possibility of opening a live circuit with the consequent disadvantageous arcing at the switch contacts. The time relationships required for such operation may be set forth in the following manner. Assuming that $t_1$ is the length of time to energize the escapement coil 321 to move the pallet lever 314, $t_2$ is the time required to rotate the escapement wheel 301a through a single tooth advance, and $t_3$ is the time from the start of rotation of the escapement wheel to the operation of the push bar 323a by a cam lobe 325a, it can be seen that $t_2 > t_3 > t_1$. All of the relays and pulse counters illustrated in FIGS. 7–17 incorporate this principle of operation.

Another feature of the relays and pulse counters, described above, is that the pulses applied to the escapement coil need not be synchronized with the rotation of the escapement wheel. Although such synchronization is preferable, when a chain of pulses is to be counted, since the pallet lever is swung out of the way of the escapement teeth before contact is made, it is not mandatory. For example, assume that a relay is in its normal state, with the pallet lever 314 engaging an escapement tooth to prevent rotation of the escapement wheel. It makes no difference in the operation of the relay, and its switches, whether the first pulse is synchronized to the escapement wheel rotation. In either event, the pallet lever will be moved to allow the escapement wheel to rotate, with the switching occurring after the pulse has ended. The pallet lever will return to its stopping position before the next tooth comes into engagement therewith. The next energizing pulse may be applied to the escapement coil to remove the pallet lever from the path of the next tooth, as when the pulses are synchronized to the rotation of the escapement wheel, or the next pulse may be applied at any time after the next tooth has come to rest against the pallet lever. In either event, whether the pulses are synchronized to the escapement wheel rotation or not, the incremental tooth rotation of the escapement wheel will be directly related to the number of energizing pulses applied to the escapement coil.

Figure 13A:
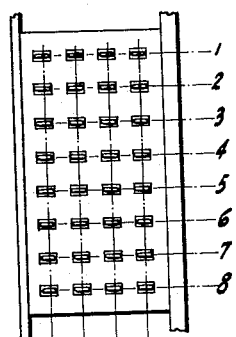
FIG. 13A is a rear view of the relay terminal block showing the terminal designation.

FIG. 13A shows a rear view of the terminal connection 368 of the pulse counters and relays illustrated in FIGS. 7–17. There are thirty-two terminals, in four columns (indicated as A, B, C and D) and eight rows (indicated as 1 through 8). As is obvious, any particular terminal may be designated by its coordinate reference letter and number.

Figure 13B:
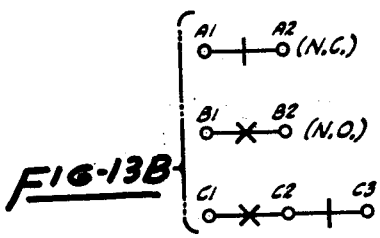
FIG. 13B shows the switch symbol designation of the switches used in the new pulse counters and relays of this embodiment.

FIG. 13B illustrates the symbols by which the wire switches of the pulse counters and pulse relays, illustrated in FIGS. 7–17, are indicated throughout the drawings of the circuits of the computer unit. The upper symbol in FIG. 13B is used to designate a normally closed pulse counter or pulse relay switch. The particular switch is shown as having terminals A1 and A2 on the particular relay of which it is a part. The middle symbol of FIG. 13B illustrates a normally open switch having terminal contacts B1 and B2. Both the A1—A2 and B1—B2 switches illustrated are single-pole single-throw switches. The lower symbol indicates the third type of switch available, a single-pole double-throw switch, having terminals C1, C2 and C3. As shown, the C2 and C3 terminals are in a normally closed relation, while the C1 and C2 terminals are in normally open relation. As the pulse counter or relay operates in a switching operation, the C1 and C2 contacts will close, and the C2 and C3 contacts will open, so that as the counter or relay cycles in operation, the C2 contact will alternately engage the C3 or C1 contact.

TYPEWRITER

The typewriter 3 used with the computer unit 5 is a conventional electric type writer modified for use with the computer unit as will be described in this section, and illustrated in FIGS. 18–24.

Referring to these figures and in particular to FIG. 18, each key of the typewriter functions in the same manner, as, for example, when key 401 is depressed, key lever 402 is pivoted in a counterclockwise direction, with the end 403 of key lever 402 causing the key lever trip arm 404 to pivot in a clockwise direction. The trip pawl 406 moves downwardly to engage the carrier arm pawl release 407, in turn causing the latter to pivot in a counterclockwise direction. This last motion releases the carrier arm trip pawl 408 so that it swings into engagement with the constantly rotating ratchet roll 409. During engagement of the ratchet roll 409 by trip pawl 408, the carrier arm 411 is urged to move towards the left, as shown in FIG. 18, and consequently the type bar lever 412, pivotally connected at one end of carrier arm 411, will pivot around the frame support 413 in a counterclockwise direction, and through the link 414 will cause the type bar 416 to pivot in a clockwise direction into engagement with the platen 417.

In moving to the left, the carrier arm 411 will carry the carrier arm pawl release 407 out of engagement with trip pawl 406, and the left end 418 of the carrier arm trip pawl 408 will strike the center shelf 419 of the carrier arm guide 421, forcing the trip pawl 408 out of engagement with the ratchet roll 409 to allow the carrier arm to return to its original position under the influence of spring 422 attached at one end thereof to frame member 423 and at its other end to universal bar link 424, the latter being connected to the type bar lever 412.

The leftward movement of the carrier arm 411 in addition sets into operation the escapement mechanism whereby the typewriter carriage is advanced. The universal bar link 424 moves leftwardly to cause the universal bar 426 to pivot about frame member 427 and to thus pivot the escape plate 428 about the escape plate screw supports 429 and 430. As shown in FIGS. 19 and 20, the loose dog 432 is shown in the normal "at rest" position, in engagement with the teeth 433 of the escape wheel 434. As the upper part of the escape plate 428 pivots rearwardly, the loose dog 432 will move out of engagement with the teeth 433 of escape wheel 434 and the escape wheel will move in a counterclockwise direction under the normal tension applied to the escape wheel through the carriage rack 436 in meshed engagement with the pinion gear 437 attached to the escape wheel 434. The tooth 433, which was in engagement with the loose dog 432, moves into engagement with the escape plate stop member 438, which had pivoted into engaging position with tooth 433 as the escape plate 428 was pivoted. The loose dog is free to pivot in a counterclockwise direction under the bias of spring 439 against stop member 441.

At the end of the key stroke, the carrier arm 411 moves to the right, as shown in FIG. 18, in turn allowing the universal bar 426 and escape plate 428 to return to their original position by spring means (not shown). The return of the escape plate 428 to its original position allows the escape plate stop member 438 to move out of engagement with tooth 433 and the loose dog 432 to move into position to engage the next tooth of the escape wheel 434, which, after engagement, will force the loose dog 432 to return to its original position, against the bias of spring 439, the loose dog 432 being stopped in its clockwise rotation by adjustable stop member 442.

The above described structure and functioning of the typewriter during a key-stroke operation is conventional. The following modifications have been made to this conventional structure, to adapt the typewriter for use in the present invention. As illustrated in FIG. 18, an electromagnet 451 has been attached by means of bracket 452 to frame member 453 by suitable fastening means. The electromagnet 451 has mounted, in attractive relation thereto, plate 454 pivoted about pivot pin 456, the plate 454 having an upwardly extending arm 457 provided with a lip 458 adapted to engage the lower end 459 of the key lever trip arm 404. The electromagnet 451 is one of the key puller coils to be discussed hereinafter, and, as may be apparent, whenever the electromagnet 451 is energized, the arm 457 will force the key lever trip arm 404 in the same manner as if the key 401 has been depressed, and thus an energizing pulse applied to the magnet 451 will operate the type bar 416 and cause the carriage to advance. A separate electromagnet 451 and key-actuating mechanism must be provided for each key that it is desired to have operated by the computer unit.

A switch assembly 461 is mounted rigidly on frame member 462 by screw 463, the switch assembly being provided with a plurality of stationary switch blades 464 and a plurality of movable switch blades 466, the latter being provided with ganged operators 467 held in abutting relation to cam surface 468 of the type bar lever 412 by the resiliency of the movable switch blades 466. The switch blades 464 and 466 terminate at their bottom ends in connecting terminals 469, enabling the switch blades to be operatively connected into appropriate electrical circuits. As shown, the switch assembly 461 provides a gang of three normally open switches, the switches being allowed to close when the type bar lever is pivoted in a counterclockwise direction on a key-stroke operation. As may be appreciated, the switches of switch assembly 461 may be any combination of normally open or normally closed switches, as may be desired, with the switches being moved to their operative position whenever the key 401 is depressed. The function of the switch assembly 461 will be hereinafter discussed, it being sufficient for the present to state that such a switch assembly may be mounted in operative relationship to any desired type bar lever 412 of any desired key of the typewriter.

Turning now to FIGS. 19, 20 and 21, a loose dog switch assembly 471 is mounted on the escape plate 428 to be operated by the movement of the loose dog 432. A mounting bracket 472 is secured to the escape plate 428 by nut 473 to support switch block 474. A stationary switch blade 476 extends from the block 474 and carries a contact point 477. A movable switch blade 478 is also carried by block 474, the movable switch blade having a contact point 479 normally held away from contact point 477 by the engagement of the upper end 475 of the movable switch blade 478 with the lower end 480 of the loose dog 432. As the loose dog 432 pivots in a counterclockwise direction during carriage movement operation, the contacts 477 and 479 will close, and remain in that position until the carriage has moved to its new column position, and the loose dog 432 is returned to its normal position, opening the switch contacts 477 and 479.

An escape plate switch assembly 481 is also provided for actuation by the motion of the escape plate each time the typewriter carriage advances. The escape plate switch assembly 481 is mounted as by screw 482 to frame member 483, and is provided with a spring biased operator 484 positioned to be engaged by the escape plate 428 as it pivotally moves in a carriage advancing operation.

The escape plate switch assembly is provided with two stationary switch blades 486 and 487, and a movable switch blade 488 disposed therebetween and adapted to be actuated by the operator 484. In the "at rest" position shown in FIG. 21, the switch members 486 and 488 are normally closed, and the switch members 487 and 488 are normally open. As the escape plate pivots against the operator 484, the movable switch blade 488 will move to open the circuit between switch blades 486 and 488 and will close the circuit between switch blades 487 and 488. The switch blades are provided with terminals 489 enabling the switch blades to be operatively connected to desired circuits, as will be hereinafter discussed.

Turning now to FIGS. 22, 23 and 24, a commutator assembly 501 is attached to the rear of the typewriter, in the following manner. A bracket 502 is fastened by suitable screws 503 to one end of the main typewriter frame 500, with a similar bracket 504 being fastened to the other end of the main typewriter frame. Each bracket 502 and 504 extends rearwardly from the typewriter and is provided with a transverse shelf portion 505 and 506, adapted to support a commutator member 507, which is secured to the bracket member 502 by screws 508 extending through slots 509 formed in the commutator member. The commutator member 507 is secured to bracket 504 in the same manner. The slots 509 are elongated to enable the position of the commutator member 507 to be adjusted relative to the brackets 502 and 504, if so desired.

The upper surface of the commutator members 507 is provided with conductive printed circuits, there being formed two longitudinally extending printed bars or channels 516 and 517. The upper bar 516 will be hereinafter referred to as the "A-channel common" and the lower bar 517 will be hereinafter referred to as the "R-channel common." A plurality of vertically extending printed bars or segments 518 and 519 are provided, the bars 518 cooperating with the A-channel common 516, and the bars 519 cooperating with the R-channel common 517, in a manner to be described. Sufficient bars 518 are provided so that each bar represents one column position of the typewriter carriage, and the bars 518 are spaced longitudinally of the commutator member 507 an amount corresponding to the space between the typewriter carriage column positions. The bars 519 are similarly printed on the commutator member 507. Each of the bars 518 and 519, the A-channel common 516, and the R-channel common 517 are provided with terminals 521 extending from the bars and common through the commutator member 507, each terminal 521 having an individual wire 522 connected thereto, the individual wires being cabled together at 523 and 524, and supported by cable hangers 526 fastened by screws 527 to the longitudinal support 511.

Another bracket 531 is fastened at one end by screws 532 to the typewriter carriage, preferably on the tab rack 533 which is an integral part of carriage 534 of the typewriter 3. The other end of bracket 531 carries a brush support 536 fastened to the bracket by screw 537 extending through slot 538 in the brush support. The slot 538 is elongated to allow adjustment of the brush support 536 with relation to bracket 531.

Two sets of brushes are mounted on the brush support 536, one set being used with the A-channel and the other set being used with the R-channel. The A-channel brushes 536a and 536b are mounted on a common conducting plate 539, the latter being secured to the brush support 536 by screw 541. Each brush 537 and 538 is formed of a stiff spring wire formed as shown in FIG. 24 so that it extends downwardly into contact with the upper surface of the commutator member 507. The brush 538 maintains contact with the A-channel common 516 for any column position of the typewriter carriage, while the brush 537 will be in contact with the bar 518 corresponding to the particular column position of the typewriter carriage. The R-channel commutator brushes are mounted in the same manner for the same operation.

Thus it is seen that assuming that the typewriter carriage is at rest at a given column position, a circuit will be complete from the A-channel common 516 through the A-channel brushes 537 and 538 corresponding to the typewriter carriage position. Similarly, a completed circuit will exist from the R-channel common 517 through the R-channel brushes to a particular bar 519 corresponding to the given typewriter carriage position. As the typewriter carriage is advanced, as by use of a key-stroke or spacing operation, the carriage will advance one column position and the brush support 536 will carry the brushes one bar to the left so that the A- and R-channel commons will be in circuit with the next adjacent bar 518 or 519.

A-, J- AND K-PULSE GENERATION

Three types of control pulses or signals are generated by the action of the typewriter 3 for use as primary command signals in the computer unit 5. An A-pulse is generated whenever the typewriter carriage is in motion, as a result of a key-stroke or spacing operation, and a J-pulse is generated whenever the typewriter carriage comes to rest following a key-stroke or spacing operation. The A- and J-pulses are used generally in the computer unit 5 to condition the computer to perform a particular operation, as will be explained hereinafter. A K-pulse may also be generated when the typewriter carriage is at rest, the K-pulse being used in a "read-out" operation to actuate the key puller coils 451 of the typewriter to type out the information stored in one of the computer registers.

Referring to FIG. 35, an A-pulse is generated by the switching action of the escape plate switch 481. The switch blade 483 is connected to the 40 v. power supply terminal 168 and upon closure of the escape plate switch blades 483 and 487, the 40 v. is applied to the output terminal 552. In operation, the output terminal is connected to the A-channel common 516 section of the commutator 501. The duration of the A-pulse is a function of the normal operation of the typewriter; that is, as a key stroke is made, the escape plate 428 will be pivoted to allow the carriage to advance its position, the escape plate returning to its normal position to hold the carriage in its new column position. The duration of the escape plate motion is an inherent factor of each typewriter and thus the duration of the A-pulse may be somewhat different from one typewriter to another. However, differences in A-pulse duration are at no disadvantage in the present device and the computer unit 5 may be used with different typewriters without the necessity for synchronizing the computer unit 5 with the particular typewriter. The average duration of an A-pulse is approximately 15 milliseconds.

A J-pulse is produced when the typewriter carriage comes to rest. The escape plate switch blade 488 is connected to the 40 v. terminal 168 and a circuit is completed through the normally closed escape plate switch contacts 488 and 486, through the normally closed loose dog follower relay switch contacts 553, through the normally closed switches D2—D3 of the RSP relay, B1—B2 of the EC relay, A1—A2 of the WXC relay and A1—A2 of the WXD relay to the J-pulse trigger relay coil 554 and then to the 0 volt terminal 169. When the carriage is at rest, 40 v. is thus applied to the J-pulse trigger relay coil 554, causing the switch 556 to close to apply a 40 v. signal to the J-pulse generator 557. The details of this generator form no part of the present invention, the generator illustrated in block form being a conventional Eccles-Jordan mono-stable multivibrator using transistors V1 and V2, V1 being connected through the J-pulse relay coil 558 to the 20 v. terminal 170, and V2 being directly connected to the 20 v. terminal 170. When the 40 v. is initially applied through the J-pulse trigger relay switch 556, the multivibrator is triggered to permit V1 to pass current for a predetermined length of time to operate the J-pulse relay 558. After the predetermined length of time, the multivibrator action causes V1 to cease conducting and the system returns to its original steady state condition.

The energization of the J-pulse relay 558 causes switch 559 to close, thus allowing the 40 v. appearing on one side of the switch 559 to appear through the normally closed switch D1—D2 of the RK relay to the output terminal 561. In the operation of the computer, this output terminal 561 is connected to the R-channel common 517 of the commutator 501. In the present embodiment, 21 milliseconds has been selected as an appropriate pulse length for the J-pulse.

The loose dog follower relay 562 is used in the present embodiment to prevent any J-pulses from being formed while the carriage is in motion. The escape plate 428 will return to its original position during a carriage advance, but it would be undesirable to allow a J-pulse to be generated until the carriage is at rest. To overcome this, a switch 471 is mounted to be operated by the loose dog 432 on the escape plate 428. As has been explained, the loose dog 432 is actuated during carriage advance and does not return to its original position until after the carriage comes to rest. The switch 471 completes a circuit from the 40 v. terminal 168 through the loose dog switch contacts 477 and 479, through the loose dog follower relay 562 to the 0 volt terminal. The closing of the loose dog follower relay circuit causes the loose dog follower relay switch 553 to open, thus preventing the application of any voltage to the J-pulse trigger relay until such time as the carriage comes to rest to allow the loose dog switch contacts 477 and 479 to open, in turn de-energizing the loose dog follower relay 562 and allowing the loose dog follower relay switch 553 to close.

K-pulses are formed during read-out condition, as will be hereinafter discussed, when the normally open switches D2—D1 of relay RSP and D3—D2 of relay RK are closed. In this latter condition, the 40 v. applied through the loose dog follower relay switch 553 is shunted through the now closed relay RSP switch D2—D1, through the normally closed K-pulse limiter relay switch 563, through the now closed RK relay switch D3—D2 to the output terminal 561. A K-pulse limiter relay coil 564 is connected from the 40 v. side of the K-pulse limiter relay switch 563 to the zero volt terminal 169. This coil 564 is a delay pick-up coil and is designed so that after a delay of 150 milliseconds, the coil will operate to open the switch 563 to interrupt the K-pulse. Under normal conditions, the K-pulses will cause the typewriter to operate well before this 150 millisecond limit is reached, but if for some reason the carriage does not advance, the 40 volts applied to the output terminal 561 will be removed at the end of 150 milliseconds. As will be explained later, the K-pulses are used to operate the key puller coils 451 of the typewriter 3 and the K-pulse limiter relay 564 prevents these key puller coils 451 from burning out if the typewriter jams for any reason.

Conventional spark suppressors, indicated generally at 566 and 567, are provided to suppress the sparking at the points of the escape plate switch.

As may be understood from the foregoing, the generation of the A-, J- and K-pulses is a function of the inherent carriage advance mechanism of the particular typewriter used with the computer unit. That is, these pulses are generated as quickly or slowly as the particular typewriter is capable of operating. A typewriter having an inherently slower acting carriage advance action will take longer to move from one carriage column position to the next than will a typewriter having an inherently fast action. As will be explained later in greater detail, the A-, J- and K-pulses are used to control the computer unit in its different operations. There is a distinct advantage obtained by utilizing the typewriter itself as a source of command signals, for then it is the particular typewriter used which controls the speed of operation of the computer, and there is no need to synchronize the typewriter with any external computer command signal cycling device, if it is desired to change typewriters, or if the particular typewriter chosen for use becomes somewhat sluggish during normal usage.

It will be noted that the circuitry of the A-, J- and K-pulse generator is designed so that there will be no sparking at the brushes 537 of the commutator assembly 501, as the brushes move from one carriage indicating segment 518 and 519 to the next. For example, in consideration of the A-pulse generation, the typewriter carriage will be at rest and the commutator brushes will be in contact with the A-channel common 516 and the printed bar 518 corresponding to the carriage column position. The A-pulse will be generated as the escape plate switch 481 is actuated by the initial movement of the escape plate 428. This initial movement of the escape plate does not allow the typewriter carriage to advance into the next column position, as the movement of the carriage is limited by the escape plate stop member 438, and the A-channel brush remains in electrical contact with the particular column indicating bar 518. Full movement of the carriage to its next column position occurs only when the escape plate pivots back to its original position. However, this return of the escape plate opens the switch members 487 and 488 to terminate the application of voltage to the A-channel common, before the commutator brush 537 clears the printed bar 518 to which it is in contact as the brush moves to the next column position indicating bar. This limitation of the application of voltage to the A-channel common 516 for periods when the brush 537 is in electrical contact with a single column indicating bar 518 thus prevents any sparking at the brush as the commutator brush moves from one typewriter carriage column position to the next.

Similarly, the J- and K-pulses are applied to the R-channel common 517 only when the commutator brush is in contact with a single carriage column indicating bar 519. As has been mentioned above, the loose dog follower relay 562 prevents any application of voltage to the J-pulse generator until the typewriter carriage comes to rest in a column position, and thus delays such pulse generation until the R-channel brush is in contact with the corresponding column indicating bar 519. Similarly, K-pulses will be prevented from occurring until the typewriter carriage is at rest. The J-pulse length has been selected so that it will terminate before the carriage can move to the next column position, and thus the J-pulse is removed from the R-channel common 517 before the commutator brush moves from contact with the bar 519 to the next column position indicating bar. K-pulses are terminated by the opening of the escape plate switch 481, which opens in response to the initial movement of the escape plate 428. As explained above, this initial movement of the escape plate 428 does not allow the commutator brush to move out of contact with the particular bar 518 with which it is in contact, and thus there is positive assurance that the K-pulse will be terminated before the commutator brush moves out of contact with the particular column indicating bar 519 and into contact with the next such bar 519.

THE CONTROL PANEL

The computer unit is operated by the primary electrical impulses generated by the typewriter. As we have seen, these impulses may originate as A-pulses, generated as a result of a key stroke in a given position; or as J- or K-pulses generated as a result of the typewriter carriage coming to rest in a given column.

Figure 26:
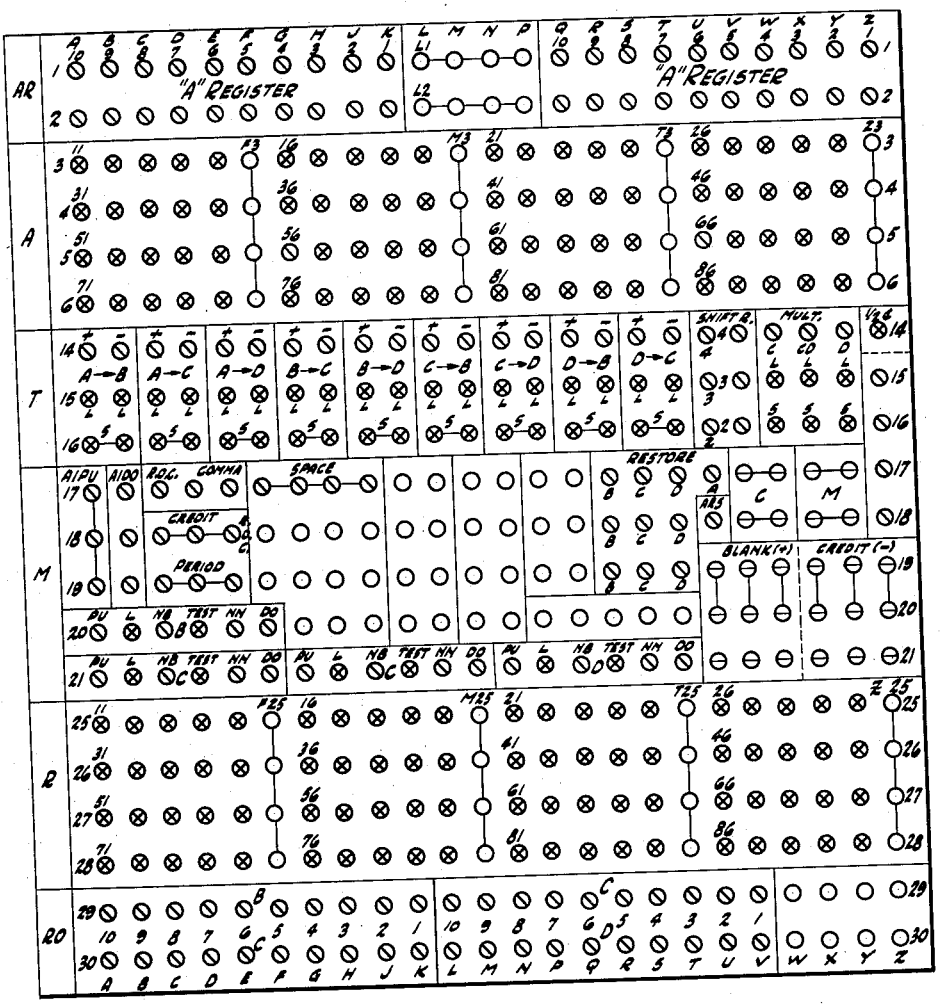
FIG. 26 is a chart of the face of the control panel.

These pulses are made available to the computer unit by means of the removable control panel, the face of which is shown in FIG. 26. The control panel has a series of horizontal rows of plug holes, or hubs, represented by the coordinate reference numbers 1–30 on the sides of the panel, and by the reference letters A–Z on the top and the bottom of the panel, each hub being adapted to receive jumper wires, whereby the various hubs may be interconnected. Thus, a designation of "CP 25-G" would refer to a control panel hub in row 25 and column G, thus identifying the hub on the control panel, shown in FIG. 26, marked 16 in the R bank.

Each hub has a contact point (not shown) on the rear of the panel to mate with a corresponding contact point on the control panel frame 77, enabling the wiring to be permanently wired to the control panel frame, with these wires being electrically connected to the control panel when it is inserted in the frame. The removability of the control panel is a distinct advantage, as several different control panels, each being jumper wired for a particular computer program, may be inserted into the computer and the computer may thus be conditioned for different operations without the necessity of rewiring a single control panel each time it is desired to change the function of the computer.

Although each hub is physically identical, the different hubs have been distinguished in FIG. 26 by different symbols: exit hubs ⊗, entry hubs ⓓ, conditional hubs ⊖ and junction hubs ○.

An exit hub makes an electrical pulse from the typewriter (an A-, J- or K-pulse) or the computer (a G-pulse) available at the control panel, to be directed where it is needed. An entry hub leads a pulse in to a particular part of the computer. Thus, a connection will always be made from an exit hub ⊗ to an entry hub ⊙. Such a connection may, however, be made through a conditional hub ⊖, which makes possible a greater control of the circuits on the panel, but which actually merely relays a pulse which has come originally from an exit hub and must go eventually to an entry hub.

Banks A and R each contains 80 exit hubs, wired directly from the 80 carriage position of the typewriter, the A-bank hubs being wired to the A-channel bars 518 of the typewriter commutator, and the R-bank hubs being wired to the R-channel bars 519 of the commutator, and are numbered 11 to 90, indicating the successive column positions of the typewriter. The electrical pulses coming from the typewriter, which are used to effect nearly all of the operations of the computer, are made available on the control panel at these hubs, and must be drawn from either the A or the R banks. The impulses appear at these hubs automatically as the conditions generating them are created in the typewriter, but unless a connecting plug carries them to an entry hub elsewhere on the control panel, they die there.

The difference between the A and R banks lies in the different times at which the impulse for each bank is generated. Those impulses to be taken from the A bank originate when a key is struck and thus become available as A-pulses as the carriage leaves a column position. For example, an A-pulse will appear at hub 26 (CP 3–U) if a key stroke has been made in typewriter carriage position 26.

The impulses appearing at the R section hubs occur automatically at each hub as the typewriter carriage moves from one position to the next, and become available as the carriage comes to rest in a position. Thus, the J- and K-pulses are available at the R-bank hubs.

There are in each of the A and R banks four groups of junction hubs, numbered F3, M3, T3 and Z3, and F25, M25, T25 and Z25, which may be used to extend the number of exit or entry hubs as needed. For example, if the A-pulse appearing at hub 18 of the A bank must be transmitted to more than one entry hub to effect an operation, it may be plugged from the hub 18 to one of the junction groups and may then be plugged from any of the other hubs of that group to the desired entry hubs.

The hubs of the AR bank are all entry hubs, and provide means for entering numbers from the number keys on the typewriter into the A register. In transferring a signal from the A bank to the AR bank, the carriage position is translated into a digit position in the A register. For example, if the number "2915," typed in carriage positions 11, 12, 13, and 14 of the typewriter, is to be fed into the A register, the FIGURE 2 must be plugged from the column 11 hub to the thousands digit position, or hub 4 (CP 1–G), in the AR bank. The example will serve to illustrate the principle involved in entering a number into the A register, but it must be remembered that hub 4 (CP 1–G) in the AR bank is not always nor necessarily the thousands digit position. If the number were 2.915, the 2 might still be entered into hub 4 (CP 1–G), which then would be a units position. The actual hub to be chosen depends upon the definition of the number field when planning the program.

It should be noted that there are four separate groups of ten digit positions each, numbered from left to right. Thus, four ten-digit entries may be made into the A register from four different typewriter carriage fields (successive carriage positions used for a column of figures) on one control panel set-up.

There are, in the M bank, two sets of hubs affecting A register operation. These are marked AIPU and AIDO, at the extreme left of the panel. AIPU stands for A Register Input Pick-up, and means simply that the connections necessary to admit information into the A register have been made. AIDO stands for A Register Input Drop-out, and means that these same connections are broken and the A register will not receive information. The AIPU is usually plugged from the R bank—in the example above, column 11 hub (CP 25–A) of R bank would be plugged into one of the common AIPU hubs, which, as the typewriter carriage came to rest in the 11th column position, would make the connections necessary to send information into A register, so that when the figure 2 key was depressed and an impulse appeared at column 11 hub (CP 3–A) of A bank, the A register would already be set to receive it.

Transfers within the computer are controlled by the transfer hubs in bank T. There are nine groups of hubs, each of which makes possible a different transfer. The first three on the left will effect a transfer from the A register to either the B, C, or D registers. The two groups immediately to the right of these will effect transfer from the B register to either the C or D registers; the next two effect transfers from the C register to either the B or D registers; and the last two will transfer numbers from the D register to either the B or C registers. The transfer effected by each group of hubs is indicated on the panel. Thus, a number can be transferred from A register to any of the other three; and numbers can be transferred between these three as desired.

There are six hubs in each transfer group—three pairs, one above the other. Of the top two hubs in each group, the one on the left is marked plus (+), indicating a transfer for addition; that on the right is marked minus (−), indicating a transfer for subtraction. To effect a transfer it is necessary only to plug the pulse used for the last entry into A register into either the plus or minus entry hub in the proper bank T group.

The second pair of hubs in each group, marked L, are exit hubs which emit the same signal that initiates the transfer, in case it is necessary to route this pulse further to effect another operation. The two common hubs at the bottom, marked S, emit a signal immediately after completion of a transfer, to be used in case the succeeding operation is dependent upon the transfer having been accomplished.

Multiplication also is effected through a group of hubs on the right in bank T, marked MULT. A signal directed to one of the three top entry hubs (C, CD or D) in this group will call for multiplication of the number in the B register by that in the A register, and will route the product into either the C register alone, both of the C and D registers, or into the D register alone, as indicated by the letters beside each entry hub. The L and S hubs in this section operate in the same manner as those in the transfer groups, having the same time difference in the pulse transmitted, that is, the L hubs emit a signal at the beginning of multiplication, and the S hubs emit a signal when multiplication is completed.

The shift-right hubs (SHIFT R) to the left of the MULT group are used to instruct the computer, on a given transfer or during multiplication, to shift the decimal point to the right, either 4, 3, or 2 positions as indicated.

On the extreme right of bank T is a group of five hubs, one above the other. The top exit hub is marked ½¢; the four entry hubs below are numbered from 4 to 1. This group permits adjustment of the product of multiplication to the nearest half cent in either the first, second, third, or fourth position of the product register, as required by the problem.

Numbers having been entered into the computer and the necessary calculations and transfers having been made, the only problem remaining is that of reading out the answers to the typewriter, to be recorded on whatever form is being used. Read out is directed through the hubs in the M bank and the RO bank. The entry hubs of the RO bank are connected with the B, C, and D registers as indicated, and take their signals from the R bank, in the same way that the AR hubs take pulses from the A bank. But since the object is the removal of information from these registers, rather than putting it in, there is only one set of ten digit-positions for the B register, one set for the D register, and two for the C register, each marked with the appropriate letter. A plug wire, for example, from the column 76 hub (CP28–G) of bank R to position 4 of the B register in the RO bank would carry a signal into the B register as the typewriter carriage came to rest in column 76, which would cause the number in that position of B register to be printed in that column—provided that the register has been readied for read out.

This is done through the read-out controls, one for each register, on the lower left-hand side of M bank. The PU hub for pick-up, conditions the given register for read out just as the AIPU hubs condition the A register to receive information. The exit hub marked L provides a signal pulse to be transmitted to the highest digit-position in the RO bank to be read, and initiates the read out which will then proceed on the basis of signals direct to the RO register-digit-positions from the R bank. The DO hub, for drop out, at the other end of the control group, shuts off the register again, so that read out will not occur accidentally, just as was done with the AIDO hubs.

The remaining hubs in the read-out control sections in the M bank control special operations. The three hubs marked NB, TEST, and NN control the test for Net Balance. If a Net Balance is desired, the exit hub TEST is plugged to the entry hub NB. If it is not wanted, TEST is plugged to NN. TEST must be plugged to one or the other. If requested, the register picked up is tested for positive or negative condition and, if negative, the negative condition is converted to a positive condition and the answer labeled "CR" in the read out.

The Read-Out Conditioned group (R.O.C.) above the read-out controls comprises two groups of three common entry hubs, marked PERIOD and CREDIT. A signal wired into one of these hubs will cause the typewriter to print a period or the credit sign, but only if a read-out control register has been picked up.

Directly above the three credit hubs are three RO Conditioned hubs marked from left to right: ROC, an unmarked hub, and COMMA. If commas are desired in the read-out field a signal is wired from the appropriate position in bank R to the ROC hub. A wire is then plugged from the unmarked hub to the comma hub. Thus, if ROC has been called, a comma will print in whatever position is wired. The ROC hub can, of course, be expanded by use of a bus, enabling the printing of more than one comma during read out.

The four common entry SPACE hubs to the right of the RO Conditioned group will, when signaled from a given column position in R bank, cause an automatic space in that column.

The RESTORE group of entry hubs at the right in the M bank makes it possible to restore any register to zero position. There are three hubs for each of the B, C, and D registers, arranged vertically, and one hub for the A register. The A register normally restores itself after each transfer or multiplication. This automatic restoring can be suppressed by directing a signal into the ARS entry hub. If this is done, the A register will restore automatically after the second transfer or multiplication from the register.

The C and M conditional hubs are connected to the C and M keys of the typewriter, respectively, and are used to call for a shift right to adjust for price per hundred (C) or price per thousand (M), and operate similarly to the blank and credit keys explained earlier.

The Read-Out connections will be explained in more detail in the following description.

A REGISTER

Figure 47:
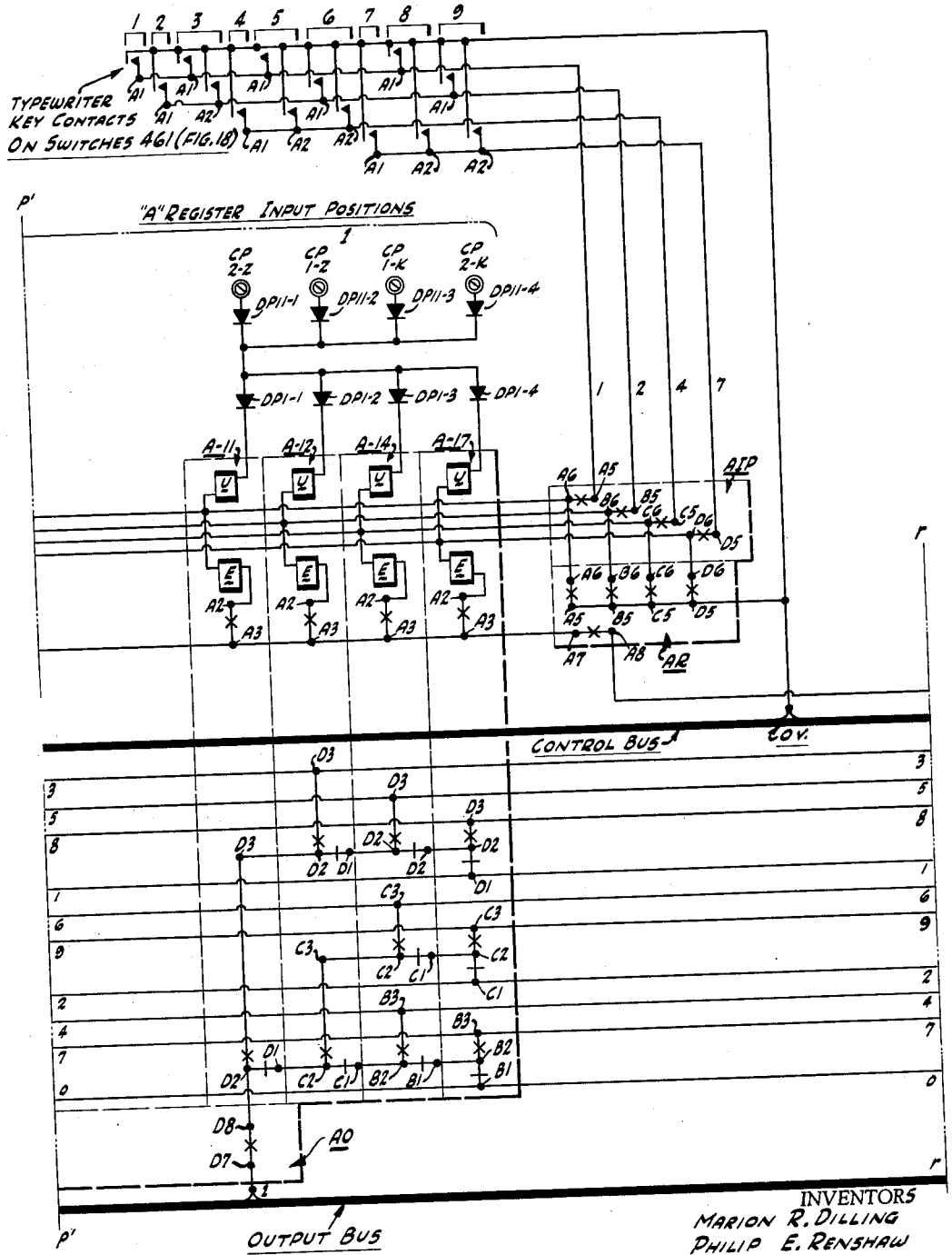
Figure 48:
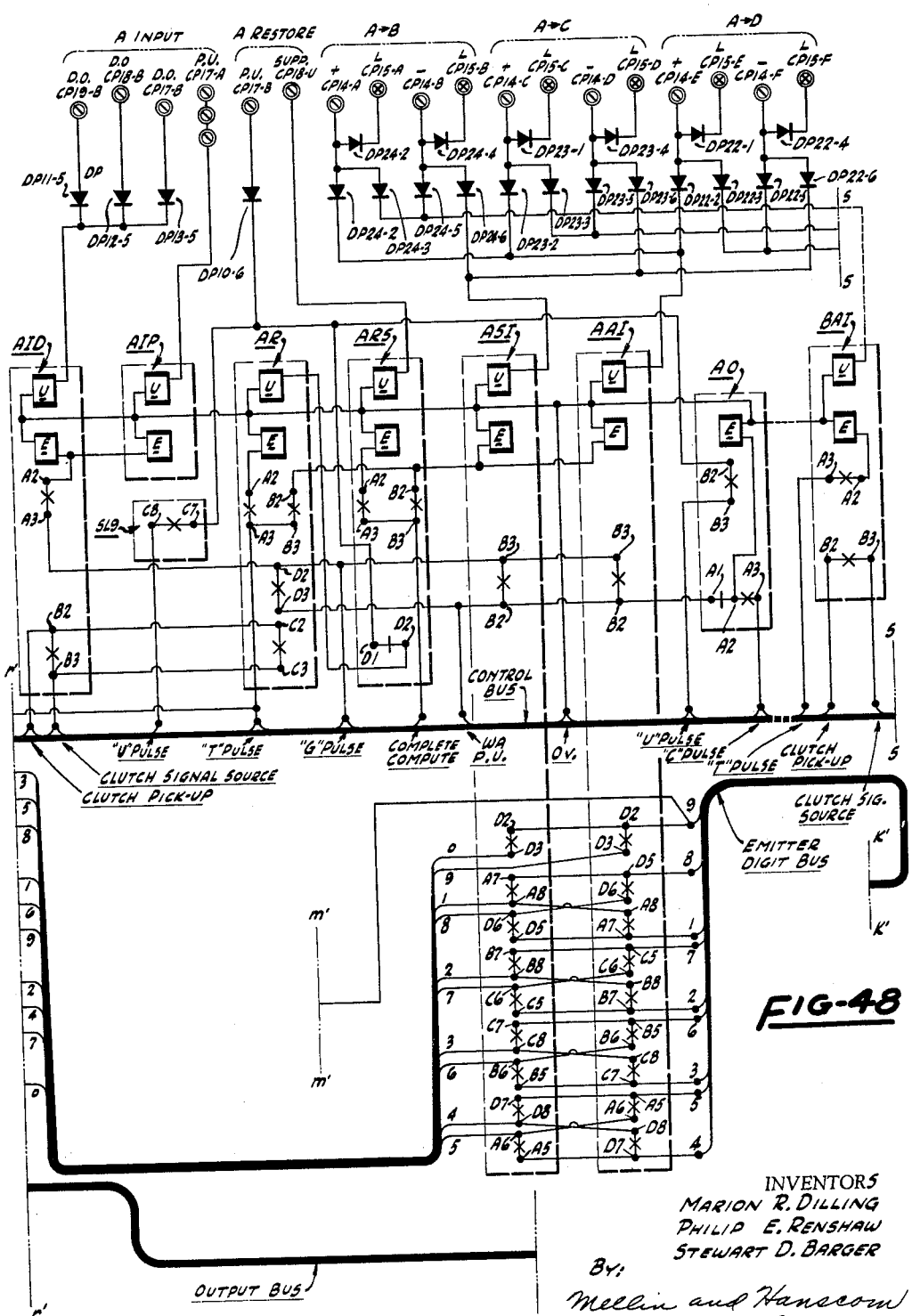

The A register 35, illustrated in FIGS. 46, 47 and 48, is used whenever it is desired to introduce numerical information into the computer from the typewriter. The A register is designed to accept binary information only, and for that reason the A register is not capable of accumulating information. The numbered keys 401 of the typewriter 3 are arranged to close sets of switches 461 upon depression of each key which converts the number of the key into binary information to be transferred into the A register.

Each position of the A register comprises four relays, of the type illustrated in FIG. 16, enabling each position to receive and store the binary information received from the typewriter. As the A register in this particular embodiment was designed to allow a 10 digit figure to be stored, 10 positions, or 40 relays, are required in the A register. However, for the purposes of simplicity, the drawings show only the first, second, third and tenth positions, as the wiring for the other 6 positions is identical to those illustrated.

The purpose and function of the elements in the A register may be made more clear if we follow a typical information storing operation. Let it be assumed that the figure "157" is to be put into the A register, and let it be further assumed that the figure "157" will be typed when the typewriter carriage is in column positions 21, 22 and 23, and that it is desired to condition the computer unit to receive the information when the carriage reaches the 21st column position.

Under the assumed conditions set forth, the following plug connections will be made on the control panel (FIG. 26). A jumper wire will be plugged from the 21st carriage position of the R bank CP 25–N, to the AIPU (A Register Input Pick-Up) hub, CP 17–A. This will enable the J-pulse, generated by the typewriter carriage coming to rest in the 21st column position, to be made available at the AIPU hub. Connections will also be made from hubs CP 3–N to CP 1–H, CP 3–P to CP 1–J and CP 3–Q to CP 1–K. These connections enable the A-pulses, generated as key strokes are made in the 21st, 22nd and 23rd carriage positions, to be made available at the third, second and first A register input positions, respectively.

With these connections made, and referring to FIGS. 46, 47 and 48, the typewriter carriage is moved into the 21st column position. The J-pulse appearing at the AIPU hub, CP 17–A, is directly connected to the unlatch coil of the AIP relay, to energize the unlatch coil and to actuate its associated switches (FIG. 47), thereby connecting the A register input relays through the typewriter key contacts to the zero volt line of the control bus.

With the typewriter carriage in the 21st column position, the "1" key is depressed, in turn closing the contact A1 associated with that key. The A-pulse, generated by the movement of the carriage in response to the key stroke, appears at hub CP 1–H, passes through the diode DP3–1 to the unlatch coil of the A31 relay. The other side of this unlatch coil is connected through the now closed contacts A5—A6 of the AIP relay, through the now closed A1 contact associated with the "1" typewriter key, and to the zero volt line. This completed circuit causes the A-pulse to energize the unlatch coil of the A31 relay to actuate the A31 relay switches. The A32, A34 and A37 relays are unaffected as there is no completed circuit to the zero volt line.

Following the typing of the "1," the typewriter carriage automatically moves to the 22nd column position, and the "5" key is now struck, closing the A1 and A2 switches associated with that key. The A-pulse generated by the typing operation appear at hub CP 1–J, and two completed circuits are made to the zero volt line. The first circuit is completed through the diode DP 2–1, the unlatch coil of the A21 relay, the now closed contacts A5—A6 of the AIP relay, the A1 switch of the "5" typewriter key to the zero volt line. The second circuit is completed through the diode DP2–3, the unlatch coil of the A24 relay, the now closed contacts C5–C6 of the AIP relay, the A2 switch associated with the "5" typewriter key to the zero volt line. Thus, in response to the typing of the figure "5," the A21 and A24 relays have had their unlatch coils energized, with the consequent actuation of their associated switches.

The typewriter carriage has now moved to the 23rd column position, and the "7" key is depressed. The A-pulse, generated by this key stroke, appears at hub CP 1–K, and is connected through the diode DP11–3, the diode DP1–4, the unlatch coil of the A17 relay, the now closed contacts D5–D6 of the AIP relay, the A1 switch associated with the "7" typewriter key, to the zero volt line. This completed circuit energizes the A17 relay to allow the A17 relay switches to be moved from their normal latched positions.

The diodes DP11–1, DP11–2, DP1–3 and DP11–4 are employed to isolate the CP 1–K hub from the other entry hubs of the A register input position one, CP 2–Z, CP 1–Z and CP 2–K, for these hubs may be connected to other sections of the computer unit so that the A-pulse appearing on one of the hubs may be used to initiate another function of the computer unit. In such a case, an A-pulse appearing at one of the input hubs, as for example, CP 1–K, must be prevented from appearing on any of the other input hubs, CP 2–Z, CP 1–Z or CP 2–K. The diodes DP11–1, DP11–2, and DP11–4 allow the A-pulse appearing on the input hub CP 1–K to pass to the unlatch coils of the A11, A12, A14 or A17 relays, but prevent the same A-pulse from appearing at any of the other input hubs, CP 2–Z, CP 1–Z or CP 2–K.

As a result of the foregoing operations, the number

"157" has been typed by the typewriter, and the number "157" has also been stored in binary form in the third, second and first A register input positions, respectively. It will be appreciated that the number stored in the A register could have been any number up to the capacity of the A register, namely 10 digits, if the proper connections from the A bank of the control panel had been made to A register input bank.

In order to transfer the information now stored in the A register to any of the B, C or D registers, it is necessary to provide a means to interrogate the A register positions to determine the information stored therein. In the present computer unit, this interrogation is accomplished by the emitter.

THE EMITTER

The emitter 26, illustrated in FIG. 44, may well be thought of as the heart of the computer unit, for it is with this section that the command signals are generated for transferring information stored in one register to another register, as, for example, in adding or subtracting the contents of one register to or from the contents of another register. The emitter command signals are also employed in performing multiplication functions.

In general terms, the emitter functions to switch an incoming series of G-pulses, generated by the G-pulse generator (FIG. 34), to 13 separate lines, three of which will have a single pulse, each pulse being in a timed relation to one another. These three single control pulses will be referred to hereinafter as a "U-pulse," a "T-pulse" and a "C-pulse." In addition, the emitter has ten output lines, each of said lines carrying a different number of pulses, from one pulse to ten pulses. The nine output lines, carrying one pulse on the first line, two pulses on the second line, three pulses on the third line and so on up to the ninth line having nine pulses, will be referred to as the emitter digit bus. The tenth line carrying the ten pulses will be referred to as the "roll" pulse line, the ten consecutive pulses being referred to as the "roll" pulses. The purpose and function of the thirteen output lines will become apparent as the description progresses.

The terminal A5 of the EC relay is connected to the G-pulse generator and the G-pulses are applied through the normally closed contacts A5—A4 of the EC relay to the control bus for operation of other computer components. In the operation of the computer unit in a particular function requiring the emitter, a G-pulse will be routed back to the Emitter Pick-Up terminal.

Assuming then that G-pulses are being generated and a G-pulse has been routed back to the Emitter Pick-Up terminal, the following sequence of events will occur. As an aid to following the proper sequence, reference to the following Table No. 1 will be made. The first column reprsents the series of G-pulses generated by the G-pulse generator, the G(1)-pulse being the first pulse to be routed to the Emitter Pick-Up terminal. The second column designated the relay operated by a particular G-pulse. The third column indicates the time at which the designated relay switches operate. Column four indicates the time at which the designated relay returns to its initial position, and columns five through seventeen indicate the output line of the emitter and the times at which the G-pulses of the first column appear on those lines. In this table, as in following tables, a letter "E" or "U" will be appended to a relay designation to indicate which relay coil is operated by the command signal. If the letter "E" is appended, e.g., EC—E, it will indicate that the command signal has energized the escapement coil of the relay. If the letter "U" has been appended, it would indicate that the command signal energizes the unlatch coil of the relay.

*Table No. 1*
EMITTER OPERATION

| | Command signal | Relay coil energized | Relay switches actuated | Relay switch restored | Emitter output lines, emitter digit bus | | | | | | | | | | | |
|---|---|---|---|---|---|---|---|---|---|---|---|---|---|---|---|---|
| | | | | | U | 1 | 2 | 3 | 4 | 5 | 6 | 7 | 8 | 9 | Roll | T | C |
| 1 | G(1) | EC-E | | | | | | | | | | | | | | | |
| 2 | | | EC—all | | | | | | | | | | | | | | |
| 3 | G(2) | E1-E | | | U | | | | | | | | | | | | |
| | | E2-E | | | | | | | | | | | | | | | |
| | | E3-E | | | | | | | | | | | | | | | |
| 4 | | | E1—all | | | | | | | | | | | | | | |
| 5 | G(3) | | | | | 1 | 1 | 1 | 1 | | | | | 1 | 1 | | |
| 6 | | | E2-C and D | | | | | | | | | | | | | | |
| 7 | G(4) | E4-E | | | | | 2 | 2 | 2 | | | | 1 | 2 | 2 | | |
| 8 | | | E2-A and B | | | | | | | | | | | | | | |
| 9 | G(5) | | | | | | | 3 | 3 | | | 1 | 2 | 3 | 3 | | |
| 10 | | | E3-C and D | | | | | | | | | | | | | | |
| 11 | G(6) | | | | | | | | 4 | | 1 | 2 | 3 | 4 | 4 | | |
| 12 | | | E3-A and B | | | | | | | | | | | | | | |
| 13 | G(7) | | | | | | | | | 1 | 2 | 3 | 4 | 5 | 5 | | |
| 14 | G(8) | | | | | | | | | 2 | 3 | 4 | 5 | 6 | 6 | | |
| 15 | G(9) | | | | | | | | | 3 | 4 | 5 | 6 | 7 | 7 | | |
| 16 | G(10) | | | | | | | | | 4 | 5 | 6 | 7 | 7 | 8 | | |
| 17 | G(11) | | | | | | | | | 5 | 6 | 7 | 8 | 9 | 9 | | |
| 18 | | | E4-D | E1—all | | | | | | | | | | | | | |
| | | | | E2—all | | | | | | | | | | | | | |
| | | | | E3—all | | | | | | | | | | | | | |
| 19 | G(12) | | | | | | | | | | | | | | 10 | T | |
| 20 | | | E4-B | | | | | | | | | | | | | | |
| 21 | G(13) | EC-E | | | | | | | | | | | | | | | C |
| 22 | | | | EC—all | | | | | | | | | | | | | |
| | | | | E4—all | | | | | | | | | | | | | |

(1) The G(1)-pulse appearing at the Emitter Pick-Up terminal passes through the normally closed contacts A1—A2 of the EC relay to pulse the EC relay escapement coil, the other side of this coil being connected to 0 volt bus.

The EC relay is similar to the relays shown in FIGS. 14 and 15, and is partially illustrated in FIG. 32. As will be noted, the escapement wheel has the normal 10 escapement teeth 316 spaced peripherally of the escapement wheel 301, each tooth being adapted to be engaged by the pawl lever 314. The cam wheel 307c has five cam lobes 325c, each cam lobe being adapted to actuate the single push bar 323c. The cam lobes are designed and spaced in relation to the escapement teeth 325c so that the push bar 323c will be moved either alternately upwardly or downwardly, after the pawl lever 314 has been removed from the path of the escapement teeth 316, and after the pulse which caused the pawl lever 314 to move has ended.

(2) Before the next G-pulse occurs, the EC relay push bar 323c will close switch contacts A5—A6 to divert the series of G-pulses to the emitter, while the contacts A4—A5 will open to remove the G-pulses from the control bus. EC relay switch contacts A1—A2 open, and contacts A2—A3 close to connect the EC relay escapement coil from the Emitter Pick-Up terminal to the C-pulse output.

(3) The second G-pulse, G(2), will pass through the now closed EC relay contacts A5—A6, through the normally closed E4 relay contacts D2—D3, through the normally closed E1 relay contacts C5—C4, to the escapement coils of the E1, E2 and E3 relays, and to the U-pulse output terminal.

(4) The E1, E2 and E3 relays are illustrated partially in FIGS. 28, 29 and 30, respectively. As will be seen, each escapement wheel, 301d, has a single escapement tooth, 316d, so that when the pawl lever 314 is moved out of engagement with the tooth, the escapement wheel will rotate through a complete rotation before the wheel is again stopped by the pawl lever. As has been explained previously, the escapement wheel will rotate through one revolution in the time that 10 G-pulses are generated. The E1 relay (FIG. 28) has a single cam wheel 307d, keyed with the escapement wheel 301d, the cam wheel having a single cam lobe 325d. With the E1 relay escapement wheel held against rotation, the push bar 323d will be held in its downward position by the cam lobe 325d. The cam lobe is designed so that the push bar will be allowed to move upwardly in the time interval between the time the escapement coil of the relay is pulsed by a G-pulse and the next succeeding G-pulse, and will move downwardly just before the one revolution of the escapement wheel 301 is completed.

The E2 relay (FIG. 29) is similar to the E1 relay, but has two cam wheels, 307e and 307f, each cam wheel having a single cam lobe surface 325e and 325f, respectively. These cam surfaces hold the push bars 323e and 323f in their downward positions when the escapement wheel 301d is at rest, and the cam surfaces are designed to allow the push bars to move upwardly a predetermined time after the escapement coil of this relay is pulsed by a G-pulse to move the pawl lever 314 out of the path of the escapement tooth 316d. The cam lobe 325e will allow the push bar 323e to move upwardly in the time interval between the third and fourth G-pulse considering the second G-pulse at the one which allowed the escapement wheel to begin its rotation. Similarly, the lobe 325f will allow the push bar 323f to move upwardly in the interval between the fourth and fifth G-pulse. Both bars 323e and 323f will be moved downwardly just before the rotation of the escapement wheel 301d is completed.

The E3 relay (FIG. 30) is similar to the E2 relay, except for the design of the cam lobe surfaces 325g and 325h. These cam surfaces are designed so as to allow the cam lobe surface 325g to permit the push bar 323g to move upwardly in the time interval between the fifth and sixth G-pulse, and so as to allow the cam lobe surface 325h to permit the push bar 323h to move upwardly in the time interval between the sixth and seventh G-pulse, again assuming that it was the second G-pulse which pulsed the escapement coil of the relay to start the rotation of the escapement wheel 301d. Both push bars 323g and 323h will be moved to their downward positions just before the single revolution of the escapement wheel 301d is completed.

Therefore, shortly after the second G-pulse, G(2), and before the third G-pulse, G(3), the E1 relay contacts C4—C5 will open to prevent any further G-pulses from appearing at the E1, E2 or E3 relay escapement coils, or at the U-pulse output terminal. Contacts C5—C6 will close, to route further G-pulses to the emitter digit bus and the roll pulse output. Contacts A5—A6 will close to complete the circuit to the roll pulse output line.

(5) The G(3)-pulse will now be routed through the closed contacts C5—C6 of relay E1 to the emitter digit bus, the pulse appearing on: (1) the emitter digit line 1 through the normally closed contacts D1—D2 of relay E2; (2) on emitter digit line 2 through the normally closed contacts B1—B2 of relay E2; (3) on emitter digit line 3 through the normally closed contacts D1—D2 of relay E3; (4) on emitter digit line 4 through the normally closed contacts B1—B2 of relay E3; (5) and on the emitter digit line 9. The G(3)-pulse will also appear at the roll pulse output through the now closed contacts A5—A6 of relay E1.

(6) In the time interval between the G(3)- and the G(4)-pulses, the contacts D1—D2 of the E2 relay will open and the contacts D2—D3 will close.

(7) The G(4)-pulse will now appear on emitter digit lines 2, 3, 4, 9 and the roll pulse output as before, and the G(4)-pulse will also appear on emitter digit line 8 through the now closed contacts D2—D3 of the E2 relay. The closing of the contacts D2—D3 of the E2 relay also completes the circuit to the E4 relay escapement coil so that the G(4)-pulse will remove the latch from the escapement tooth so that the escapement wheel may rotate.

The E4 relay (FIG. 31) is similar to the E2 and E3 relays (FIGS. 29 and 30) in that the escapement wheel 301d has a single tooth, and that two cam wheels, 307j and 307k, are keyed to rotate with the escapement wheel. The cam wheels 307j and 307k are each provided with a single cam lobe surface 325j and 325k, respectively. These cam surfaces are so designed and arranged with respect to the single escapement tooth 316d that when the escapement wheel is at rest, the push bars 323j and 323k are in their upper position. The cam surface 325j is designed so that once the escapement wheel is released for rotation by the fourth G-pulse, G(4), the push bar 323j will be moved downwardly in the time interval between the eleventh and twelfth G-pulses, the push bar being returned to its normal upper position after the thirteenth G-pulse. Similarly, the cam surface 325k will move the push bar 323k downwardly in the time interval between the twelfth and thirteenth G-pulses, with the push bar returning to its upper position after the thirteenth G-pulse.

(8) In the period between the G(4)- and G(5)-pulses, the contacts B1—B2 of the E2 relay will open and the contacts B2—B3 of that relay will close.

(9) The G(5)-pulse will now appear on the roll pulse output and emitter digit lines 3, 4, 9 and 8 as before and the pulse will be routed through the now closed contacts B2—B3 of the E2 relay to the emitter digit line 7.

(10) In the period between the G(5)- and the G(6)-pulses, the contacts D1—D2 of the E3 relay will open and the contacts D2—D3 of that relay will close.

(11) The G(6)-pulse will appear on the roll pulse output and the emitter digit lines 4, 9, 8 and 7 as before and the pulse will be routed through the now closed contacts D2—D3 of the E3 relay to the emitter digit line 6.

(12) In the period between the G(6)- and G(7)-pulses, the contacts B1—B2 of the E3 relay will open and the contacts B2—B3 will close.

(13-17) The pulses G(7) through G(11) will appear at the roll pulse output and emitter digit lines 9, 8, 7 and 6 as before, and the pulses will be routed to emitter digit line 5 through the now closed contacts B2—B3 of the E3 relay.

By the foregoing switching program, a single pulse will have been made to appear on the emitter digit line 1, two pulses will have appeared on emitter digit line 2, and, correspondingly, up to nine pulses will have appeared on the emitter digit line 9. Nine pulses will also have appeared at the roll pulse output.

(18) In the period between the G(11)- and G(12)-pulses, the escapement wheels of the relays E1, E2 and E3 will have made one complete revolution and will be returned to the original position with the pawl levers engaging the single escapement tooth of each wheel. The E1, E2 and E3 relay switches will thus be returned to their normal position. The contacts C5—C6 of the E1 relay will again open and thus prevent any further G-pulses from appearing at the emitter digit bus.

In this same period, the E4 relay contacts will open to prevent the next G-pulse from energizing the E1, E2 or E3 relay escapement coils. The E4 relay contacts D2—D1 will close.

(19) The G(12)-pulse will now be routed to the roll pulse output through the now closed contacts D2—D1 of relay E4, through the still closed contacts B2—B3 of relay E4, and through the again normally closed contacts A4—A5 of the E1 relay. This now completes the series of ten pulses to the roll pulse output line. The G(12)-pulse will also appear at the T-pulse output through the closed contacts D2—D1 and B2—B3 of the E4 relay.

(20) In the period between the G(12)- and G(13)-pulses, the contacts B1—B2 of the E4 relay will close and the contacts B2—B3 wil open.

(21) The G(13)-pulse will now appear at the C-pulse output through the closed contacts D2—D1 and B1—B2 of the E4 relay. The pulse will also be routed through the closed contacts A2—A3 of the EC relay to the EC relay escapement coil.

(22) This second energization of the EC relay will cause the escapement wheel to be rotated one step to return the EC relay switches to their normal position, as shown in the drawing. The E4 relay escapement wheel will have now rotated one full revolution and the escapement tooth will again engage the latch lever, and the E4 relay switches will be returned to their original normal positions.

Thus, after the thirteenth G-pulse, the emitter will have gone through a complete cycle of operation and all of the relays will have returned to their original normal positions to await another signal at the Emitter Pick-Up terminal.

The EC relay has two stable positions, one in which the contacts are in their normal position, and a second in which the switch bars have been operated to place the switches in operating position. The contacts C2—C3 of the EC relay have been employed to provide a positive assurance that the EC relay is in the proper normal position for operation of the emitter. For example, the EC relay may have been replaced by another relay, but the new relay may have been inserted such that its switches were not in the normal positions as shown in FIG. 44. Then, when G-pulses are generated, they would immediately set the emitter into action, allowing no G-pulses to pass to the control bus until after the emitter had cycled, and the operation of the computer unit would be defective. This is overcome by connecting the C2—C3 contacts of the EC relay between the clutch signal source and the clutch pick up. Thus, if the new EC relay is inserted so that the switch contacts are not in their normal position, the C2—C3 contacts will be closed and the clutch will be immediately energized. The emitter will immediately cycle and the final C-pulse will energize the EC relay escapement coil to return the EC relay switch contacts to their normal position, awaiting a command signal upon the Emitter Pick-Up terminal. The same resetting action will occur if there had been a power failure during the emitter cycle. When power is resumed, the closed contact C2—C3 of the EC relay will cause the clutch to operate and the emitter will complete its cycle to return to its normal position, awaiting a normal command signal.

TRANSFER OF A REGISTER INFORMATION

Having now discussed the manner in which information may be stored in the A register 35, and the manner in which the emitter 26 operates, we may now discuss the manner in which the information stored in the A register may be transferred to any of the B, C or D registers.

In order that the transfer operation may be made more clear, it will be helpful to examine a typical transfer function. In the discussion of the storage of information, it was assumed that the number "157" was to be stored, with the "7" being typed when the typewriter carriage was in the 23rd column. Let it now be assumed that it is desired to have the number "157" transferred to the B register 36, with the command for the transfer being given at the same time that the last figure, "7" is typed.

To enable the foregoing function to be undertaken, it will be necessary for certain additional jumper leads to be added to the control panel. In order to have the transfer function take place when the last number is typed, it will be necessary to connect a second lead from the A bank hub corresponding to column 23 (CP3–Q) to the + hub of the A→B section of the T bank (CP 14–A). It will also be desirable to disconnect the typewriter key switches from the A register input during the time of the transfer cycle. The A-pulse used to store the figure "7," and to initiate the transfer cycle, appears at the above mentioned hub CP 14–A. The same pulse appears through the diode DP24–1 at the L hub of the A→B section (CP 15–A). A jumper connection is then made from this last hub to one of the AID0 hubs, for example, CP 19–B. The control panel is now wired to permit the number "157" to be stored in the A register, and to be transferred automatically to the B register upon the completion of the typing of the number.

Table No. 2 illustrates the timed sequence in which the command signals are applied to the computer unit and the relays which operate in response to those commands.

*Table No. 2*

TRANSFER OF NUMERICAL INFORMATION FROM A REGISTER

| | Command signal | Relay coils energized to actuate switches | Relay coils energized to restore switches |
|---|---|---|---|
| 1 | A | AAI-U<br>BAI-U<br>AID-U | |
| 2 | G(1) | AO-E<br>WA-E<br>EC-E | AID-E.<br>AIP-E. |
| 3 | G(2) | | |
| 4 | U | AR-U | |
| 5 | 1-9 | | |
| 6 | T | | AR-E.<br>AAI-E.<br>BAI-E.<br>A31-E.<br>A21-E.<br>A24-E.<br>A17-E. |
| 7 | C | | WA-E.<br>AO-E. |

(1) Returning now to FIG. 48, the A-pulse appears at hub CP 14–A as the last figure is typed. A first circuit is completed from that hub through the diode DP24–2 to the unlatch coil of the AAI relay, and this relay is energized. A second circuit is completed from hub CP 14–A through the diode DP24–3 to the unlatch coil of the BAI relay, and this relay is energized. The BAI relay conditions the B register to receive the information to be transferred from the A register, and the accumulation of information in the B register will be discussed hereinafter.

The A-pulse also appears at the L hub CP 15–A and is jumpered to AID0 hub, CP 19–B. This hub is connected through diode DP11–4 to the unlatch coil of the AID relay and the A-pulse energizes that coil.

The energization of the BAI unlatch coil allows its switch contacts B2—B3 to close, thus completing the circuit from the clutch signal source to the clutch pick up, and the motor is then clutched to the drive shaft, in turn causing the G-pulse generator to start emitting G-pulses.

(2) The first G-pulse, G(1), is routed through the emitter (FIG. 44) to the control bus, and appears at the G-pulse terminal, FIG. 48. A first circuit is completed from that terminal through the now closed contacts B2—B3 of the AAI relay and the normally closed contacts A1—A2 of the AO relay, to the escapement coil of the AO relay so that this coil is pulsed by the G(1)-pulse. A second circuit is completed from the G-pulse terminal through the contacts B2—B3 of the AAI relay, to the WA P.U. terminal of the control bus, through the control bus to the WA P.U. terminal, FIG. 51 through the normally closed contacts A1—A2 of the Web A relay, to the escapement coil of that relay.

Referring back to FIG. 48, a circuit is completed from the G-pulse terminal through the now closed contacts A2—A3 of the AID relay to the escapement coils of the AID and AIP relays. The AIP relay will now return to its original position to disconnect the typewriter key switches from the A register.

Figure 51:
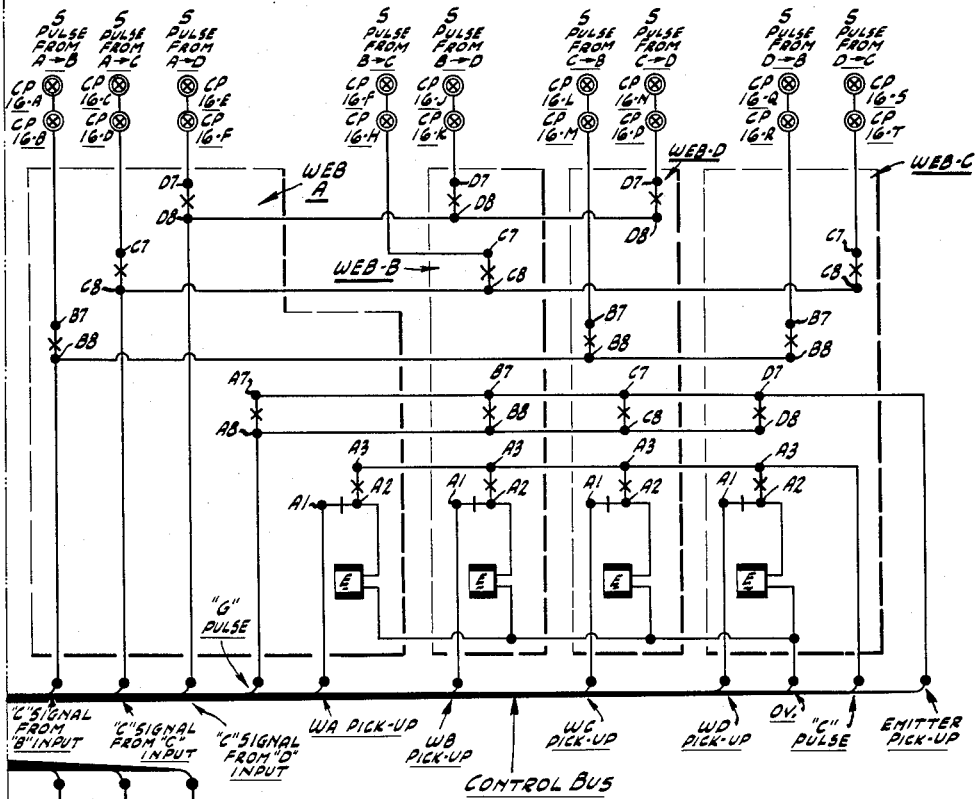

(3) The next G-pulse, G(2), will appear at the G-pulse terminal FIG. 51, and a circuit will be completed through the contacts A7—A8 of the WA relay to the Emitter Pick-Up terminal of the control bus, through the control bus to the Emitter Pick-Up terminal of the emitter, FIG. 44. This G-pulse then will start the emitter in its cycle of operation, as has been described in the last section.

(4) The first signal from the emitter is the U-pulse, which appears at the U-pulse terminal, FIG. 48, and a circuit is completed from that terminal, through the now closed contacts B3—B2 of the AO relay, the normally closed contacts D1—D2 of the ARS relay to the unlatch coil of the AR relay, so that the U-pulse actuates the AR relay switches from their normal positions.

(5) The A register and the emitter are now in condition to interrogate the A register, with the emitter digit bus being connected to the A register through the now closed contacts D2—D3, D5—D6, A7—A8, C5—C6, B7—B8, B5—B6, C7—C8, A5—A6 and D7—D8 of the AAI relay. The lines of the emitter digit bus are indicated by the numbers 1 through 9 applied to the bus on the inlet side of the AAI relay contacts, and the corresponding lines are indicated by the same reference numbers at the output side of the ASI relay contacts and the inlet side of the A register contacts. As may be appreciated, the emitter digit lines are connected in parallel to the A register relays so that each relay is interrogated at the same time, rather than serially.

The A register relays have had the number "157" stored in the last three relays by the original storage of information, with the following relays having been energized, A31, A21, A24 and A17. To obtain a transfer from the A register, it will be necessary to have one pulse appear on output line 3, five pulses on output line 2, and seven pulses on output line 1.

In regards to the third A register position (relays A31, A32, A34 and A37), it will be found that a completed circuit exists from the emitter digit line 1, through the now closed contacts A7—A8 of relay AAI, to the digit line 1, through the normally closed contacts D1—D2 of the A37 relay, the normally closed contacts D1—D2 of the A34 relay, the normally closed contacts D1—D2 of the A32 relay, the now closed contacts D2—D3 of the A31 relay, and through the now closed contacts B7—B8 of the AO relay to the output bus line 3. This completed circuit will allow the single pulse carried by the digit bus line 1 to appear on the output bus line 3. It will be found upon a tracing of the circuits through the third A register position contacts that no other completed circuit exists which would connect the other digit lines to the output bus.

The digit bus line 5 is connected to the second position A register output through the following circuit: from digit bus line 5, through the now closed contacts A5—A6 of relay AAI to digit line 5, through the now closed contacts D2—D3 of relay A24, the normally closed contacts D1—D2 of the relay A22, the now closed contacts D2—D3 of the A21 relay, and through the now closed contacts C7—C8 of the relay AO to the output bus line 2. This completed circuit allows the five pulses carried on digit bus line 5 to be imposed upon the output bus line 2. Again, an examination of the other circuits will show that no other digit bus line is connected to the output bus line 2.

In the same manner, it will be found that the digit bus line 7 is directly connected to the output bus line 1 so that the seven pulses carried on the digit bus line 7 will appear at the output bus line 1.

Thus, as the emitter goes through its cycle, one pulse will appear at the output bus line 3, five pulses will appear at the output bus line 2, and seven pulses will appear at the output bus line 1, these pulses thus corresponding to the number "157" stored in the A register.

(6) The next signal to be applied to the transfer operation will be the T-pulse, and this will appear at the T-pulse terminals.

A first circuit will be completed from the T-pulse terminal (at the left of the control bus, FIG. 48) through the now closed contacts A2—A3 of the AR relay to the escapement coil of the AR relay. A second circuit will be completed from the T-pulse terminal through the now closed contacts B3—B2 of the AR relay to the escapement coil of the AAI relay. A third circuit will be completed from the T-pulse terminal through the now closed contacts A7—A8 of the AR relay (FIG. 47), to the A3 contacts of each A register relay. If any of these relays has been energized in the operation, as were relays A31, A21, A24 and A17 in the assumed problem, the contacts A2—A3 of these relays will now be closed. Thus, a T-pulse will be impressed upon the escapement coil of each relay which had stored information, while the T-pulse will not be impressed upon the escapement coils of any of the other relays.

The T-pulse thus restores the AR and AAI relays to their original positions, and also restores the previously actuated A register relays to their original positions. In addition, it is seen that the T-pulse terminal (at the right of the control bus, FIG. 48) is connected through the now closed contacts A3—A2 of the BAI relay to the escapement coil of the BAI relay. Although this relay had initiated the clutch mechanism, it will be noted that a parallel path for the clutch pick up has been provided by the now closed contacts C2—C3 of the EC relay in the emitter, FIG. 44. Therefore, the emitter is allowed to perform its full cycle even though the BAI relay has been restored to its original position.

(7) The final pulse in the emitter cycle is the C-pulse, which appears at the control bus C-pulse terminals. In FIG. 48, the C-pulse is applied through now closed contacts A3—A2 of the AO relay to the AO relay escapement coil. In FIG. 51, the C-pulse is routed through the now closed contacts A3—A2 of the Web A relay to the escapement coil of the Web A relay. And, as discussed in connection with the emitter, the C-pulse will de-activate the emitter.

Thus, upon completion of the emitter cycle, all of the emitter relays, A register relays, and B register relays have been returned to their original position and the computer unit is again conditioned to receive information into the A register.

In the foregoing discussion, it was assumed that the number "157" was to be added into the B register. However, let it be assumed that it is desired to subtract the number "157" from the contents of the B register. The following changes must be made on the control panel to permit such a function. Instead of plugging the jumper wire into the + hub of the A→B section of the T bank, it is necessary to connect the jumper to the − hub (CP 14–B) of the A→B section. Correspondingly, the jumper wire connected from the L hub of the +A→B section must be connected to the L hub of the −A→B section (CP 15–B).

With these connections made, the A-pulse appearing at the − hub (CP–14) will not be connected through the diode DP24–6 to the unlatch coil of the ASI relay, rather than to the AAI relay. The remaining operation will be identical to the transfer of information from the A register discussed above except for the important fact that the D2—D3, A7—A8, D5—D6, B7—B8, C5—C6, C7—C8, B5—B6, D7—D8 and A5—A6 contacts of the ASI relay will be now closed instead of the corresponding contacts of the AAI relay. These now closed contacts of the ASI relay will connect the emitter digit bus lines to the A register so that a "nine-complement" will appear on the A register output bus line. As for example, the third A register position had the relay A31 energized. Tracing the circuit backwardly from the output bus line 3, a completed circuit is found through the now closed contacts B7—B8 of the relay A0, the now closed contacts D2—D3 of the A31 relay, the normally closed contacts D2—D1 of the A32, A34 and A37 relays to the digit line 1, and through the contacts A7—A8 of the ASI relay to the emitter digit bus line 8. Thus 8 pulses now appear on the output bus line 3, instead of the one pulse when an addition function was performed.

Similarly, the output bus lines 2 and 1 will be connected to the emitter digit bus lines 4 and 2, respectively, so that four pulses will appear on output bus line 2 and two pulses will appear on the output bus line 1.

In addition, it will be noted that each A register position in which no information has been stored, as, for example, the tenth A register position, will present a completed circuit from the output bus through the normally closed contacts D2—D1 of the A101 relay, contacts C2—C1 of the A102 relay, and contacts B2—B1 of the A104 and A107 relays to the 0 digit line. This line connects through the now closed contacts D2—D3 of the ASI relay to the emitter digit bus line 9 so that nine pulses will appear at each output bus line in which no number had been stored.

The final output from the A register in the above subtraction of "157" will be nine pulses to each of the first seven output bus lines, eight pulses to the next, four pulses to the next, and two pulses to the last output bus line. This output, 9999999842, thus represents the "nines-complement" form of the figure "157."

The remainder of the subtraction sequence is the same as the addition sequence with the only change being that the T-pulse will now restore the ASI relay instead of the AAI relay.

It will be noted that the A register is automatically restored to its original "empty" condition after either an addition or subtraction process. However, it may be found convenient to prevent such restoration if it is desirable to retain the information in the A register so that an additional process could be performed without requiring the same number to be put into the A register by a typing operation. This may be accomplished by plugging a jumper lead on the control panel from the A-pulse source used for the initiation of the foregoing A register transfer into the A Restore Supp. hub CP 18–U. The A-pulse will then appear directly at the unlatch coil of the ARS relay, causing the ARS switches to operate. The contacts D2—D1 of the ARS relay are in series with the unlatch coil of the AR relay, and since these contacts are now open, the AR relay will be prevented from being energized by the U-pulse. The T-pulse which clears the A register must pass through the normally open contacts A7—A8 of the AR relay and thus the A register will be prevented from clearing until such time as the escapement coil ARS relay is energized. Similarly, the contacts A3—B3 of the AR relay will remain open to prevent a T-pulse from appearing on the escapement coils of the AAI and ASI relays.

The A register may be restored at a desired time by causing a "compute complete" signal to appear at the Compute Complete terminal of the control bus. The generation of the compute complete signal will be discussed hereinafter. This signal will appear through the now closed contacts A2—A3 of the ARS relay on the escapement coil of the ARS relay. The compute complete signal will also pass through the now closed contacts B2—B3 of the ARS relay to the escapement coils of the AAI and ASI relays, to return those relays to their original condition.

The operation of the ARS relay to its original position allows the contacts D1—D2 to close, and an "A Restore Pick-Up" signal may be placed on the A Restore P.U. hub CP 17–U to energize the unlatch coil of the AR relay. This will result in the closing of the contacts C2—C3 in series with the clutch signal source and the clutch pick-up terminal, and the motor will be clutched to the G-pulse generator. A G-pulse will appear on the G-pulse terminal and be routed through the now closed contacts D2—D3 of the AR relay to the WA P.U. terminal, in turn energizing the escapement coil of the WA relay, which, as we have seen, conditions the emitter for its operational cycle. The next G-pulse will start the emitter, which will run through its cycle until the T-pulse is produced. This pulse appears at the T-pulse terminal as before and the pulse will appear on the escapement coil of the AR relay to reset this relay to its normal condition, as well as resetting the A register relays. The C2—C3 contacts of the AR relay will then open, disconnecting the clutch, and the A register is now restored to its original position awaiting the next desired function.

The remaining control panel hubs in the A→C and A→D sections of the T bank will function in the same manner as above described, the only difference being that the contents of the A register will have been transferred to either the C or D register instead of the B register, by the operation of the CAI or DAI relays, instead of the BAI relay.

TRANSFERRING INFORMATION INTO THE B REGISTER

Figure 49:
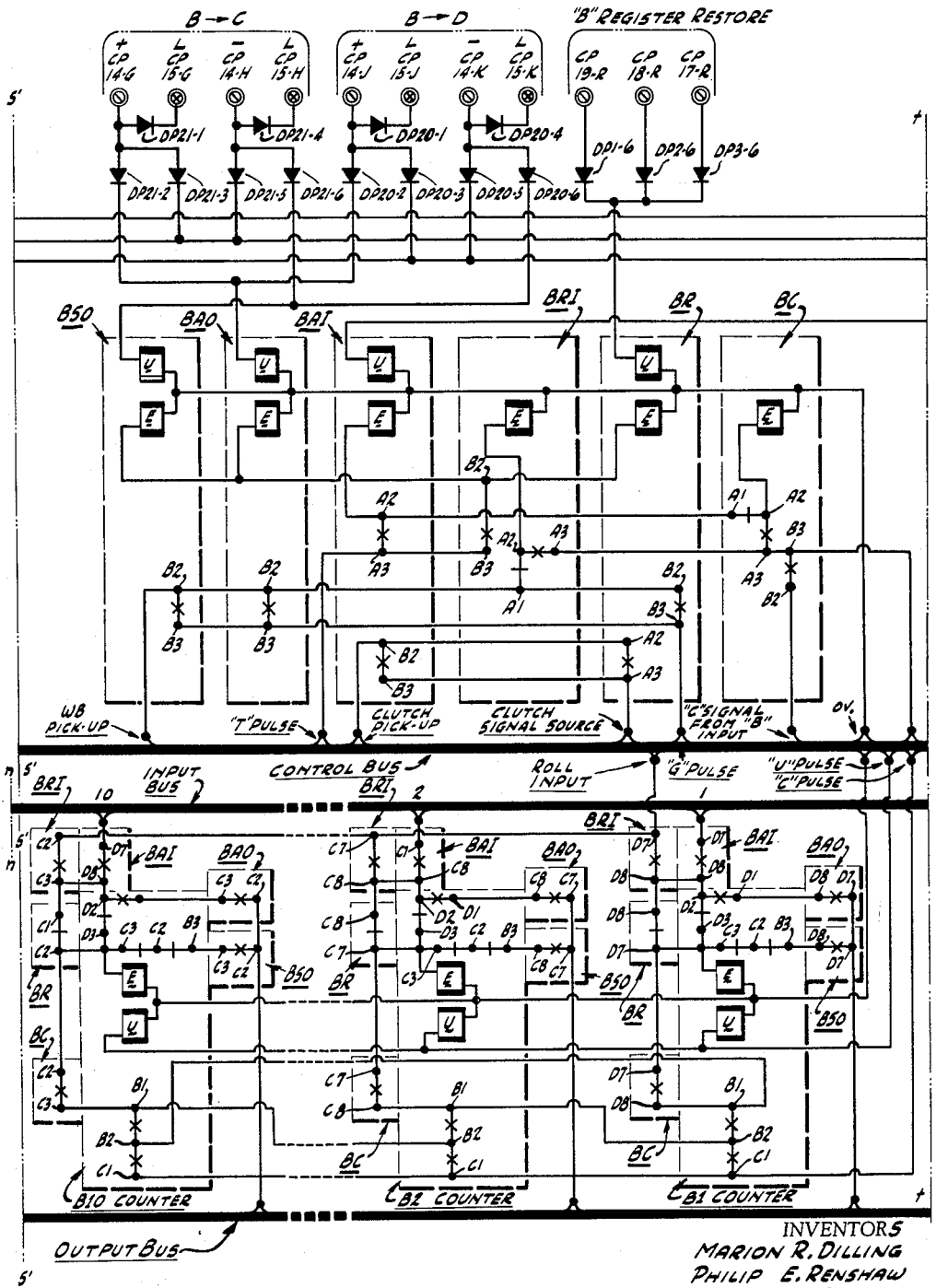

The B register 36, and illustrated in FIG. 49, is comprised of ten pulse counters, of the type illustrated in FIGS. 7–13, connected in decade fashion, and of relays of the types illustrated in FIGS. 14–17. These pulse counters operate so as to store the information transferred into them in decimal form, rather than in binary form. This is accomplished by feeding a series of discrete pulses into the counters and allowing the escapement wheel to rotate through a predetermined angle for each pulse received by the counter, as explained previously.

Again, the operation of the B register may be made more understandable by following the sequence of operation involved in a typical transfer function. For this purpose, FIG. 53 has been prepared, FIG. 53 being a simplified diagram of a portion of the B register, to illustrate more clearly the manner in which numerical information is transferred into the B register counters. This figure does not show the energizing circuits for the B register control relays, reference being had to FIG. 49 for this purpose. Reference is also made to Table No. 3, showing the completion of the +A→B transfer function described in part in the discussion of the A register. In that discussion, the number "157" stored in the A register had been transferred to the output bus of the A register, so that one pulse was on line 3, five pulses were on line 2, and seven pulses were on line 1. These output bus lines are connected to the corresponding input bus lines leading to the B register, so that one pulse will appear on the input bus line 3 connected to the B register counter B3, five pulses will appear on the input bus line 2 connected to the B register counter B2, and seven pulses will appear on the input bus line 1 connected to the B register counter B1. The "Static Read-Out Position" column refers to the position of the static read-out rotor on the counter, this being the indication of the number stored in the counter.

Table No. 3

TRANSFER OF NUMERICAL INFORMATION INTO THE B REGISTER

| | Command signal | Relay picked up | Relay restored | Counter B3 | | Counter B2 | | Counter B1 | |
|---|---|---|---|---|---|---|---|---|---|
| | | | | Coil energized | Static read-out position | Coil energized | Static read-out position | Coil energized | Static read-out position |
| 1 | A | BAI-U | | | 0 | | 0 | | 0 |
| 2 | G(1) | | | | 0 | | 0 | | 0 |
| 3 | G(2) | | | | 0 | | 0 | | 0 |
| 4 | U | | | B3-U | 0 | B2-U | 0 | B1-U | 0 |
| 5 | 1 | | | B3-E | 1 | | 0 | | 0 |
| 6 | 2 | | | | 1 | | 0 | | 0 |
| 7 | 3 | | | | 1 | | 0 | B1-E | 1 |
| 8 | 4 | | | | 1 | | 0 | B1-E | 2 |
| 9 | 5 | | | | 1 | B2-E | 1 | B1-E | 3 |
| 10 | 6 | | | | 1 | B2-E | 2 | B1-E | 4 |
| 11 | 7 | | | | 1 | B2-E | 3 | B1-E | 5 |
| 12 | 8 | | | | 1 | B2-E | 4 | B1-E | 6 |
| 13 | 9 | | | | 1 | B2-E | 5 | B1-E | 7 |
| 14 | T | BC-E | BAI-E | | 1 | | 5 | | 7 |
| 15 | C | | BC-E | | 1 | | 5 | | 7 |

(1–3) The first three command signals, A, G(1) and G(2), cause the same operations to be followed as are shown in the previous Table No. 2, with the BAI relay being pulsed by the A signal, to condition the B register to receive the pulses passed from the A register, and the G(1) and G(2)-pulses causing the emitter to start its operation.

(4) The U-pulse appears at the U-pulse terminal and is directly and simultaneously applied to the unlatch coils of each of the ten B register pulse counters, thus allowing the 10-push bar of each counter to return to its normal unlatched position if it had been previously latched in a prior computer cycle.

(5) The first emitter digit pulse appeared on the output bus line 3 from the third A register position. This pulse now appears on the input bus line 3 and passes through the now closed contacts B7—B8 of the BAI relay and the normally closed contacts B7—B8 of the BR relay to the escapement coil of the B3 counter. The pulse allows the escapement latch lever to be pulled from the escapement tooth so that the escapement wheel may rotate, the latch lever being released at the end of the pulse so that the next escapement tooth will come to rest against the lever. This single tooth advance of the escapement wheel causes the static read-out rotor to advance from the zero position to contact the "1" static read-out line. As no further digit pulses are available to the escapement coil during the cycling of the emitter, this present position of the B3 counter represents its final position in this operation.

(6) The next emitter digit pulse (2) has not been routed to any of the A register output lines and thus the B register is not affected by this pulse.

(7) This next emitter digit pulse (3) has been routed through the A register to appear on the A register output bus line 1 and thus it appears at the B register input bus line 1, and passes through the now closed contacts D7–D8 of the BAI relay, and the normally closed contacts D7—D8 of the BR relay to appear on the escapement coil of the B1 counter. This, in turn, allows the escapement wheel to advance an angular amount corresponding to a one escapement tooth angle, and the static read-out rotor will contact the read-out line 1, indicating that the B1 counter has received one pulse.

(8) The next emitter digit pulse (4) has also been routed as the previous pulse so that the escapement coil of the B1 counter is again energized. As has been explained previously, this next pulse causes the escapement latch lever to be moved from the path of the escapement teeth before the tooth has come to rest against the latch lever. Thus, there is no power needed to overcome the frictional engagement of the escapement tooth and the latch lever on any successive digit pulse following the first pulse which allowed the escapement wheel to begin its rotation.

(9) The next emitter digit pulse (5) is again routed to the B1 counter escapement coil, picking up the latch lever so that the escapement wheel continues to turn freely. The same pulse also appears on the A register output bus line 2 and thus appears on the B register input bus line 2, passing through the now closed contacts C7—C8 of the BAI relay, and the normally closed contacts C7—C8 of the BR relay to energize the B2 counter escapement coil, thus allowing the escapement wheel of this counter to rotate in a manner similar to the B3 and B1 counters.

(10–13) The next four emitter digit pulses (6 through 9) also appear on the escapement coils of the B1 and B2 counters, each pulse picking up the escapement latch lever so that the escapement wheel rotates freely without interruption. After the last digit pulse (9) has appeared on the escapement coils of the B1 and B2 counters, the escapement latch will be released so that the escapement teeth will again engage the respective latch levers to discontinue the rotation of the escapement wheels. Seven emitter digit pulses will have appeared on the escapement coil of the B1 counter and thus that counter will have rotated through an angular displacement corresponding to seven escapement teeth, and the static read-out rotor will now contact the "7" read-out line to indicate that the number "7" has now been stored in that counter.

Similarly, the B2 counter will have rotated through an angular displacement corresponding to five escapement teeth, and the static read-out rotor will now contact the "5" read-out line to indicate that the number "5" has now been stored in that counter.

(14) The T-pulse now appears at the T-pulse terminals. In addition to performing the resetting operation set forth in step 6 of Table No. 2, including the resetting of the BAI relay, the T-pulse will be routed from this T-pulse terminal (FIG. 49) through the now closed contacts A3—A2 of the BAI relay, the normally closed contacts A1—A2 of the BC relay to the escapement coil of the BC relay. The energization of this relay conditions the B register counters for a "carry" function if any of the counters had completed a full revolution. The carry function will be more completely described in the following material.

(15) The C-pulse appears on the C-pulse terminal. In addition to the functions performed by the C-pulse in step 7 of Table No. 2, the C-pulse is routed from the C-pulse terminal (FIG. 49) through the now closed contacts A3—A2 of the BC relay to the escapement coil of the BC relay to energize the relay to return it to its original position.

The emitter cycle being now complete, the computer unit is again at rest, and the number "157" is stored in the B register. It should be noted that only a single cycle of operation is needed to transfer the numerical information from all of the A register positions to the corresponding B register positions.

To illustrate the "carry" function of the B register, let it be assumed that it is desired to add the number "45" to the number "157" presently stored in the B register. The number "45" is typed into the A register as discussed above, with a command signal being given to transfer the A register contents to the B register. The A register will again be interrogated by the emitter and four pulses will appear on the A register output bus line 2, and five pulses will appear on the A register output bus line 1. Reference will now be made to Table No. 4 and to FIGS. 49 and 53 to indicate the operation of the B register in receiving and accumulating this additional information.

advance to the "0" read-out position, indicating that it has rotated through a full cycle and that a "1" must be carried over to the next counter, B3. It is for this reason that the contacts B1—B2 of the B2 counter were closed on the ninth pulse received by that counter. The same C-pulse is routed from the Carry pulse bus through the latched closed contacts C1—B2 of the B1 counter, through the contacts B1—B2 of the B2 counter closed by the ninth pulse to that counter, through the now closed contacts B7—B8 of the BC relay, to appear on the escapement coil of the B3 counter, causing that counter to advance one position.

The C-pulse also causes the EC relay to be restored to its original position, as in step 15 of Table No. 3.

The B register counters B3, B2 and B1 now stand so

*Table No. 4*

ADDING NUMERICAL INFORMATION INTO THE B REGISTER WITH A CARRY FUNCTION

| | Command signal | Relay picked up | Relay restored | Counter B3 | | Counter B2 | | Counter B1 | |
|---|---|---|---|---|---|---|---|---|---|
| | | | | Coil energized | Static read-out position | Coil energized | Static read-out position | Coil energized | Static read-out position |
| 1 | A | BA1-U | | | 1 | | 5 | | 7 |
| 2 | G(1) | | | | 1 | | 5 | | 7 |
| 3 | G(2) | | | | 1 | | 5 | | 7 |
| 4 | U | | | B3-U | 1 | B2-U | 5 | B1-U | 7 |
| 5 | 1 | | | | 1 | B2-E | 6 | | 7 |
| 6 | 2 | | | | 1 | B2-E | 7 | | 7 |
| 7 | 3 | | | | 1 | B2-E | 8 | | 7 |
| 8 | 4 | | | | 1 | B2-E | 9 | | 7 |
| 9 | 5 | | | | 1 | | 9 | B1-E | 8 |
| 10 | 6 | | | | 1 | | 9 | B1-E | 9 |
| 11 | 7 | | | | 1 | | 9 | B1-E | 0 |
| 12 | 8 | | | | 1 | | 9 | B1-E | 1 |
| 13 | 9 | | | | 1 | | 9 | B1-E | 2 |
| 14 | T | BC-E | BA1-E | | 1 | | 9 | | 2 |
| 15 | C | | BC-E | B3-E | 2 | B2-E | 0 | | 2 |

(1–4) The first four steps, wherein the A-, G(1), G(2), and U-pulses are generated are the same as those discussed in steps 1 through 4 in Table No. 3.

(5–8) During these steps the emitter digit pulses will appear on the A register output bus line 2 and, consequently, on the B register input bus line 2. Each pulse will again unlatch the B2 counter escapement wheel 301 so that the wheel may rotate through an angular displacement corresponding to four escapement teeth. The escapement wheel will have now rotated through nine steps and the "9-push bar" will have been moved downwardly by the cam 326 keyed to the escapement wheel to close the normally open contacts B1–B2 of the B2 counter.

(9–13) In the five steps, the emitter digit pulses will appear on the A register output bus line 1 and, consequently, the B register input bus line 1. These five pulses will thus cause the B1 counter escapement wheel to rotate through five angular steps, past the "0" static read-out position to the "2" read-out position. The "2" read-out position thus reflects the "2" produced by the addition of the figures "5" and "7." As the escapement wheel completed a full revolution so that the static read-out position was "0," the 10-push bar 323 was depressed by the cam lobe 325 ganged to the escapement wheel and was latched into the downward position by latch 327 to latch the normally open contacts B2—C1 of the B1 counter closed.

(14) The T-pulse now appears as in step 14 of Table No. 3, and the BC relay is energized.

(15) The C-pulse appears at the C-pulse terminal and is routed to the Carry pulse bus. This pulse is passed through the latched closed contacts C1—B2 of the B1 counter, through the now closed contacts C8—C7 of the BC relay to appear on the escapement coil of the B2 counter. This pulse will cause the escapement wheel to advance one step so that the "1" resulting from the addition of "5" and "7" will be accumulated in the B2 counter. However, it will be noted that the B2 counter will that their static read-out positions are 2–0–2, which is the correct sum of 157 and 45.

The same operation would be followed if a complementary number were added into the B register in a subtraction process. As is well recognized, in the complementary number subtraction, the unit carried over from the highest (left-hand) column must be added to the lowest (right-hand) column to get a true subtraction answer. This is accomplished in the B register by connecting the carry transfer line from the B2 contact of the highest position counter B10 to the D3 contact of the BC relay so that the C-pulse will be transferred from the B10 counter to the B1 counter as in step 15 of Table No. 4.

TRANSFERRING INFORMATION FROM THE B REGISTER

Figure 50:
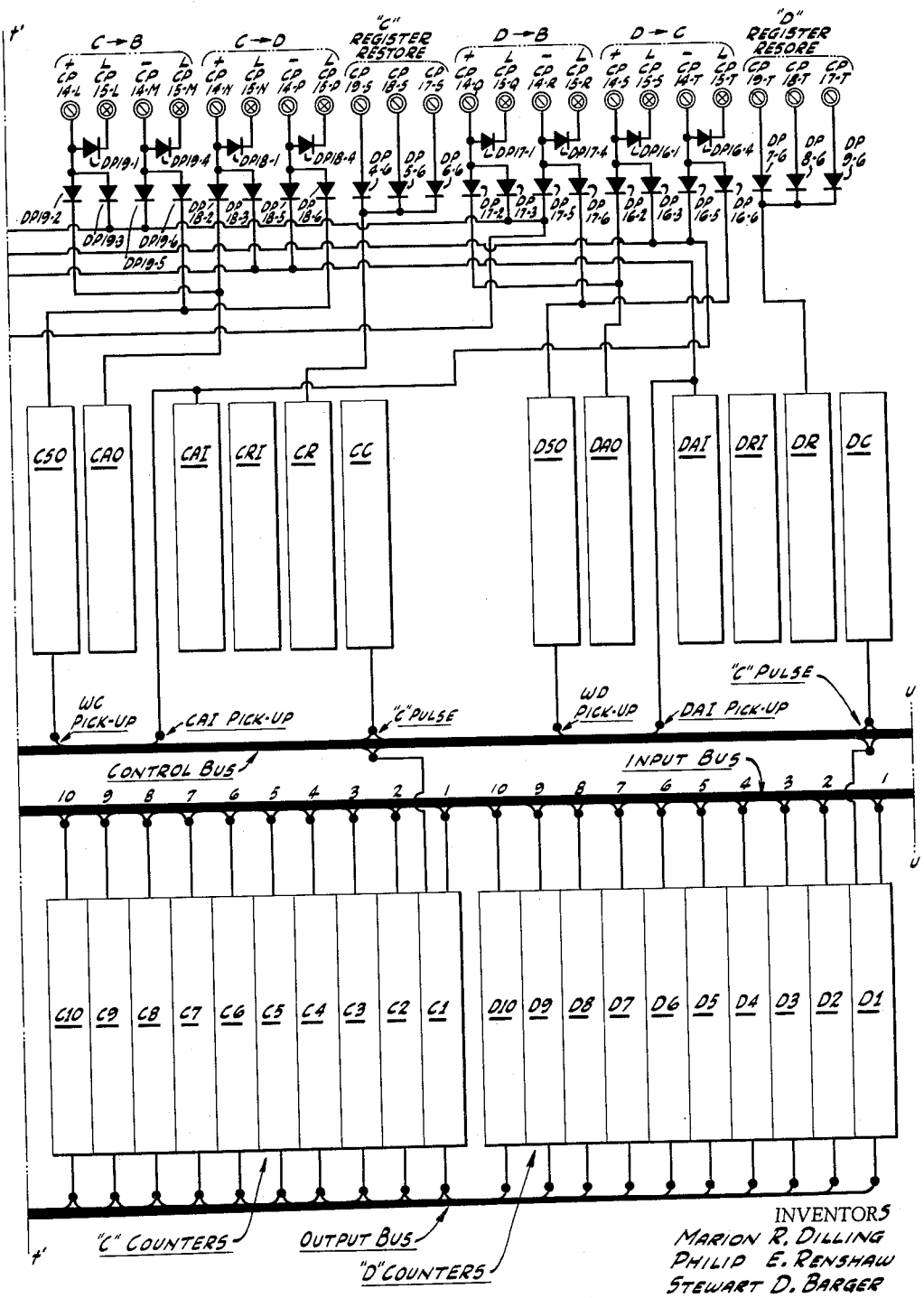

The manner in which the information stored in the B register is transferred to either the C or D registers will now be described. The internal wiring of the C register 37, and the D register 38, has not been shown in FIG. 50, as such wiring is identical to that of the B register, FIG. 49.

As was necessary in transferring the numbers stored in the A register from that register, a command pulse must be transmitted to the B register to initiate the transfer operation. Let it be assumed that the number "157" has been stored in the B register by the foregoing A to B transfer function, and that it is now desired to transfer this number from the B register 36 to the C register 37 when the typewriter carriage comes to rest in the 24th column position, or, that is, as soon as the carriage has come to rest following the typing of the last figure "7" in the 23rd column position. Let it also be assumed that it is desired to restore the B register to its original empty position following the transfer of its contents to the C register.

The following connections will be made on the control panel to accomplish the above desired results. The desired initiating command signal is the J-pulse generated when the typewriter carriage is at rest in the 24th column position. Accordingly, a jumper lead will be connected from the control panel hub CP 25–R, which is the hub in the R bank corresponding to the 24th typewriter column, to the + hub CP 14–G of the B→C section of the T bank. Since it is desired to restore the B register after the transfer function, a jumper will be connected from the L hub, CP 15–G, of the B→C section to the Restore B hub, CP 17–R of the M bank.

In order to follow the operation of the control relays and counters, it will be advantageous to present the sequence of operation in Table No. 5. FIGURE 54 is a simplified diagram of a portion of the B register, to illustrate more clearly the manner in which numerical information is transferred out of the B register.

emitter cycle, allowing the EC relay contacts B1—2 to resume their normally closed position.

Referring now to FIG. 49, the J-pulse, when generated, will appear at the hub CP 14–G. This pulse will be routed through diode DP21–2 to the unlatch coil of the BAO relay, to condition the B register for an add output function. The J-pulse is also routed from hub CP 14–G through diode DP21–3 to the unlatch coil of relay CAI to condition the C register to receive the information delivered to it. The J-pulse is also routed from hub CP 14–G through diode DP21–1 to the L hub CP 15–G, by jumper wire to the B register restore hub CP 17–R, through the diode DP3–6 to the unlatch coil of the BR relay, to condition the B register for restoration to empty condition following the transfer of information to the C register.

*Table No. 5*

TRANSFER OF NUMERICAL INFORMATION FROM B REGISTER

| | | | Counter B3 | | | Counter B2 | | | Counter B1 | | |
|---|---|---|---|---|---|---|---|---|---|---|---|
| Command signal | Relay picked up | Relay restored | Coil energized | S.R.O. position | Pulses to output line 3 | Coil energized | S.R.O. position | Pulses to output line 2 | Coil energized | S.R.O. position | Pulses to output line 1 |
| 1 | J | | | 1 | | | 5 | | | 7 | |
| 2 | G(1) | | BAO-U CAI-U BR-U WEB B-E BRI-E | 1 | | | 5 | | | 7 | |
| 3 | G(2) | | EC-E | 1 | | | 5 | | | 7 | |
| 4 | U | | B3-U | 1 | | B2-U | 5 | | B1-U | 7 | |
| 5 | 1 | | B3-E | 2 | | B2-E | 6 | | B1-E | 8 | |
| 6 | 2 | | B3-E | 3 | | B2-E | 7 | | B1-E | 9 | |
| 7 | 3 | | B3-E | 4 | | B2-E | 8 | | B1-E | 0 | |
| 8 | 4 | | B3-E | 5 | | B2-E | 9 | | | 0 | 1 |
| 9 | 5 | | B3-E | 6 | | B2-E | 0 | | | 0 | 2 |
| 10 | 6 | | B3-E | 7 | | | 0 | 1 | | 0 | 3 |
| 11 | 7 | | B3-E | 8 | | | 0 | 2 | | 0 | 4 |
| 12 | 8 | | B3-E | 9 | | | 0 | 3 | | 0 | 5 |
| 13 | 9 | | B3-E | 0 | | | 0 | 4 | | 0 | 6 |
| 14 | T | CC-E | CAI-E BAO-E BR-E | | 0 | 1 | | 0 | 5 | | 0 | 7 |
| 15 | C | | BRI-E CC-E WEB B-E | | 0 | | | 0 | | | 0 | |

(1) The J-pulse, generated by the typewriter as it comes to rest in the 24th column position, will be routed through the R channel commutator on the typewriter to the column 24 lead, to the control panel hub CP 25–R, by jumper to the + hub of the B→C section, hub CP 14–G, to be available to the computer unit B register control relays.

It will be noted that the transfer of the number "157" from the A to the B register was as a result of the A-pulse generated when the typewriter carriage was leaving the 23rd column. In order that the J-pulse generated by the carriage coming to rest in the 24th column be delayed until the A to B transfer function is completed, the J-pulse generator is provided with an interlock to prevent the generation of a J-pulse until the preceding transfer function has been terminated.

As has been noted in Table No. 3, the A to B transfer cycle is completed when the C-pulse is generated. And, as will be noted in Table No. 1, the EC relay will not be restored until the C-pulse has been passed to the emitter output line. Thus, the complete transfer function from A to B will be finished before the EC relay is restored. Referring to FIG. 35, it will be noted that the normally closed contacts B1—B2 of the EC relay are in series with the J-pulse trigger relay. Accordingly, as long as the EC relay has been energized, the circuit to the J-pulse trigger relay will be interrupted by the contacts B1—B2 of the EC relay. Therefore, even though the typewriter carriage has come to rest in column 24, the open contacts B1—B2 of the EC relay will prevent a trigger pulse from being applied to the J-pulse generator until after the EC relay has been restored, following the completion of the The energization of the unlatch coil of the CAI relay causes contacts B2—B3 to close, completing the circuit to the clutch to start the G-pulse generator, in a manner as when the BAI relay was energized in an A→B transfer function.

(2) The first G-pulse, G(1), appears on the G-pulse terminal and is routed through the now closed contacts B2—B3 of the BAO relay to the WB Pick-Up terminal of the control bus, through the control bus to the WB Pick-Up terminal, FIG. 51, through the normally closed contacts A1—A2 of the Web B relay to the escapement coil of the Web B relay. This relay conditions the emitter to begin its cycling operation.

The G(1)-pulse is also routed from the G-pulse terminal (FIG. 49) through the now closed contacts B3—B2 of the BR relay, through the normally closed contacts A1—A2 of the BRI relay to the escapement coil of the BRI relay.

(3) The next G-pulse, G(2), appears at the G-pulse terminal, FIG. 51, and is routed through the now closed contacts B7—B8 of the Web B relay to the Emitter Pick-Up terminal of the control bus, through the control bus to the Emitter Pick-Up terminal, FIG. 44, to start the emitter cycle.

(4) The first emitter pulse, the U-pulse, appears at the U-pulse terminal and is directly routed to the unlatch coils of each of the B register counters to permit any of the latched 10-push bars of the B register counters to return to their normal unlatched positions.

(5–14) The emitter roll pulses are now utilized for the first time in the interrogation of the B register. The roll pulse bus has ten roll pulses imposed upon it, and this bus is connected from the roll input terminal to each of the ten B register counters in parallel, so that the one set of ten pulses will interrogate each B register counter at the same time.

The set of ten roll pulses is routed from the roll input pulse bus through the now closed contacts D7—D8 of the BRI relay to the D2 contact of the B1 counter. The normally closed contacts D7—D8 of the BR relay are open since the BR relay latch lever has been unlatched in step 1, above, by the energization of the unlatch coil of the BR relay.

The first three roll pulses will be routed from the B1 counter contact D2 to D3 and thus to the B1 counter escapement coil. On the third pulse, the escapement wheel will have completed a full revolution and the 10-push bar will be operated to open the contacts D2—D3 and close the contacts D2—D1. Thus the opening of the contacts D2—D3 will prevent any of the remaining roll pulses from being impressed upon the escapement coil and the escapement wheel will be in the "0" or reset position. The closing of the contacts D2—D1 allows the remaining seven pulses to be routed from the contact D2 to contact D3 and through the now closed contacts D7—D8 of the BAO relay to the output bus line 1.

The set of ten roll pulses will appear simultaneously through the now closed contacts C7—C8 of the BRI relay and upon the contact D2 of the B2 counter. The first five roll pulses will be routed through the closed contacts D2—D3 to the B2 escapement coil, causing the escapement wheel to rotate through five angular steps until it returns to the 0 reference point. This in turn operates the 10-push bar to open the contacts D3—D2 and close the contacts D2—D1 to divert the remaining five roll pulses through the now closed contacts C7—C8 of the BAO relay to the output bus line 2.

In the same manner, the set of ten roll pulses appears simultaneously at the contact D2 of the B3 counter. Nine pulses are required to return the escapement wheel to its "0" position, and the 10-push bar will act to divert only the tenth roll pulse to the output bus line 3.

Under the assumed conditions, each of the other B register counters stood in the "0" position, that is, with no number stored therein. The set of 10 roll pulses will be applied to each of the D2 contacts of the remaining B1 counters and the escapement wheel of each will rotate as the escapement coil is pulsed. However, it will require the full set of ten pulses to return the escapement wheels to their original "0" position, at which time the 10-push bar of each counter will be actuated. There are no remaining roll pulses and thus no pulses will be directed to the output bus lines from those counters.

Thus, after the full cycle of the ten roll pulses has been completed, the output bus line 3 will have 1 pulse, the output bus line 2 will have 5 pulses, and the output bus line 3 will have 7 pulses, corresponding to the number "157" stored in the B register. The B register counters will also have been reset to their original "0" position so that the B register is now cleared of its information.

The pulses appearing on the output bus lines will be received in the C register in exactly the same manner as the number "157" was originally stored in the B register. (See Table No. 3.)

The T-pulse appears on the T-pulse terminals at the same time that the tenth roll pulse appeared at the B register counters, as both of these pulses were generated by the same G-pulse, G(12), in the emitter.

The T-pulse is routed from the T-pulse terminal (FIG. 49) through the now closed contacts A3—A2 of the CAI relay to the escapement coil of the CAI relay, which allows the C register to be taken off the input bus. The CAI relay contacts will operate to remove the C register from the input bus after the last roll pulse has been stored in the C register counters, however.

The T-pulse will also be routed from the T-pulse terminal through the now closed contacts B3—B2 of the BRI relay to the escapement coils of the BR and the BAO relays to return them to their original position.

The T-pulse also acts to energize the escapement coil of the CC relay to condition the C register for a carry function, as discussed in steps 14 and 15 of Table No. 4. The circuits for the actuation and de-actuation of the CC relay are identical to the corresponding operation of the BC relay discussed in Table No. 4, and need no further discussion.

(15) The final emitter pulse, the C-pulse, appears at the C-pulse terminal and is routed through the now closed contacts A3—A2 of the BRI relay to the escapement coil of the BRI relay, to cause the relay to assume its initial position.

The C-pulse also appears at the C-pulse terminal (FIG. 51) and is routed through the now closed contacts A3—A2 of the WB relay to the WB escapement coil to return this relay to its original position.

Similarly, the C-pulse appears on the escapement coil of the CC relay to restore that relay.

The emitter has now completely its cycle and the EC relay contacts C2—C3 (FIG. 44) will open to de-energize the clutch. This completes the transfer from the B to the C registers, and the computer unit is again at rest, awaiting the next function.

In the preceding illustration, the B register counters were restored to their zero position in the process of transferring the information from the B register. However, it may be desirable to retain the stored number in the B register while transferring it to another register. If such is the case, the jumper wire from the L hub, CP 15–G, to the B register restore hub, CP 17–R, should be omitted. If such is done, then the unlatch coil of the BR relay will not be energized as it was in step 1 above, and the normally closed contacts of the BR relay connecting the roll input bus to the escapement coils of the B register counter will remain closed during the application of the roll pulses to the B register counters. Thus all ten roll pulses will be applied to each escapement coil of the B register counter, for the D2—D3 contacts of the B register counters, which open to shunt the roll pulses from the escapement coils, are by-passed by the normally closed contacts of the BR relay. Since each escapement coil is pulsed ten times, each escapement wheel will rotate through 360 degrees, returning to its position before the application of the roll pulses, and the static read-out contacts will be in their original position, ready for any succeeding operation.

MULTIPLICATION

Having discussed the manner in which the computer unit operates to add, subtract and transfer information, we may now consider the multiplication function. The operational circuits for the multiply function are shown in FIGS. 39–43. In general, the process of multiplication requires the multiplicand to be stored in the B register, and the multiplier to be stored in the A register, with the product of these two registers being transferred to either or both of the C or D registers. G-pulses are used to interrogate the A register position, sequentially from the lowest position to the highest position. If a number is stored in a particular A register position, a corresponding set of a "times table" 33 is selected, so that digit pulses may be gated through the times table and the B register static read out to the output line. The output line is shifted and a second set of digit pulses is sent through the times table and the B register static read out to the next output line. As, for example, suppose the A register has a "7" in the position being interrogated, and the B register has a "6" contained therein in a particular position. The "7" set of the times table will be selected and 2 digit pulses will be gated through the times table set and the B register static read out, to the output line connected to the B register position having the "6" contained therein. The output lines will then be shifted to connect the next output line to the particular B register position, and 4 digit pulses will be gated through the times table set and the B register static read out to the new output line, giving a final output of the two output lines of 42, which corresponds to the product of 6 times 7.

The interrogation of the A register position is continued in the same manner until all positions have been interrogated and multiplied against the contents of the B register.

Again, the manner of operation of the computer unit during a multiplication cycle may be best described by following the operation of the various components during a typical multiplication cycle. Let us assume that the operator wishes to calculate the total cost of 45 items at a unit cost of $.17 per item, and that the product should be stored in the C register for any later operation.

In a manner as described heretofore, the FIGURE 45 is typed on the typewriter, and the figure is put into the A register and then transferred to the B register. Next, the figure representing the per unit cost, $.17, is placed in the A register. For reasons which will become apparent, it will be desirable to have the decimal point in the product between the third and fourth C register positions. Accordingly, the typewriter must be wired through the control panel into the A register so that the decimal point will separate the third and fourth A register positions. That is, in the example chosen, the $.17 will be placed in the A register with the "1" stored in the third position, and the "7" will be stored in the second position. All of the other A register positions will indicate a zero input.

Subsequent to the storage of this last number in the A register, a control signal from the typewriter, such as a J-pulse from a subsequent carriage position, may be utilized to initiate the multiplication cycle. The sequence of operations may be made more clear with reference to Table No. 6.

*Table No. 6*

MULTIPLICATION

| | Command signal | Relay picked up | Relay restored | Digit pulses to B register output bus lines | | | | Digit pulses on input to C register positions | | | | | | | |
|---|---|---|---|---|---|---|---|---|---|---|---|---|---|---|---|
| | | | | | | | | 4 | | 3 | | 2 | | 1 | |
| | | | | 4 | 3 | 2 | 1 | In | S.R.O. | In | S.R.O. | In | S.R.O. | In | S.R.O. |
| 1 | J | WXC-U | | | | | | 0 | | 0 | | 0 | | 0 | |
| 2 | G | BMS-E | | | | | | 0 | | 0 | | 0 | | 0 | |
| | | SLN-E | | | | | | | | | | | | | |
| 3 | G(2) | SL1-E | SLNE | | | | | 0 | | 0 | | 0 | | 0 | |
| 4 | G(3) | T7R-E | | | | | | 0 | | 0 | | 0 | | 0 | |
| 5 | G(4) | EC-E | | | | | | 0 | | 0 | | 0 | | 0 | |
| 6 | U | CAI-U | | | | | | 0 | | 0 | | 0 | | 0 | |
| 7 | 1-9 | | | | 8 | 5 | | 0 | 8 | 8 | 5 | 5 | | 0 | |
| 8 | T | T7L-E | T7R-E | | | | | 0 | | 8 | | 5 | | 0 | |
| | | CC-E | CAI-E | | | | | | | | | | | | |
| 9 | C | SL2-E | SL1-E | | | | | 0 | | 8 | | 5 | | 0 | |
| | | | CC-E | | | | | | | | | | | | |
| 10 | G(17) | EC-E | | | | | | 0 | | 8 | | 5 | | 0 | |
| 11 | U | CAI-U | | | | | | 0 | | 8 | | 5 | | 0 | |
| 12 | 1-9 | | | 2 | 3 | | 2 | 2 | 3 | 1 | | 5 | | 0 | |
| 13 | T | CC-E | CAI-E | | | | | 2 | | 1 | | 5 | | 0 | |
| | | | T7L-E | | | | | | | | | | | | |
| 14 | C | | CC-E | | | | 1 | 3 | | 1 | | 5 | | 0 | |
| 15 | G(30) | 71R-E | | | | | | 3 | | 1 | | 5 | | 0 | |
| 16 | G(31) | EC-E | | | | | | 3 | | 1 | | 5 | | 0 | |
| 17 | U | CAI-E | | | | | | 3 | | 1 | | 5 | | 0 | |
| 18 | 1-9 | | | 4 | 5 | | 4 | 7 | 5 | 6 | | 5 | | 0 | |
| 19 | T | CC-E | CAI-E | | | | | 7 | | 6 | | 5 | | 0 | |
| 20 | C | SL3-E | SL2-E | | | | | 7 | | 6 | | 5 | | 0 | |
| | | | CC-E | | | | | | | | | | | | |
| | | | T1R-E | | | | | | | | | | | | |
| 21 | G(44) | SL4-E | SL3-E | | | | | 7 | | 6 | | 5 | | 0 | |
| 22 | G(45) | SL5-E | SL4-E | | | | | 7 | | 6 | | 5 | | 0 | |
| 23 | G(46) | SL6-E | SL5-E | | | | | 7 | | 6 | | 5 | | 0 | |
| 24 | G(47) | SL7-E | SL6-E | | | | | 7 | | 6 | | 5 | | 0 | |
| 25 | G(48) | SL8-E | SL7-E | | | | | 7 | | 6 | | 5 | | 0 | |
| 26 | G(49) | SL9-E | SL8-E | | | | | 7 | | 6 | | 5 | | 0 | |
| 27 | G(50) | EC-E | | | | | | 7 | | 6 | | 5 | | 0 | |
| 28 | U | AR-U | | | | | | 7 | | 6 | | 5 | | 0 | |
| | | CAI-U | | | | | | | | | | | | | |
| 29 | 1-9 | | CAI-E | | | | | 7 | | 6 | | 5 | 5 | 5 | |
| 30 | T | CC-E | AR-E | | | | | 7 | | 6 | | 5 | | 5 | |
| | | | A regis. relays | | | | | | | | | | | | |
| 31 | C | BR-E | CC-E | | | | | 7 | | 6 | | 5 | | 5 | |
| | | | SL9-E | | | | | | | | | | | | |
| | | | BMS-E | | | | | | | | | | | | |
| | | | WXC-E | | | | | | | | | | | | |
| 32 | G(63) | Web B-E | | | | | | 7 | | 6 | | 5 | | 5 | |
| | | BRI-E | | | | | | | | | | | | | |
| 33 | G(64) | EC-E | | | | | | 7 | | 6 | | 5 | | 5 | |
| 34 | U | | | | | | | 7 | | 6 | | 5 | | 5 | |
| 35 | 1-9 | | | | | | | 7 | | 6 | | 5 | | 5 | |
| 36 | T | | BR-E | | | | | 7 | | 6 | | 5 | | 5 | |
| 37 | C | | BRI-E | | | | | 7 | | 6 | | 5 | | 5 | |
| | | | WB-E | | | | | | | | | | | | |

MULTIPLICATION INVOLVING SHIFT RIGHT RELAYS

| | Command signal | Relay picked up | Relay restored | 4 | 3 | 2 | 1 | In | S.R.O. | In | S.R.O. | In | S.R.O. | In | S.R.O. |
|---|---|---|---|---|---|---|---|---|---|---|---|---|---|---|---|
| A | A | SR2-U | | | | | | 0 | | 0 | | 0 | | 0 | |
| 6 | U | SRN-E | | | | | | 0 | | 0 | | 0 | | 0 | |
| 7 | 1-9 | | | | 8 | 5 | | 0 | | 0 | | 0 | 8 | 8 | |
| 12 | 1-9 | | | 2 | 3 | | | 0 | | 0 | 2 | 2 | 3 | 1 | |
| 14 | C | | | | | | | 0 | | 0 | 1 | 2 | 3 | | |
| 18 | 1-9 | | | 4 | 5 | | | 0 | | 0 | 4 | 7 | 5 | 6 | |
| 29 | 1-9 | | | | | | | 0 | | 0 | | 7 | 5 | 1 | |
| 31 | C | | SR2-E | | | | | 0 | | 1 | 8 | | 1 | | |
| 37 | C | | SR2-E | | | | | 0 | | 0 | | 8 | | 1 | |
| | | | SRN-E | | | | | | | | | | | | |

Figure 43:
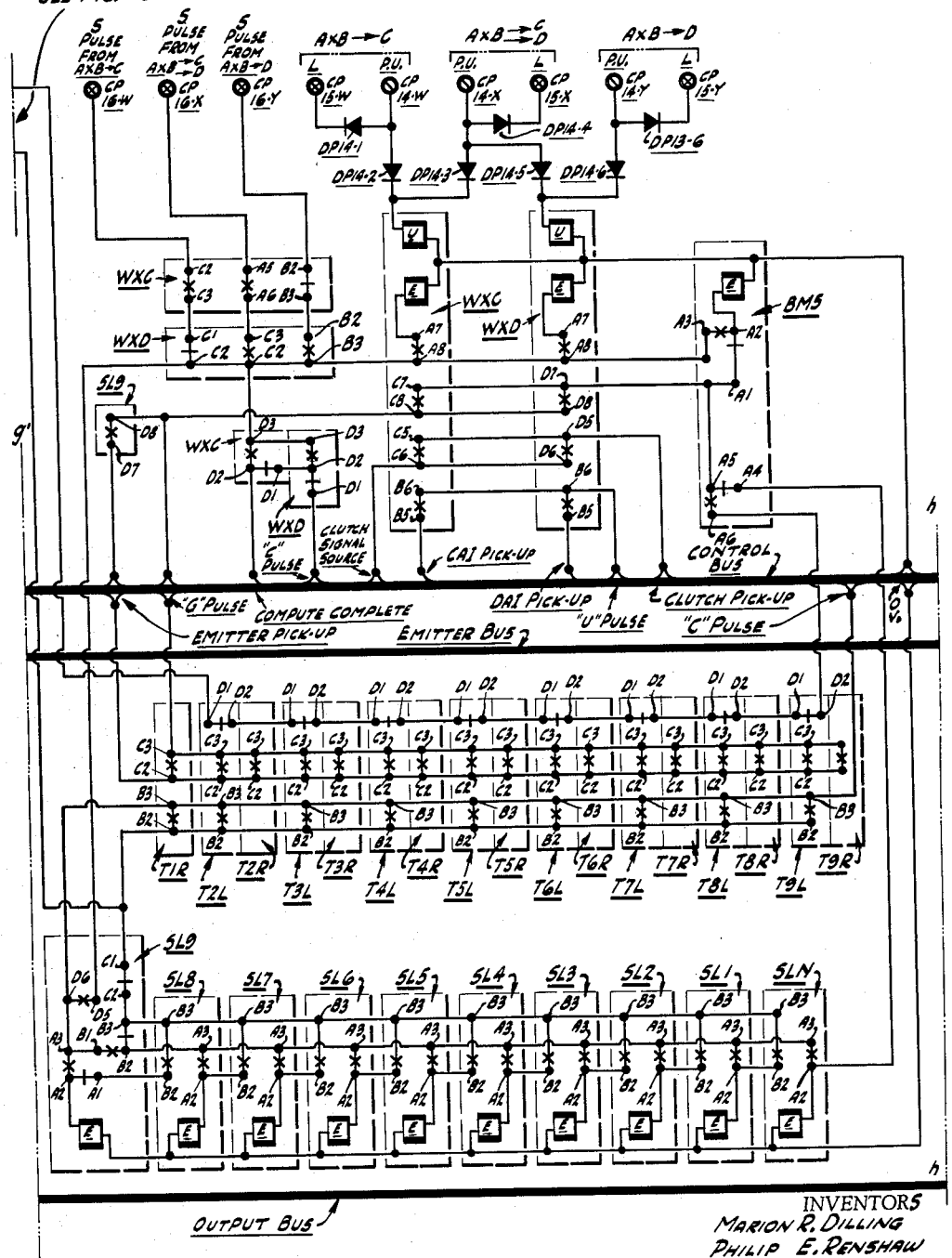

(1) The J-pulse originating from the chosen carriage position is routed from the control panel section R by a jumper wire to the C hub of the Mult section, hub CP 14–W (FIG. 43). From this hub, the J-pulse passes through diode DP14–2 to the unlatch coil of the WXC relay. Contacts C5—C6 of the relay close, completing the circuit from the Clutch Signal Source terminal to the Clutch Pick-Up terminal to start the G-pulse generator.

Figure 41:
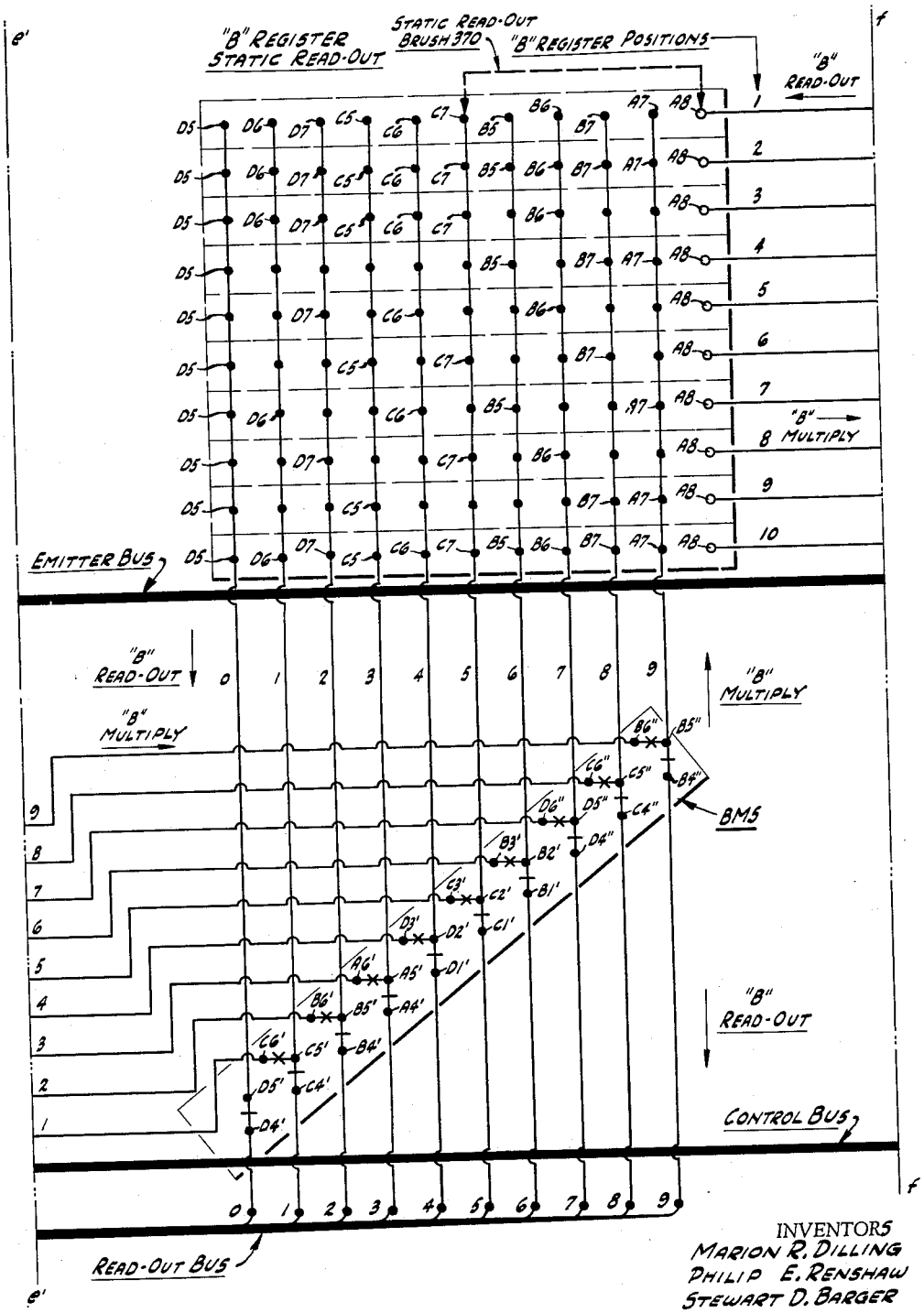
Figure 42:
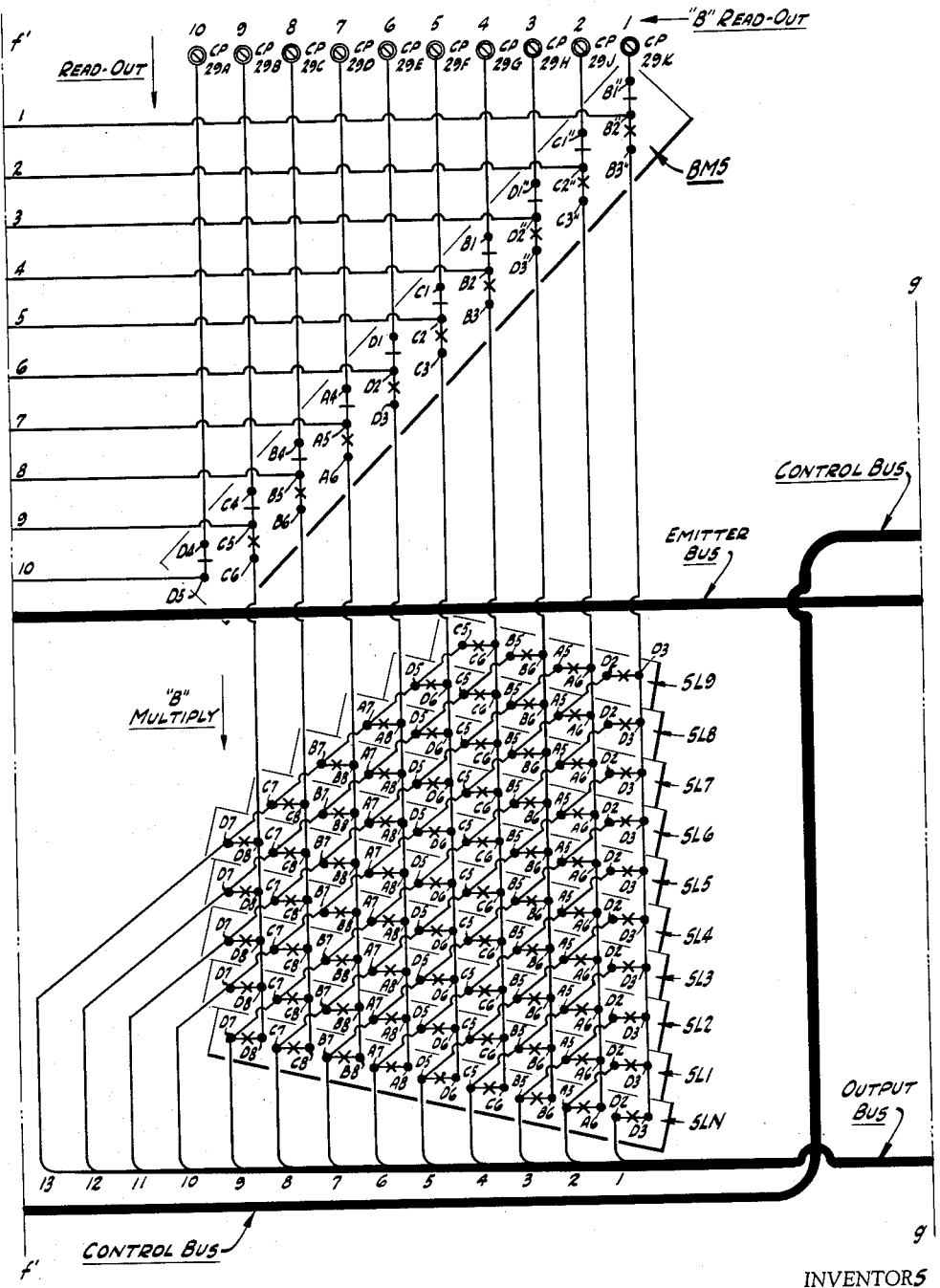

(2) The first G-pulse, G(1), appears on the G-pulse terminal and is routed through the now closed contacts C8—C7 of the WXC relay to the escapement coil of the BMS relay. This relay switches the B register static read-out contacts from a normal read-out position to a multiply read-out position (FIGS. 41 and 42).

The G(1)-pulse is also routed through the now closed contacts C8—C7 of the WXC relay, and the normally closed contacts A5—A4 of the BMS relay to the escapement coil of the SLN relay.

(3) The next G-pulse, G(2), passes through the now closed contacts C8—C7 of the WXC relay, the now closed contacts A5—A6 of the BMS relay, the normally closed contacts D2—D1 of the T9L, T8L, T7L, T6L, T5L, T4L, T3L and T2L relays, respectively, and appears on the multiplier test line, from where it passes through the now closed contacts C3—C2 of the SLN relay (FIG. 40) to the first A register position. As none of these relays has been energized, the pulse passes through the normally closed contacts D4—D5 of the A17 relay, D4—D5 of the A14 relay, B4—B5 of the A12 relay, A5—A4 of the A11 relay, to the shift advance pulse line, through the normally closed contacts C1—C2 of the relay SL9 (FIG. 43), through the now closed contacts B3—B2 of the SLN relay to the escapement coil of the SL1 relay. At the same time, the shift advance pulse, after passing the contacts C1—C2 of the SL9 relay, also passes through the normally closed contacts B3—B2 of the SL9 relay, through the now closed contacts A3—A2 of the SLN relay to the escapement coil of the SLN relay to return that relay to its original position.

(4) The next pulse, G(3), follows the same initial route as the preceding pulse, and appears on the multiplier test line, passing through the now closed contacts C2—C3 of the SL1 relay (FIG. 40) to appear at the second A register position. Since the number "7" has been stored in this position, a circuit is now closed through the contacts D5—D6 of the A27 relay, the normally closed contacts D5—D4 of the A22 relay, the normally closed contacts D5—D4 of the A21 relay, to the 7 line of the times relay pick-up bus, through the normally closed contacts A1—A2 of the T7R relay to the escapement coil of the T7R relay.

(5) The next G-pulse, G(4), is routed from the G-pulse terminal (FIG. 43) through the now closed contacts C3—C2 of the T7R relay to the Emitter Pick-Up terminal, from where it passes to energize the EC relay to start the emitter, as in previous operations.

(6) The first emitter pulse, the U-pulse, is routed from the U-pulse terminal, through the now closed contacts B6—B5 of the WXC relay to the CAI pick-up terminal, and from there to the escapement coil of the CAI relay to condition the C register to receive the multiplied information, as in previous operations.

Figure 39:
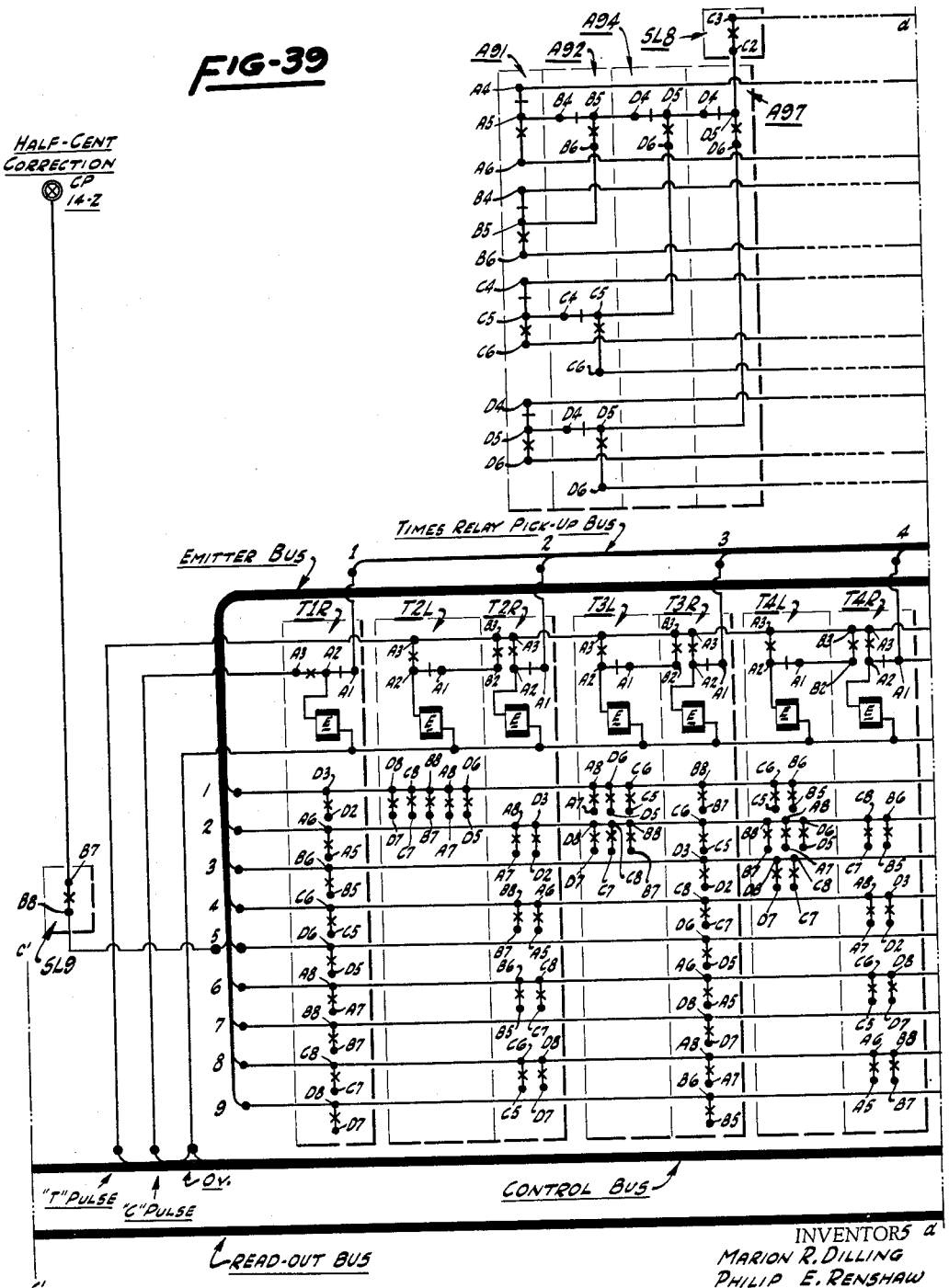
Figure 40:
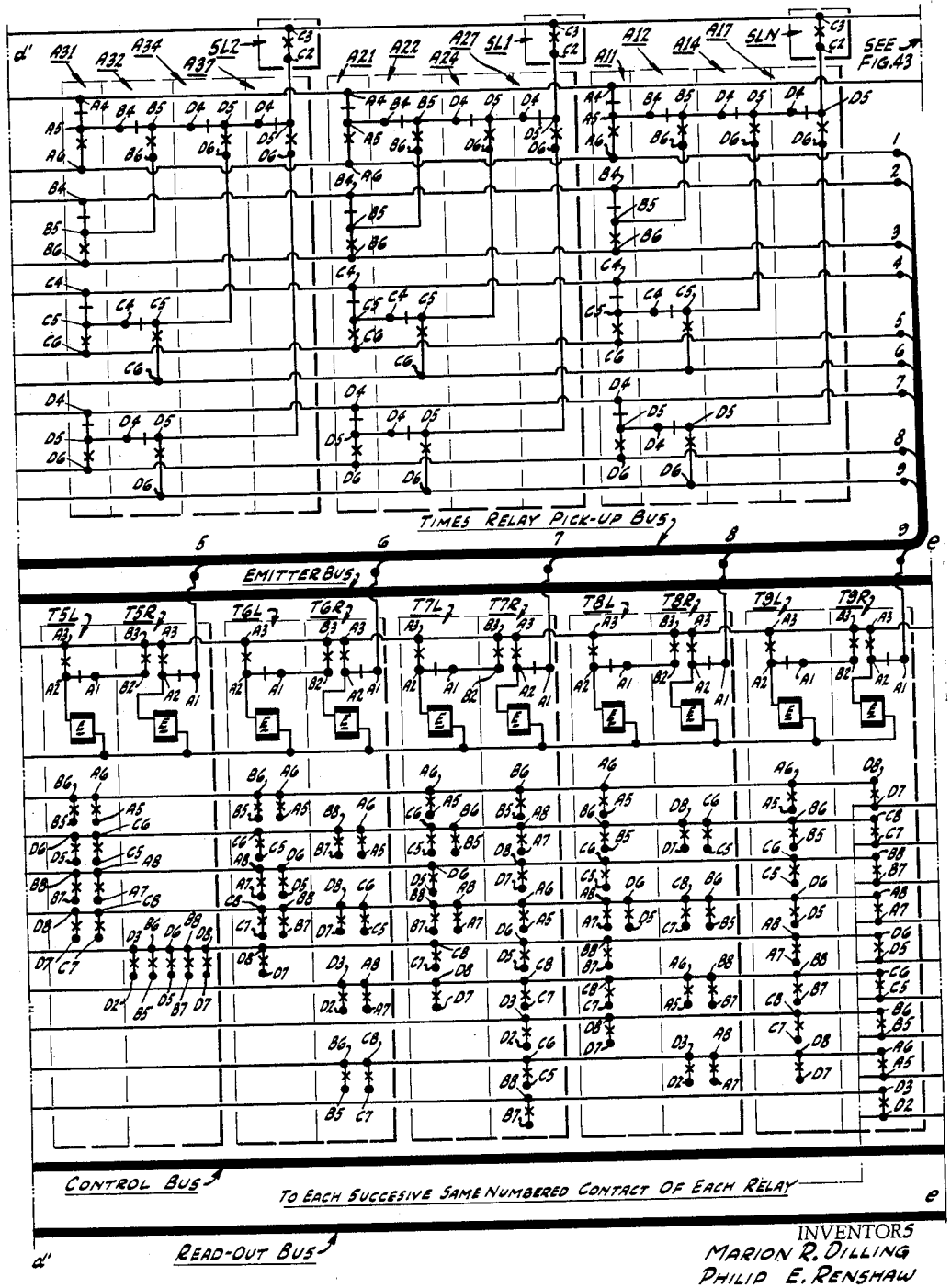

(7) The next signals, the emitter digit pulses 1–9, are fed by the emitter digit bus into the "times table" (FIGS. 39 and 40). This times table is conventional and need not be described in detail. Suffice it to say that the function of the times table is to gate a proper number of emitter digit pulses through a combination of switches selected by the multiplier test pulse and the B register contents to the output bus. In the attempt to illustrate the times table more clearly, a portion of the actual wiring connections between the various relay switches has been omitted from the drawings, although such wiring is essential for the operation of the computer unit. As, for example, in the T1R relay (FIG. 39), the switch contacts D2, A5, B5, C5, D5, A7, B7, C7 and D7 are shown as being unconnected to any circuit. However, these switch contacts are in actual practice connected to the same reference numbered switch contacts of the T9R (FIG. 40). That is, the D2 contact of the T1R relay is connected to the D2 contact of the T9R relay, the A5 contact of the T1R relay is connected to the A5 contact of the T9R relay, etc. Similarly, all of the apparently unconnected switch contacts of the T2L, T2R, T3L, T3R . . . T8L, T8R and T9L relays are actually connected to the corresponding switch contacts of the T9R relay.

Under the assumed problem, the five pulses on the emitter digit bus line 5 (FIG. 39) pass to the T7L relay contacts (FIG. 40), through the now closed contacts D6—D5 of the T7L relay, to the D5 switch terminal of the T9R relay, to and through the now closed contacts C′3—C′2 of the BMS relay to the C7 contacts of the B register counters static read-out switches. The first position of the B register, B1, has a five stored in it and thus a circuit is complete from the C7 terminal of that counter to the A8 terminal through the static read-out brush of the B1 counter, and the five emitter pulses pass through these terminals to and through the now closed contacts B″2—B″3 of the BMS relay, to and through the now closed contacts D2—D3 of the SL1 relay to the second line of the output bus, in turn being passed to the input of the second C register counter, C2, in a like manner as a B→C transfer, discussed above.

At the same time, the eight digit pulses on the emitter digit bus line 8 are routed to and through the now closed contacts C6—C5 of the T7R relay, to the C5 terminal of the T9R relay, through the now closed contacts D′3—D′2 of the BMS relay, the now connected contacts A8—C6 of the second B register counter B2 by the static read-out brush, the now closed contacts C″2—C″3 of the BMS relay, the now closed contacts A6—A5 of the SL1 relay to the third line of the output bus, in turn being passed to the input of the third C register counter, C3.

(8) The T-pulse appears at the T-pulse terminal (FIG. 39) and passes through the now closed contacts B3—B2 of the T7R relay, and the normally closed contacts A1—A2 of the T7L relay to energize the escapement coil of the latter relay. The same pulse passes through the now closed contacts A3—A2 of the T7R relay to the escapement coil of this relay to return its switches to their original position.

The T-pulse also energizes the escapement coil of the CAI relay, to restore its switch contacts to their normal positions, and also energize the CC relay to place its switches in condition for a carry function, as in previous operations.

(9) The C-pulse appears at the C-pulse terminal (FIG. 43) and is routed through the now closed contacts B3—B2 of the T7L relay, to and through the normally closed contacts C1—C2 of the SL9 relay, to the escapement coils of the SL1 and SL2 relays, in a manner similar to step 3 above, to cause the SL1 relay contacts to return to their normal positions, and to cause the SL2 contacts to move to their operative positions.

The C-pulse also energizes the CC relay to restore its switches to their normal positions after the carry function.

(10) As the clutch is still energized through the WXC relay contacts B5—B6, the G-pulses continue to be created. The next G-pulse, G(17), is routed through the now closed contacts C3—C2 of the T7L relay to the Emitter Pick-Up terminal and thus to the EC relay to initiate the emitter operation, as in step 4.

(11) The U-pulse picks up the CAI relay, as in step 5.

(12) The emitter digit pulses 1–9 are now transmitted to the T7L contacts, and a completed circuit exists for the emitter digit bus line 3 through the now closed contacts D6—D5 of the T7L relay to the D5 terminal of the T9R relay, through the still closed contacts C′3—C′2 of the BMS relay, to and through the first position B register static read-out contacts C7—A8, through the still closed contacts B″2—B″3 of the BMS relay, through the now closed contacts D3—D2 of the SL2 relay, to the output bus line 3, and thus over to the input of the third position C register counter, C3. A completed circuit also exists for the emitter digit bus line 2, through the now closed contacts C6—C5 of the T7L relay to the C5 contact of the T9R relay, the contacts D′3—D′2 of the BMS relay, through the second position B register static read-out contacts C6—A8, through contacts C″2—C″3 of the BMS relay, through the contacts A6—A5 of the SL2 relay to the output bus line 4, and thus over to the input of the fourth position C register counter, C4.

(13) The T-pulse picks up the CC relay, and drops out the CAI relay as in step 8. The T-pulse also appears at the T-pulse terminal (FIG. 39) and passes through the now closed contacts A3—A2 of the T7L relay to the escapement coil of that relay to return its switches to normal position.

(14) The C-pulse appears as a carry pulse at the C register and is used to advance the fourth position C register counter, C4, one step, since the three pulses added to the eight stored in the third counter caused the ten bar to be latched, all as similar to the discussion above of adding information to the B register.

The C-pulse also energizes the CC relay, as in step 9.

From the foregoing, we have seen that we now have stored in the C register, in positions four, three and two, respectively, the numbers 3, 1 and 5, thus representing the multiplication of 7 times 45.

(15) The next pulse, G(30), again is routed as a multiplier test pulse, as in step 4, and is passed through the now closed contacts C3—C2 of the SL2 relay (FIG. 39) to appear at the third A register position. Since a "1" appears in this position, a circuit is complete through the normally closed contacts D5—D4 of the A37 relay, D5—D4 of the A34 relay, B5—B4 of the A32 relay and the now closed contacts A5—A6 of the A31 relay to the time relay pick-up bus, line 1, and from there through the normally closed contacts A1—A2 of the T1R relay to the escapement coil of the T1R relay.

(16) The next G-pulse, G(31), passes through the now closed contacts C3—C2 of the T1R relay (FIG. 43) to start the emitter in its cycling operation, similar to step 5.

(17) The U-pulse again picks up the CAI relay, as in step 6.

(18) The emitter digit bus again interrogates the times table, as in step 7, the only difference being that now the multiplier is a "1" instead of a "7," and thus the T1R relay is the controlling relay, rather than the T7R relay. The emitter digit bus line 5 has a completed circuit through the now closed contacts D6—D5 of the T1R relay to the D5 terminal of the T9R relay, through the still closed contacts C′3—C′2 of the BMS relay, the first position B register static read-out contacts C7—A8, through the still closed contacts B″2—B″3 of the BMS relay, through the still closed contacts D3—D2 of the SL2 relay, to the output bus line 3, and thus the five digit pulses are delivered to the input of the third position C register counter, C3.

A similar completed circuit is found for the emitter digit bus line 4, through the now closed contacts C6—C5 of the T1R relay to the C5 terminal of the T9R relay, through the contacts D′3—D′2 of the BMS relay, the second position B register static read-out contacts C6—A8, the contacts C″2—C″3 of the BMS relay, the contacts A6—A5 of the SL2 relay, to the output bus line 4, sending four digit pulses to the input of the fourth C register counter C4.

These digit pulses, when added to the contents already in the C register, give a total in the fourth, third and second positions, respectively, of 7, 6 and 5, which represent the true product of 45 times $.17, with the decimal point being between the fourth and third positions, or, a correct answer of $7.65, when the product is read out of the C register.

(19) The T-pulse sets up the CC relay and drops out the CAI relay, as in step 8.

(20) The C-pulse drops out the CC relay, as in step 9, and also picks up the SL3 relay and drops out the SL2 relay in a manner similar to step 9, when the SL2 relay was picked up and the SL1 relay was dropped out.

The C-pulse also appears on the C-pulse terminal (FIG. 39), and is routed through the now closed contacts A3—A2 of the T1R relay to the escapement coil of that relay to restore it to the original position.

(21–26) The succeeding G-pulses, G(44) through G(49), interrogate the A register position as multiplier test pulses, in a manner similar to step 3, but since these positions have no numbers stored within them, the multiplier test pulses pass out to the shift advance pulse line to operate successively the shift left relays SL4—SL9.

(27) The contacts D8—D7 of the SL9 relay close to complete a circuit from the G-pulse terminal through those contacts to the Emitter Pick-Up terminal and the G(50)-pulse is so routed so that the emitter begins another cycle.

(28) The U-pulse again picks up the CAI relay, as in step 6.

Referring to FIG. 48, it will be seen that the SL9 relay contacts C7—C8 are now closed, allowing the U-pulse to be passed through those contacts, through the normally closed contacts D1—D2 of the ARS relay to the unlatch coil of the AR relay, to condition the A register for restoration upon the completion of the multiplication function.

(29) The emitter digit pulses again appear on the emitter digit bus, to provide a "half-cent correction" to the multiplication product now stored in the C register. The half-cent correction line is connected through the now closed contacts B7—B8 of the SL9 relay to the emitter digit bus line 5, so that five pulses are now sent out on this line. These pulses appear at the control panel hub CP 14–Z, which has been connected by jumper wire to the input bus position one, hub CP 18–Z, so that the five digit pulses are transmitted to the first position of the C register. With this half-cent correction added to the previous contents of the C register, the final figure stored in that register will be $7.655, but the final figure 5 will not affect the true answer for when the information will be finally obtained from the C register, the final position will not be wired for read-out purposes as it represents a fraction of a cent and may be disregarded in the preparation of the final bill.

(30) The T-pulse picks up the CC relay and drops out the CAI relay, as in step 8. The T-pulse also restores the A register and the AR relay as in step 6 of Table No. 2.

(31) The C-pulse drops out the CC relay, as in step 9. The C-pulse also appears at the C-pulse terminal (FIG. 43) and passes through the now closed contacts A3—A2 of the SL9 relay to the escapement coil of that relay to return its switches to their original position. Simultaneously, the C-pulse is gated through the now closed contacts D6—D5 of the SL9 relay and through the now closed contacts A3—A2 of the BMS relay to the escapement coil of that relay to return the BMS relay contacts to their original position. The C-pulse is also passed through the now closed contacts A8—A7 of the WXC relay to the escapement coil of the WXC relay to restore the contacts of that relay to their original position. In addition, the C-pulse is also passed through the normally closed contacts C2—C1 of the WXD relay and the still closed contacts C3—C2 of the WXC relay to appear at the S hub on the control panel, CP 16—W, in the A×B→C section. If it is desired to restore the B register to zero position following the multiplication function, a jumper wire will have been connected from this last-mentioned control panel hub to the B Register Restore control panel hub CP 19–R. This S-pulse is thus conducted through the diode DP1-6 to the unlatch coil of the BR relay, to condition the B register for restoration.

Finally, the C-pulse also passes through the still closed contacts D3—D2 of the WXC relay to appear at the compute complete terminal of the control bus. It is this signal which may be used to restore the A register, as discussed in connection with the previously discussed transfer of information from the A register.

(32-37) These steps restore the B register in the same manner as in steps 2 through 16 in Table No. 5, the only difference being that in the present operation the BAO and CAI relays are not energized, and thus there is no transfer of information from the B register as it is being restored to its original zero position.

The process of multiplication is now complete, with the final product stored in the C register, and with the A and B registers being restored to their zero conditions.

It is important to note that the multiplication operation has been performed with the use of a single B register static read out for each B register counter, and that the product has been sent directly to the C register from the B register.

With the foregoing discussion in mind, it is now convenient to discuss the operations of the "shift right" components, and the effect of the half-cent correction.

One usage of the shift right section 25 of the computer, illustrated in FIG. 45, is in a multiplication process, as, for example, where it is desired to calculate the price of 45 units at a cost of $.17 per hundred units, instead of at a cost of $.17 per unit. To avoid the necessity for the operator to mentally transpose the cost per hundred unit into the cost per each unit, the computer may be set up to handle this operation automatically. The control panel is wired in the same manner as in the multplication function previously described, and the "45" is first put into the A register and transferred to the B register, and the "17" is then put into the A register. Since the "17" now represents the cost per hundred units, the product will be $.0765 instead of the $7.65 obtained previously, or, that is, the product must be shifted two positions to the right so that the decimal point will be in the proper place. This is accomplished by connecting the "C" type bar of the typewriter to the computer so as to operate the Shift Right Two relay, SR2. This may be done by taking an A-pulse from the typewriter in the carriage position immediately following the typing of the "7" and connecting it to the control panel hub CP 17-W, through the C key contact A1, back to control panel hub CP 18-W, and by jumper wire to the Shift Right Two control panel hub, CP 16-U.

Referring again to Table No. 6, and particularly the last portion thereof, a sequence of operations involving the use of the Shift Right Relays is illustrated. As the majority of steps in the present operation are identical to those previously discussed in a multiplication operation, only those steps which differ will be discussed. An additional step, "A," is necessary for the conditioning of the computer unit to perform a shift right function, and occurs before the remaining numbered steps. The omitted steps, e.g. 1-5, are identical with the previous similarly numbered steps, and will not again be discussed.

A. Thus, after the operator types the number "17," storing this information in the A register, this "17" representing the cost per hundred units, the operator then types the letter "C," providing a visual indication on the bill that the cost of the items is per hundred units. The typing of the letter "C" also passes an A-pulse through the route just described to the control panel hub CP 16-U, through the diode DP15-1 to the unlatch coil of the SR2 relay, to condition the output bus lines to be connected to the input bus lines in such a manner as to cause the two buses to be shifted with respect to each other.

(6) The U-pulse, in addition to picking up the CAI relay as before, also appears at the U-pulse terminal (FIG. 45) and passes through the now closed contacts B3—B2 of the SR2 relay, and the normally closed contacts A3—A2 of the SRN relay to the escapement coil of that relay.

(7) The emitter digit pulses are applied through the times table and B registers to the output bus as before. The eight digit pulses on the output bus line 3 pass through the now closed contacts D7—D8 of the SR2 relay to the input bus line 1, and from there to the input of the first position C register counter, C1. The five digit pulses on the output bus line 2 no longer have a completed circuit to the input bus, and thus are not carried into the C register.

(12) The next sequence of digit pulses puts two pulses on the output bus line 4, and three pulses on the output bus line 3. The two pulses on output bus line 4 are routed through the now closed contacts C7—C8 of the SR2 relay to appear on the input bus line 2, and the three pulses on the output bus line 3 pass through the now closed contacts D7—D8 of the SR2 relay to appear on the input bus line 1.

(14) The carry pulse acts to add one pulse to the second C register counter C2, as the C1 counter has gone through a complete revolution by the addition of the three pulses to the first eight pulses.

(18) The next sequence of digit pulses puts four pulses on the output bus line 4 and five pulses on the output bus line 3. As in step 12, these pulses are shifted to the input bus lines 2 and 1, respectively.

The C register has the following numbers stored in the counter 0.076 with the decimal point in the proper position with relation to the C register positions. It will be noted that the first C register position has a fraction of a cent (.006) stored in the counter. Under modern billing operations, it is desirable to eliminate the numbers three or more places to the right of the decimal in the final presentation of the bill, but only if the third decimal place is less than half a cent. If the third decimal place is a half a cent or more, the second decimal place should be raised one unit. This is accomplished in the next step.

(29) The half-cent correction has been wired to the input bus line 1, and thus the five digit pulses are added to the contents of the first C register counter. Since this counter previously contained a 6, the addition of the five pulses causes the counter to complete its revolution, setting up the second C register counter for a carry pulse. If the first position C register counter had a number smaller than 5 stored within it, the addition of the five digit pulses in this step would not set up the second C register counter for a carry operation.

(31) The carry pulse adds one pulse to the second C register counter, giving a final figure in the C register of $.081. The C register will be set up to read out the figure $.08, disregarding the final figure "1," thus giving a properly rounded off answer.

(37) The multiply complete pulse, in addition to the functions previously discussed, also passes through the still closed contacts D3—D2 of the WXC relay (FIG. 43) to the compute complete terminal of the control bus and from there to the compute complete terminal (FIG. 45), through the now closed contacts A1—A2 of the SRN relay to the escapement coil of that relay to return its contacts to their original position, and also through the now closed contacts A3—A2 of the SR2 relay to the escapement coil of that relay to return its contacts to their original position.

It may be appreciated from the foregoing that the M key of the typewriter could be connected to the SR3 relay in a similar manner as was the C key if it is desired to have the price as cost per thousand, instead of cost per hundred. In this case, the output bus lines would be shifted three places to the right with respect to the input bus lines instead of the two places just described.

The Shift Right relays may also be used at any time for the transfer of information from one register to another, in which it is desired to shift the relative positions of the numbers being transferred from one register to another. The process of subtraction has been discussed before, with regards to transferring information from the A register. If it is desired to shift the subtracted number to the right by means of the shift right relays, it becomes apparent that the last positions of the input bus lines will have no digit pulses imposed on them, whereas it is necessary that all input bus lines have nine digit pulses on them to give a proper "nines-complement" number. This is remedied by providing "dummy nines" for the otherwise unconnected input bus lines during a shift right subtraction operation.

As, for example, if it were desired to subtract the contents of the A register from the B register, while shifting the A register contents three places to the right, the SR3 relay would be energized to condition the computer for the shifting operation. The ASI relay will have been energized as in the subtraction process described in connection with the transfer of information from the A register. The contacts A2—A3 of the ASI (FIG. 45) relay will now be closed and the emitter digit bus line 9 will feed nine pulses through the A2—A3 contacts of the ASI relay to the otherwise disconnected input bus lines 8, 9 and 10, through the now closed contacts A5—A6, D2—D3 and C2—C3, respectively, of the SR3 relay. Thus, the last three input bus lines now have "nines" imposed upon them, not from the output bus, but directly from the emitter digit bus line 9, and the proper nines-complement number will be transmitted to the input of the B register. The A2—A3 contacts of the BSO, CSO and DSO relays are in parallel with the A2—A3 contacts of the ASI relay so that the dummy nines can be added for a shifted subtraction process from any of the registers, to another register.

READ OUT

In the foregoing description, numerical information has been transmitted from the typewriter to the computer and the computer has added, subtracted or multiplied the numbers, with the answer being stored in one of the B, C or D registers, as desired. It is now the purpose of this description to describe the manner in which such answer information may be available to the typewriter so that the answers may be automatically typed out on the bill or other paper which the operator is preparing.

For the purposes of illustration, it will again be helpful to assume the presence of certain given conditions. Although the contents of any of the B, C or D registers can be wired for read-out purposes, let it be assumed that the desired answer is stored in the C register. Also, let it be assumed that the contents of the first position C register counter, C1, is to be disregarded in the final answer read out as this first position might have been used in the computer unit merely for providing a half-cent correction. Further, let it be assumed that the readout operation is to be initiated automatically as soon as the typewriter carriage comes to rest in the 59th column position.

Figure 27:
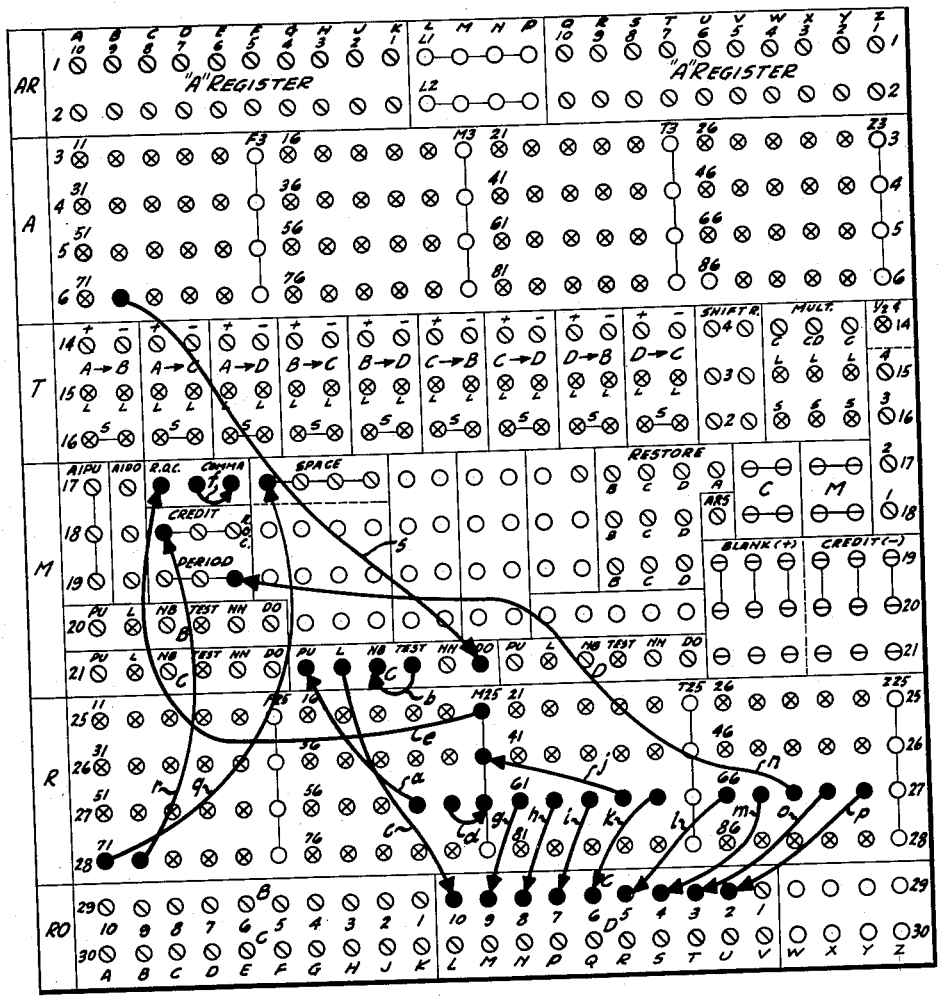
FIG. 27 is a view similar to FIG. 26, illustrating the plug connection of the control panel for a read-out function.

FIG. 27 shows the wiring of the control panel to read out the contents of the C register under the conditions assumed above, and also illustrates the use of the comma, period and Cr symbols in a billing operation, so that the contents of the C register may be read out and expressed in dollars and cents.

A possible answer, expressed in terms of dollars and cents, could take the form "1,000,000.00 CR" and thus the answer can spread over 14 column positions (as the Cr symbol is on a single typewriter type bar), from the 59th to the 72nd column position. A first wire $a$ is connected from the R bank hub corresponding to the 59th column position, CP 27–K, to the PU hub of the C read-out control section in the M bank, CP 21–G. Jumper $b$ connects the Test hub of this section, CP 21–K, to the NB hub of this section, CP 21–J. Jumper $c$ connects from the L hub of this section, CP 21–H, to the tenth position C register read out, CP 29–L. A comma is needed in the next column, and R bank hub CP 27–L is connected by wires $d$ and $e$ to the Read-Out Condition comma hub CP 17–C, with jumper $f$ completing the comma connection from CP 17–D to CP 17–E.

The next three R bank hubs CP 27–N, CP 27–P, CP 27–Q are connected by jumper wires $g$, $h$ and $i$ to the C register readout hubs CP 29–M, CP 29–N and CP 29–P, respectively. A comma is again needed in the next column, and jumper wire $j$ connects to the previous jumper wire $e$ to complete the circuit.

The next three R bank hubs again connect directly to the C register read-out hubs by jumper wires $k$, $l$ and $m$. A period is required in the next column, and jumper $n$ connects the R bank hub CP 27–W to the Read-Out Condition period hub CP 19–E.

The next two R bank hubs, CP 27–X and CP 27–Y, connect by jumper wires $o$ and $p$ to the next two C register read-out hubs, CP 29–T and CP 29–U. The last C register read-out hub, CP 29–V, is not wired as this counter is to be disregarded.

The next column position should be blank so that a space is left between the last digit and the credit symbol,

*Table No. 7*

READ-OUT FUNCTION

| | Command signal | Number in register to be read out | | | | | |
|---|---|---|---|---|---|---|---|
| | | (a) 2,504.00 | | (b) .081 | | (c) 9,999,993.67 | |
| | | Coil picked up | Relay restored | Coil picked up | Relay restored | Coil picked up | Relay restored |
| 1 | J | RNN-U | | RNN-U | | RNB-U | |
| 2 | G(1) | RZ-E | | RZ-E | | RZ-E | |
| 3 | G(2) | RSP-E | | RSP-E | | RSP-E | |
| 4 | G(3) | RK-E | | RK-E | | RK-E | |
| 5 | K(1) | Sp-KPC | | Sp-KPC | | Sp-KPC | |
| 6 | K(2) | Sp-KPC | | Sp-KPC | | Sp-KPC | |
| 7 | K(3) | Sp-KPC | | Sp-KPC | | Sp-KPC | |
| 8 | K(4) | Sp-KPC | | Sp-KPC | | Sp-KPC | |
| 9 | K(5) | 2-KPC | RZ-U | Sp-KPC | | Sp-KPC | |
| 10 | K(6) | Comma-KPC | | Sp-KPC | | Sp-KPC | |
| 11 | K(7) | 5-KPC | | Sp-KPC | | Sp-KPC | |
| 12 | K(8) | 0-KPC | | Sp-KPC | | Sp-KPC | |
| 13 | K(9) | 4-KPC | | Sp-KPC | | 6-KPC | |
| 14 | K(10) | Per-KPC | | Per-KPC | RZ-U | Per-KPC | RZ-U |
| 15 | K(11) | 0-KPC | | 0-KPC | | 3-KPC | |
| 16 | K(12) | 0-KPC | | 8-KPC | | 2-KPC | |
| 17 | K(13) | Sp-KPC | | Sp-KPC | | Sp-KPC | |
| 18 | K(14) | Sp-KPC | | Sp-KPC | | Cr-KPC | |
| 19 | A | | RSP-U | | RSP-U | | RSP-U. |
| 20 | G(4) | | RNN-E | | RNN-E | | RNB-E. |
| | | | RK-E | | RK-E | | RK-E. | so as jumper wire q is connected from the R bank hub, CP 28–A, to the Space hub, CP 17–F. The final R bank hub, CP 28–B, is now connected by jumper wire r to the Read-Out Condition Credit hub, CP 18–C.

A final jumper s is connected from the A bank hub corresponding to the last typing stroke of the read-out operation, CP 6–B, to the DO hub of the C read-out control section, CP 21–M, to restore the read-out relays to their normal position. The necessary wiring for the assumed condition is now complete, and any information stored in the C register will be automatically read out in dollars and cents form when the typewriter comes to rest in the 59th column position.

To further illustrate the flexibility of the read-out operation, let it be assumed that any of the following numbers is stored in the C register to be read out, (a) 2,504.00, (b) .081 and (c) 9,999,993.67, the latter representing a complementary or minus figure.

The sequence of operation again may be presented most clearly by reference to the steps tabulated in Table No. 7. The abbreviation "KPC" designates "key puller coils," these being the coils 451 (FIG. 18) on the typewriter which operate their respective keys to perform a typing operation.

Figure 2:
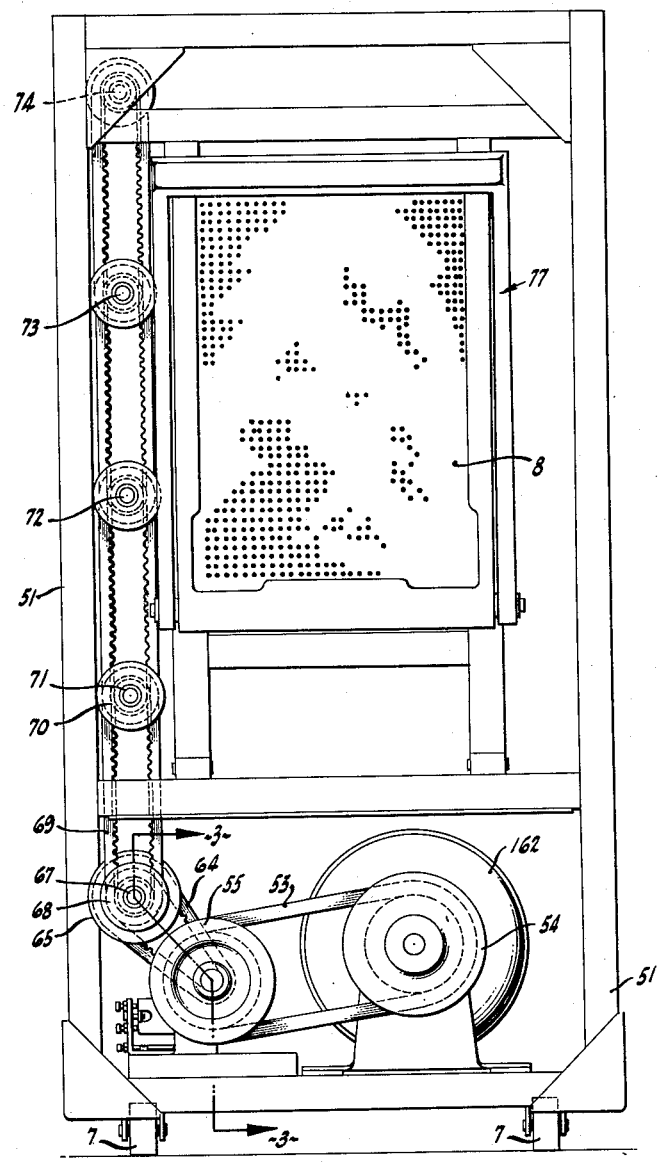
FIG. 2 is a front elevational view of the computer unit.

(a) The first assumed number stored in the C register is the figure 2,504.00. The remaining C register counters are assumed to be in zero position, as no pulses have been added to those counters.

Figure 38:
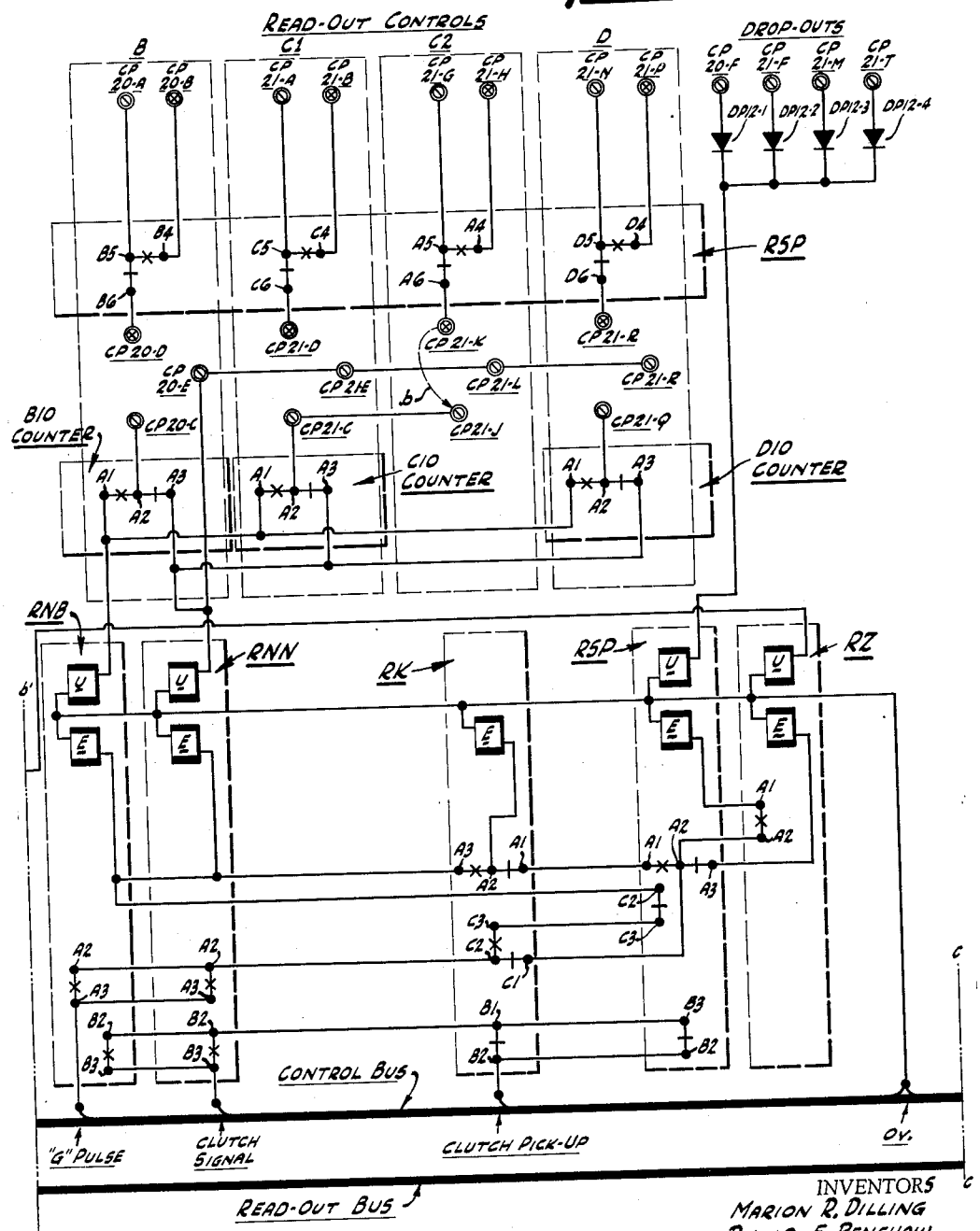

(1) As the typewriter carriage comes to rest in the 59th column, a J-pulse is originated, as previously described. This pulse passes through the R channel commutator on the typewriter to appear at the control panel hub, CP 27–K, which is now connected by jumper wire a to the PU hub, CP 21–G, of the read-out control section. Referring now to FIG. 38, the J-pulse passes from this last-mentioned hub through the normally closed contacts A5—A6 of the RSP relay, to the control panel hub, CP 21–K, and by jumper wire b to control panel hub, CP 21–J, to and through the normally closed contacts A2—A3 of the tenth position C register counter, C10, to the unlatch coil of the RNN relay. The contacts B2—B3 of the RNN relay will close to complete a circuit from the clutch signal source through those contacts and the normally closed contacts B1—B2 of the RK relay to the clutch pic-up terminal. The completion of the clutch circuit starts the operation of the G-pulse generator, as discussed above.

(2) The first G-pulse, G(1), appears at the G-pulse terminal and is routed through the now closed contact A3—A2 of the RNN relay, the normally closed contacts C2—C1 of the RK relay, the normally closed contacts A2—A3 of the RSP relay to the escapement coil of the RZ relay.

(3) The next G-pulse, G(2), follows a similar path, and passes through the now closed contacts A1—A2 of the RZ relay to the escapement coil of the RSP relay.

(4) The next G-pulse, G(3), follows a similar path and passes through the now closed contacts A2—A1 of the RSP relay, to and through the normally closed contacts A1—A2 of the RK relay to the escapement coil of that relay. The normally closed contacts B1—B2 of the RK relay will open, thus disconnecting the clutch signal source from the clutch pick-up. The contacts B2—B3 of the RSP are connected in parallel with the contacts B1—B2 of the RK relay in the clutch signal circuit, but these contacts opened following the energization of the RSP escapement coil.

(5) Referring to FIG. 35, the closing of the D2—D1 contacts of the RSP relay, and the RK relay contacts D3—D2, allows a K-pulse to pass onto the R channel commutator and follow the same path as the J-pulse to the control panel hub, CP 21–G (FIG. 38). This pulse is now routed through the now closed contacts A5—A4 of the RSP relay to the L hub, CP 21–H, and by jumper wire c over to the tenth position of the C register read-out hub, CP 29–L (FIG. 36), to the A8 terminal of the tenth counter, C10, and through the static read-out arm to the D5 terminal, since no number is stored in this counter. The K-pulse thus appears on the read-out bus line 0, and is passed to and through the now closed contacts D8—D7 of the RNN relay (FIG. 37), to and through the now closed contacts C2—C1 of the RZ relay to the Sp key puller coil on the typewriter. The Sp type bar has a blank type face, and, consequently, makes no mark in a typing operation. Thus, since there is no number in the tenth C counter, C10, the typewriter merely advances one carriage position, without any notation made on the bill in the typewriter.

(6) As the typewriter comes to rest in the next column position, a second K-pulse, K(2), is generated. This has been wired so that the K-pulse appearing at the R bank hub, CP 27–L, is routed to the read-out condition comma hub, CP 17–C, through the now closed contacts D6—D5 of the RK relay, to the control panel hub, CP 17–D, by jumper wire f to CP 17–E, to and through the now closed contacts D2—D1 of the RZ relay to the Sp key puller coil. Thus, since no digit has yet been typed out, the comma is suppressed.

(7–8) The K-pulses originated as the typewriter carriage comes to rest in the 61st and 62nd columns travels through essentially the same circuits as in step 5, energizing the Sp key puller coil each time to advance the typewriter carriage.

(9) The next K-pulse, K(5), is applied to the C register hub, CP 29–P, and passes through the contacts A8 and D7, closed by the static read-out brush of the seventh C counter, C7, to the 2 read-out line, and through the now closed contacts B8—B7 of the RNN relay to the 2 key puller coil, to type the figure "2" on the bill. The same K-pulse is routed through the now closed contacts B8—B7 of the RNN relay, through the diode DP—5 to the unlatch coil of the RZ relay (FIG. 38), allowing the switch contacts of this relay to return to their original position.

(10) The next K-pulse, K(6), is also applied through the comma circuit discussed in step 6. This pulse is now allowed to pass through the now normally closed contacts D2—D3 of the RZ relay to the comma key puller coil, to type the comma following the numeral "2."

(11) The next K-pulse, K(7), is applied to the C register at CP 29–Q and passes through the contacts A8—C7 of the sixth C counter, C6, closed by the static read-out brush, and thus over to and through the now closed contacts E4—E3 of the RNN relay to the 5 Key puller coil, to type the numeral "5."

(12) The next K-pulse, K(8), applied to the C register as above, passes through the closed contacts A8—D5 of the C5 counter, through the read-out bus line 0, to and through the still closed contacts D8—D7 of the RNN relay. The contacts C2—C3 of the RZ relay are now in their normally closed position and the K-pulse is routed through those contacts to the 0 key puller coil.

(13) The next K-pulse, K(9), applied to the C register as above, passes through the now closed contacts A8—C6 of the C4 counter, through the read-out bus line 4, to and through the still closed contacts E2—E1 of the RNN relay to the 4 key puller, to type the numeral "4."

(14) The next K-pulse, K(10), has been routed from the R bank hub, CP 27–W to the period hub, CP 19–E, through the now closed contacts A6–A5 of the RK relay to the period key puller coil, to type the period.

(15–16) The next two K-pulses, K(11) and K(12), are applied to the static read-out switch of counter C3 and C2, and, finding a "0" in both counters, type zeros in both columns, as in step 12.

(17) It has been desired to leave a blank space in this next column, and, accordingly, the K(13) pulse has been routed to the space hub, CP 17–F, and from there directly to the space key puller coil, to advance the typewriter carriage.

(18) The K(14)-pulse has been wired from the R bank hub, CP 28–B, to the Read-Out Condition Credit hub, CP 18–C, and passes from that hub through the still closed contacts C3—C2 of the RNN relay to the space key puller coil.

(19) As the space key operates in the last step, the typewriter generates an A-pulse, which has been wired from the A bank hub, CP 6–b, to the drop-out hub of the C read-out control section, CP 21–M (FIG. 38). The A-pulse passes through the diode DP12—3 to the unlach coil of the RSP relay, restoring its switches to their original position. The contacts B2—B3 of this relay return to their original closed position, thus completing the circuit for the clutch signal to the clutch, and the G-pulse generator starts into operation again.

(20) The next G-pulse in the read-out function, G(4), appears at the G-pulse terminal, and is routed through the still closed contacts A3—A2 of the RNN relay, to and through the still closed contacts C2—C3 of the RK relay, to and through the now closed normally closed contacts C3—C2 of the RSP relay, to the escapement coil of the RNN relay, and through the still closed contacts A3—A2 of the RK relay to the escapement coil of that relay. These two relays, RNN and RK, return their switch contacts to their original position, with the contacts B2—B3 of the RNN relay acting to interrupt the clutch circuit.

The read-out cycle of the C register has now been completed, and the figure "2,504.00" has been typed on the bill.

(b) The next number assumed to have been stored in the C register is the number .081, such as may have been obtained by the multiplication process discussed before.

(1–4) The control relays function in the same manner as above.

(5–13) The K(1)–K(9)-pulses in these steps are routed either through the zero positions in the C counter static read-out switches, or to the comma hub, as before. In each case, the contacts C2—C1 and D2—D1 of the RZ relay will shunt the K-pulses from the 0-read-out line and the comma line, respectively, onto the space key puller coil, and the carriage advances, without typing any notation on the bill.

(14) The next K-pulse, K(10), operates the period key puller coil, as in step 14 above. This K-pulse is also applied through diode DP1—5 to the unlatch coil of the RZ relay, to return its contacts to their original positions, as in step 9 of the preceding read-out function.

(15) The next K-pulse, K(11), finds a zero in the C3 counter, and is passed to the read-out bus line 0, and passes through the now closed contacts C2—C3 of the RZ relay to the 0 key puller coil.

(16) The next K-pulse, K(12), is routed in a manner as discussed above, and is applied to the 8 key puller coil, to type the number "8" on the bill.

As the first counter, C1, has not been wired for read-out, the final answer typed out is ".08."

(17–20) These steps are identical to those discussed above.

(c) The third number assumed to have been stored in the C register is the number 9,999,993.67, a number which is in complementary form, as a result of a subtractive operation. This number, when converted into a true number, will be a minus 6.32.

(1) The J-pulse follows the route discussed above and appears at the control panel hub, CP 21–J (FIG. 38). As the C10 counter has a "9" stored in it, the nine push bar will be depressed, opening contacts A2—A3, and closing contacts A2—A1. The J-pulse thus passes through the closed contacts A2—A1 of the C10 counter and appears on the unlatch coil of the RNB relay, instead of the RNN relay as before. The clutch is picked up through the contacts B3—B2, connected in parallel with the B3—B2 contacts of the RNN relay.

(2–4) These steps are identical with those described above.

(5) The first K-pulse, K(1), is applied to the tenth C counter, C10, and, since this counter has a 9 standing in it, the K-pulse passes through the contacts A8—A7 to the read-out bus line 9. The pulse is then shunted by the now closed contacts D6—D5 of the RNB relay and the now closed contacts C2—C1 of the RZ relay to the space key puller coil, which advances the carriage, without typing any notation on the bill.

(6–12) The succeeding K-pulses, K(2) through K(8), are similarly shunted to the space key puller coil, either as in the last step above or by the comma route discussed in step 6 of the first read-out example.

(13) The next K-pulse, K(9), finds a 3 in the C4 counter and the K-pulse passes to the read-out bus line 3, and is shunted by means of the now closed contacts A8—A7 of the RNB relay to the 6 key puller coil, to type the proper nines-complement form of the figure "3."

(14) The K(10)-pulse types the period as in the previous examples.

(15) The K(11)-pulse interrogates the C3 counter, as above, and finds a 6 standing in that counter. The K-pulse thus is conducted through the read-out bus line 6, and is shunted by the now closed contacts A6—A5 of the RNB relay to the 3 key puller coil.

(16) Similarly, the K(12)-pulse is shunted from the read-out bus line 7 to the 2 key puller coil by means of the now closed contacts B6—B5 of the RNB relay.

(17) The K(13)-pulse spaces the typewriter as in the previous example.

(18) The K(14)-pulse is applied, as before, to the credit control hub, CP 18–C, and passes to and through the now closed contacts C3—C2 of the RNB relay to the Cr key puller coil, to type the Cr symbol, indicating that the 6.32 is a minus quantity.

(19–20) These two steps are the same as those previously discussed, with the exception that the G(4)-pulse is applied to the escapement coil of the RNB relay, instead of to the escapement coil of the RNN relay, as before.

This, then, completes the read-out function of the C register, with all of the read-out control relays being returned to their original positions.

As may be appreciated from the foregoing, either of the B or D registers could be read out by wiring them in the same manner as was the C register. Also, any of the counters in a particular register may be wired for read out, as desired, and periods, commas and spaces may be interspersed with the numbers, as desired.

It has also been shown that all zeros and commas have been suppressed in a read-out function by the RZ relay until a significant digit or a period has been printed by the typewriter.

It is important to note that the computer drive shaft is at rest during the actual read-out operation, the drive shaft is at rest during the actual read-out operation, the drive shaft being driven only during the relatively short periods before and after the actual read-out function to set up and release the control relay contacts. Thus, the speed of the read-out operation is a function solely of the particular typewriter used with the computer. If the typewriter has an inherently slow action, the read-out operation will be correspondingly slow, whereas, if the typewriter is inherently fast acting, the read-out operation will be correspondingly fast. That is, the read-out operation will progress as quickly as the typewriter is able to type a key and move to the next column position. This is of importance, as it requires no synchronization of the particular typewriter with an external clock apparatus, because the typewriter, itself, sets the speed of operation of the K-pulses.

"S" SIGNALS

The computer is also capable of automatic sub-programming, without the necessity for an additional command signal from the typewriter, by means of the "S" pulses. As for example, typewriter may have been used to put information into the A register, with a command given by the typewriter to transfer the A register contents into the B register. This is the operation discussed in connection with Tables No. 2 and 3 above, where the command signal, an A-pulse, was applied to the plus hub of the A→B section of the T bank, CP 14–A. As soon as this transfer is complete, it may be desirable to immediately and automatically transfer the B register contents to the C register, without a further command from the typewriter. As may be appreciated from the discussion of Table No. 4, this will require a command signal of some sort to be applied to the plus hub of the B→C section of the T bank, CP 14–G, to condition the computer unit for this function. In the foregoing discussion of Table No. 4, it was assumed that the command signal for this operation was a J-pulse from the typewriter, but, as will now be discussed, this command signal could have been one generated at the completion of the A→B transfer.

Referring to Table No. 3, the last step in the A→B transfer was the generation of a C-pulse. This pulse appeared at the C-pulse terminal and may pass through the now closed contacts B3–B2 of the BC relay (FIG. 49) to the "C" Signal from "B" Input line in the control bus, to appear at the Web A relay contact B8 (FIG. 51). This relay is still picked up and the C-pulse passes through the still closed contacts B8—B7 of the Web A relay to the S-pulse hub of the A→B section of the T bank, CP 16–A.

This S-pulse, being the final pulse of the A→B transfer, may then be connected by jumper wire to the plus hub of the B→C section of the T bank, CP 14–G, to initiate the transfer operation from the B to the C register as did the J-pulse discussed in Table No. 5.

Thus, the single command signal from the typewriter may be used to first transfer the A register contents to the B register, and the completion of this function has generated an S-pulse, which may then initiate the transfer from the B register to the C register.

When the B→C transfer is complete, a similar S-pulse will be generated and will appear at the S hub of the B→C section of the T bank, CP 16–G, and this S pulse may be used to automatically initiate any other desired function of the registers.

A further illustration of the use of the S-pulse has already been described in connection with multiplication, where, in Table No. 6, an S-pulse was used in step 31 to initiate the restoration of the B register following the multiplication process.

By the preceding discussion, it can be seen that the use of the S-pulses can lead to extensive sub-programming following an initial command signal from the typewriter. As a further illustration of the flexibility of the computer unit, the control panel could be wired so that a number is to be put into the A register with the number to be automatically transferred to the B register, with the restoration of the A register being suppressed. The S-pulse following this operation could be used to transfer the contents of the B register to the C register, the S-pulse being used to then transfer A register contents to the D register. The S-pulse generated by this last process could then be used to multiply the contents of the A and B registers with the transfer of the product to the D register, the S-pulse from the multiplication being used to restore the B register, and the multiply complete signal being used to restore the A register. It will be obvious that this or any other sequence of operation may be performed by the use of the S-pulse.

BLANK AND CREDIT KEYS

Figure 52:
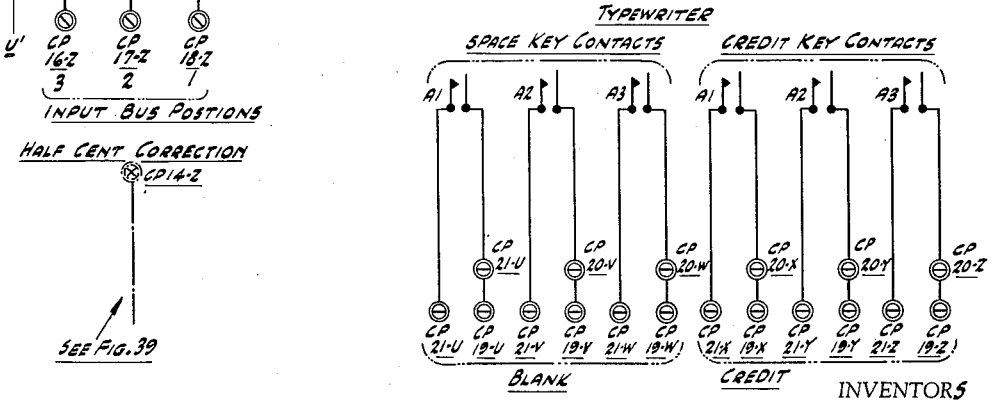

One use of the blank or space, and credit keys has already been discussed in connection with the read-out function, where, if a number read out is in plus form, the blank key will be operated, and, if the number read out is in minus form, the credit or Cr key will be operated to signify that the number printed out is a minus number. The key contacts associated with the space and credit keys are shown in FIG. 52.

These two keys may be used in addition to inform the computer unit that a number being put into the A register is in plus or minus form so that it may be added to or subtracted from the contents of the register into which this number is subsequently transferred. As, for example, let us assume that the operator is using the computer unit to add a series of numbers into the B registers, in order to prepare a bill. This may be done as in the discussion of Tables Nos. 2 and 3, with the typewriter carriage being returned to the same starting column for each separate number. However, some of the numbers in the series may be in plus form and some of them in minus form. Under the conditions assumed in connection with Tables Nos. 2 and 3, the A-pulse generated by the last figure being typed will transfer the number in the A register to the B register without regard for the sign of the number. That is, all transfers will be made either in plus form or in minus form, depending on whether the A-pulse is applied to the plus or minus hub of the A→B transfer section of the T bank.

The blank and credit hubs on the control panel may be used when it is necessary to specify item by item whether a transfer is to be added to or subtracted from the total already in the receiving register. This may be done by omitting the jumper wire from the A bank hub, CP 3–Q, to the plus hub of the A→B section of the T bank, CP 14–A. An additional space is required in order that the Cr symbol be printed, if the item is minus, and, accordingly, a jumper is connected to the A bank hub corresponding to the 24th carriage position, CP 3–R, to the blank hub, CP 19–U. Another jumper wire will be connected from the blank hub, CP 20–V, to the credit hub, CP 19–X. By this wiring, the A-pulse generated by a key stroke in the 24th column position will appear on the hubs CP 19–U and CP 19–X of the blank and credit section of the control panel. After the number is put into the A register, the blank or credit key will be depressed, depending on whether the item is in plus or minus form.

A jumper is then connected from the blank key hub, CP 21–U, to the plus hub of the A→B transfer section CP 14–A, and the A-pulse will then be routed through the contacts closed by the blank key to the plus hub of the A→B transfer section, and the A register contents will be added to the B register contents.

Similarly, a jumper is connected from the credit hub, CP 21–X, to the minus hub of the A→B transfer section, CP 14–B. Thus, if the number typed into the A register is in minus form, the Cr key will be depressed and the A-pulse will be routed through the now closed contacts of the Cr key to the minus hub of the A→B transfer section, and the number in the A register will be subtracted from the contents in the B register.

Therefore, as the operator types the numbers into the A register, a plus transfer, involving the AAI relay, will take place when the operator depresses the space key, and a minus transfer, involving the ASI relay, will take place as the operator depresses the Cr key.

ADDITIONAL FEATURES

As will be noted from FIG. 33, whenever the computer switch actuator 166 is depressed, power is applied to the computer motor 162, so that motor is in operation whether the computer unit is in active operation or not. However, unless a command signal has been given by the typewriter, the clutch is in a de-energized state and the computer motor has essentially no load on it, which means that the power consumption of the motor is at a minimum. Only when a transfer of information within, or from, the computer unit is ordered by a command signal from the typewriter, as discussed previously, does the clutch become energized to drive the relays, pulse counters, and the G-pulse generator, and, as soon as the desired transfer function is completed, the clutch is de-energized to again remove the load from the computer motor. This limiting of the loading of the computer motor, to the times in which actual work is to be performed by the motor, results in a minimum amount of power drain by the computer, and thereby reduces the cost of operation, and reduces the unwanted generation of heat. However, the computer unit is instantly ready to function, as soon as the operator operates the proper keys of the typewriter in accordance with the programming set up in the control panel wiring.

Another important feature of the invention is the manner in which the relays in the individual units of the computer unit are connected to receive command signals for their operation. As has been explained previously, the escapement coils 321 of the relays are designed to be energized by pulses of a discrete length and synchronized with the rotation of the escapement wheels, whereas the same relays are also designed to be operated by primary command signals generated by the typewriter, which signals may be of different pulse lengths and which are not synchronized with the rotation of the escapement wheels. Accordingly, all of the primary command signals, the A- and J-pulses, brought into the computer unit from the typewriter, are connected only to the unlatch coils of the relays, and all of the escapement coils of the relays are connected to be pulsed only by the secondary command signals generated by the G-pulse generator.

The circuits in which the relays are inserted are designed to properly orient the relays, so that if a new relay is inserted within the computer unit with the normally open switches in closed position and the normally closed switches in open position, a single cycle of the computer involving that circuit will set the relay switches in their proper normal positions. As has been described before, there are two general types of relays used in the computer circuits, the first having an escapement coil alone (FIGS. 14 and 15), whereas the other has an escapement coil and an unlatch coil (FIGS. 16 and 17).

The first type relay, having only an escapement coil, has the escapement coil 321 connected to the G-pulse generator through two different circuits, each of which includes a different set of switch contacts operated by the relay. The BRI relay (FIG. 49) illustrates these connections. The first circuit is connected through a set of normally closed contacts A1—A2 to receive a first G-pulse to energize the escapement coil of the relay, and the second circuit connects the escapement coil through a set of normally open contacts A2—A3 to receive a second and later G-pulse. (In the example chosen, this would be a C-pulse). If the switches are in proper orientation, the normally closed contacts will allow the first G-pulse to energize the escapement coil to actuate the relay and close the normally open contacts, so that the second G-pulse (the C-pulse) will in turn reach the escapement coil to again advance the escapement wheel and return the switches to their normal position. If the switches are in improper orientation, a single cycle will restore the contacts to their proper normal position. The normally closed switch contacts A1—A2, if improperly oriented, will prevent the first G-pulse from reaching the escapement coil and the normally open switch contacts A2—A3 will remain in their closed position, to allow the C-pulse to reach the escapement coil and return the switches to their proper normal position. The relay will thus be automatically oriented for future cycles of operation.

In the same manner, a relay having an escapement coil and an unlatch coil will be properly oriented after a single cycle of operation. Each one of these relays is designed to have the first command pulse applied to the unlatch coil to unlatch the push bar so that it may move upwardly to effect a switching action, and a later command signal is applied to the escapement coil to allow the escapement wheel to rotate, forcing the push bar down to its normal latched position. The BAO relay (FIG. 49) is an example of such an arrangement. If the relay is inserted with the push bar in its unlatched position, the first command signal, applied to the unlatch coil, will have no effect, since the push bar is already unlatched. The later command signal (the T-pulse) applied to the escapement coil will cause the push bar to be moved downwardly where it is latched in its normal latched position, and the relay is properly oriented for its next cycle of operation.

Another important feature of the invention is the manner in which the typewriter and computer unit are interlocked to prevent automatic operation from taking place involving a new instruction until a previously instructed operation is complete. Referring to FIG. 35, it is to be noted that the J-pulse trigger relay coil 554 is connected to the 40 v. source through the normally closed contacts B1—B2 of the EC relay, A1—A2 of the WXC relay, and A1—A2 of the WXD relay. Any time in which the computer unit is performing a transfer function involving the emitter (EC relay), or a multiplication function involving the WXC or WXD relays, the circuit to the J-pulse trigger relay coil will be opened and J-pulses will be prevented from being generated, until the particular transfer or multiplication function is complete. As, for example, the computer unit may have been instructed to multiply the contents of the B register by the contents of the A register, and the operator may have moved the typewriter carriage to a column position which will use a J-pulse to instruct the computer unit to read out the answer, while the multiplication function is still proceeding. However, either the WXC or WXD relay will be actuated during the multiplication cycle and its normally closed contacts A1—A2 will be opened until the multiplication function is complete. At that time, and not before, the normally closed contacts will return to their closed position and will allow the J-pulse trigger coil to trigger a J-pulse to start the new instruction. In this manner, the computer unit is enabled to perform its operation without being stopped in the middle of an operation by an inadvertent move on the part of the operator.

Another advantage of the present computer unit is in the use of the diodes in the operating circuits. By the use of these diodes, the application of a single pulse may be used to carry out a pre-established sub-routine within the computer unit. As, for example, in the transfer of information from the A register to the B register, the single command pulse is used to simultaneously condition the A register to give out its information and the B register to receive the information. There is no need for using two separate command signals for each sub-instruction. The use of the diodes for such purposes lends operational simplicity to the computer unit, and avoids back circuiting with consequent contradictory instructions. These pre-conceived sub-routines are fixed in the computer unit, and thus the possibility that an inexperienced operator may make the wrong connection is eliminated.

It is to be understood that the form of the invention, herewith shown and described, is to be taken as a preferred embodiment of the same, and that various changes in the size, shape and arrangement of parts may be resorted to, without departing from the spirit of the invention, or the scope of the attached claims.

Having thus described our invention, what we claim and desire to secure by Letters Patent is:

1. A computer comprising a typewriter having a movable carriage and a plurality of different number and indicia keys, a plurality of switches operatively associated with each of said number keys for actuation thereby, said switches having a different switch configuration for each of said keys, means responsive to a movement of said carriage from a rest position to generate a first primary electrical command pulse; a computer unit having a plurality of bi-stable relays, means to operate selected of said bi-stable relays by said first command pulse upon actuation of one of said number keys and in accordance with the switch configuration of the switches associated with said one number key, a secondary command pulse generator means for generating a cycle of electrical pulses, means for initiating operation of said secondary command signal generator means by said primary command pulse, a plurality of pulse accumulating relays, and means to apply a number of pulses of said cycle of secondary command pulses to said pulse accumulating relays in accordance with the switch position of said bi-stable relays.

2. A computer comprising a typewriter having a movable carriage and a plurality of different number keys, a plurality of electrically energizable means operatively associated with each of said keys for operating said keys upon energization of said means, means responsive to the carriage coming to rest after a movement thereof to generate a primary electrical command pulse; a computer unit having a plurality of pulse accumulating relays, and means for actuating one of said electrically energizable means associated with one of said number keys by said primary command pulse in accordance with the number of pulses previously accumulated by said accumulating relays.

3. A computer comprising a typewriter having a movable carriage and a plurality of different number and indicia keys, a plurality of switches operatively associated with said keys for actuation thereby, said switches having a different switch configuration for each of said keys, a plurality of electrically energizable means operatively associated with each of said keys for operating said keys upon energization of said means, means responsive to a movement of said carriage from a rest position to generate a first primary electrical command pulse, means responsive to the carriage coming to rest after a movement thereof to generate a second primary electrical command pulse; a computer unit having a plurality of bi-stable relays, means to operate selected of said bi-stable relays by said first command pulse upon actuation of one of said number keys and in accordance with the switch configuration of said actuated number key, a secondary command pulse generator means for generating a cycle of electrical pulses, means for initiating operation of said secondary command signal generator means by one of said primary command pulses, a pulse accumulating relay, means to apply a number of pulses of said cycle of secondary command pulses to said pulse accumulating relay in accordance with the switch positions of said bi-stable relays, and means for actuating one of said electrically energizable means associated with one of said number keys by said second primary command pulse in accordance with the number of pulses accumulated by said accumulating relay.

4. A computer comprising a typewriter having a movable carriage and a plurality of different number keys, a plurality of switches operatively associated with each of said number keys for actuation thereby, said switches having a different switch configuration for each of said keys, means responsive to a movement of said carriage resulting from an actuation of one of said keys to generate a primary electrical command pulse; a computer unit having a plurality of groups of information indicating bi-stable relays, means to operate selected of the bi-stable relays of each of said groups thereof successively by said primary command pulse upon actuation of a succession of said number keys and in accordance with the switch configuration of each of the successively operated number keys, a secondary command pulse generator means for generating a cycle of electrical pulses, means for initiating operation of said secondary command signal generator means by a desired one of said primary command pulses, a plurality of pulse accumulating relays, means to simultaneously apply a number of pulses of said cycle of secondary command pulses to each of said pulse accumulating relays in accordance with the switch positions of the bi-stable relays of each of said groups thereof.

5. A computer comprising a typewriter having a movable carriage and a plurality of different number and indicia keys, a plurality of switches operatively associated with said keys for actuation thereby, said switches having a different switch configuration for each of said keys, a plurality of electrically energizable means operatively associated with each of said keys for operating said keys upon energization of said means, means responsive to a movement of said carriage from a rest position to generate a first primary electrical command pulse, means responsive to the carriage coming to rest after a movement thereof to generate a second primary electrical command pulse; a computer unit having a plurality of groups of bi-stable relays, means to successively operate selected of the bi-stable relays of each of said groups by said first command pulse upon actuation of a succession of said number keys and in accordance with the switch configuration of said successively actuated number keys, a secondary command pulse generator means for generating a cycle of electrical pulses, means for initiating operation of said secondary command signal generator means by a desired one of said primary command pulses, a plurality of pulse accumulating relays, means to apply a number of pulses of said cycle of secondary command pulses simultaneously to each of said pulse accumulating relays in accordance with the switch positions of the bi-stable relays of each of said groups thereof so that each of said pulse accumulating relays will indicate a number of pulses in accordance with the switch configuration of the switches associated with each of the successively actuated keys, and means for successively actuating one of said electrically energizable means associated with one of said number keys by said second primary command pulse in accordance with the number of pulses accumulated by each of said accumulating relays.

6. A computer comprising a typewriter having a movable carriage and a plurality of different number and indicia keys, a plurality of switches operatively associated with each of said number keys for actuation thereby, said switches having a different switch configuration for each of said keys, a plurality of electrically energizable means operatively associated with each of said keys for operating said keys upon energization of said means, means responsive to a movement of said carriage from a rest position to generate a first primary electrical command pulse, means responsive to the carriage coming to rest after a movement thereof to generate a second primary electrical command pulse, means to generate a third primary electrical command pulse after said second primary command signal has ended and while said carriage remains at rest after a movement thereof; a computer unit having a plurality of bi-stable relays, means to operate selected of said bi-stable relays by said first command pulse upon actuation of one of said number keys and in accordance with the switch configuration of said one number key, a secondary command pulse generator means for generating a cycle of electrical pulses, means for initiating operation of said secondary command signal generator means by one of said primary command pulses, a pulse accumulating relay, means to apply a number of pulses of said cycle of secondary command pulses to said pulse accumulating relay in accordance with the switch positions of said bi-stable relays, means to delay the generation of said second primary command pulse until after the completion of the cycle of operation of said secondary command pulse generator, means operable by said secondary command pulse for conditioning said typewriter for operation by said computer unit, and means for actuating one of said electrically energizable means associated with one of said number keys by said third primary command pulse in accordance with the number of pulses accumulated by said accumulating relays.

7. A computer comprising a typewriter having a plurality of manually operable number and function keys, switch means operatively associated with selected of said keys for actuation by a key operation, a primary pulse generator means responsive to an operation of the typewriter resulting from an actuation of said keys for generating electrical pulses, a computer unit having a plurality of bi-stable relays, means including said primary pulse generator means and said switch means for actuating selected of said bi-stable relays upon actuation of one of said number keys and in accordance with the number of said key, a secondary pulse generator means for generating a cycle of electrical pulses, means for initiating operation of said secondary pulse generator means by an electrical pulse of said primary pulse generator means, a pulse accumulating relay, and means to apply a number of pulses of said secondary pulse generator means to said pulse accumulating relays in accordance with the switch positions of said bi-stable relays.

8. A computer comprising a typewriter having a movable carriage and a plurality of different number keys, a plurality of electrically energizable means operatively associated with each of said keys for operating said keys upon energization of said means, pulse generator means responsive to an operation of said typewriter resulting from an operation of one of said keys for generating an electrical pulse after said operation of said typewriter is complete, a computer unit having a pulse accumulating relay, and means including said pulse generator for actuating one of said electrically energizable means associated with one of said number keys in accordance with the number of pulses previously accumulated by said accumulating relay.

9. A computer comprising a typewriter having a plurality of manually operable number and function keys, switch means operatively associated with selected of said keys for actuation by a key operation, an electrically energizable means operatively associated with each of said number keys for operating said keys upon energization of said means, a first primary pulse generator means responsive to an operation of said typewriter resulting from an operation of one of said keys for generating an electrical pulse during said typewriter operation, a second primary pulse generator means responsive to said typewriter operation for generating an electrical pulse after said typewriter operation is complete, a computer unit having a plurality of bi-stable relays, means including said first primary pulse generator and said switch means for actuating selected of said bi-stable relays upon actuation of a number key and in accordance with the number of said key, a secondary pulse generator means for generating a cycle of electrical pulses, means for initiating operation of said secondary pulse generator means in response to operation of said first primary pulse generator, a pulse accumulating relay, means to apply a number of pulses of said secondary pulse generator means to said pulse accumulating relay in accordance with the switch positions of said bi-stable relays, and means including said second primary pulse generator means for actuating one of said electrically energizable means associated with said number keys in accordance with the number of pulses previously accumulated by said accumulating relay.

10. A computer comprising a typewriter having a plurality of manually operable number and function keys, switch means operatively associated with selected of said keys for actuation by a key operation, an electrically energizable means operatively associated with each of said number keys for operating said keys upon energization of said means, a first primary pulse generator means responsive to an operation of said typewriter resulting from an operation of one of said keys for generating an electrical pulse after said typewriter operation is complete, a computer unit having a plurality of groups of bi-stable relays, means including said first primary pulse generator means and said switch means for actuating selected of said bi-stable relays of different groups of said bi-stable relays upon successive actuations of selected of said number keys and in accordance with the numbers of said keys, a secondary pulse generator means for generating a cycle of electrical pulses, means for initiating operation of said secondary pulse generator means in response to operation of said first primary pulse generator, a plurality of pulse accumulating relays, means to apply a number of pulses of said secondary pulse generator means simultaneously to each of said pulse accumulating relays in accordance with the switch positions of the bi-stable relays of each of said groups thereof so that each of said pulse accumulating relays will indicate a number of pulses in accordance with the numbers of the successively actuated number keys, and means including said second primary pulse generator means for successively actuating one of said electrically energizable means associated with said number keys in accordance with the number of pulses accumulated by each of said accumulating relays.

11. A computer comprising a typewriter having a plurality of manually operable number and function keys, a computer unit having a plurality of registers, each of said registers being adapted to receive and accumulate numerical information in the form of electrical pulses, means to insert and store numerical information in a selected register in accordance with the successive actuation of selected of said number keys, means responsive to an electrical command signal to transfer numerical information from one of said registers to another of said registers, and means responsive to actuation of one of said keys to generate a command signal.

12. A computer comprising a typewriter having a plurality of manually operable number and function keys, a computer unit having a plurality of registers, each of said registers being adapted to receive and accumulate numerical information in the form of electrical pulses, means to insert and store numerical information in a selected register in accordance with the successive actuation of selected of said number keys, means responsive to an electrical command signal to transfer numerical information from one of said registers to another of said registers, means responsive to actuation of one of said keys to generate a command signal, and means responsive to the completion of said transfer of numerical information to generate another command pulse.

13. A computer comprising a typewriter having a plurality of manually operable number and function keys, a computer unit having a plurality of registers each being adapted to receive and accumulate numerical information in the form of electrical pulses, means to insert and store numerical information in a selected register in accordance with the successive actuation of selected of said number keys, means responsive to an electrical command signal to transfer numerical information from one register to another register, means responsive to actuation of one of said keys for generating a command signal to initiate said transfer of numerical information, a second means responsive to an electrical command signal to initiate a second transfer of numerical information from one register to another register, and means responsive to the completion of the first transfer of numerical information to generate a second command signal to actuate said second transfer means.

References Cited in the file of this patent

UNITED STATES PATENTS

| | | |
|---|---|---|
| 2,540,029 | Hamilton et al. | Jan. 30, 1951 |
| 2,585,685 | Roggenstein et al. | Sept. 12, 1952 |
| 2,644,887 | Wolfe | July 7, 1953 |
| 2,714,985 | Saxby et al. | Aug. 9, 1955 |
| 2,717,733 | Luhn et al. | Sept. 13, 1955 |
| 2,722,375 | Chenus | Nov. 1, 1955 |
| 2,728,521 | Benson et al. | Dec. 27, 1955 |
| 2,749,037 | Stibitz | June 5, 1956 |
| 2,762,561 | Campos | Sept. 11, 1956 |
| 2,781,446 | Eckert et al. | Feb. 12, 1957 |
| 2,798,670 | Boyer | July 9, 1957 |
| 2,804,266 | Dexter et al. | Aug. 27, 1957 |